(12) United States Patent
Konishi

(10) Patent No.: US 9,833,705 B2
(45) Date of Patent: Dec. 5, 2017

(54) STORAGE MEDIUM STORING INFORMATION PROCESSING PROGRAM, INFORMATION PROCESSING APPARATUS AND INFORMATION PROCESSING METHOD

(75) Inventor: Yoshinori Konishi, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 2289 days.

(21) Appl. No.: 12/631,211

(22) Filed: Dec. 4, 2009

(65) Prior Publication Data

US 2010/0283723 A1    Nov. 11, 2010

(30) Foreign Application Priority Data

May 7, 2009 (JP) .................................. 2009-112465

(51) Int. Cl.
| | |
|---|---|
| A63F 13/428 | (2014.01) |
| A63F 13/42 | (2014.01) |
| A63F 13/218 | (2014.01) |
| A63F 13/214 | (2014.01) |
| A63F 13/00 | (2014.01) |
| A63F 13/98 | (2014.01) |
| A63F 13/235 | (2014.01) |

(52) U.S. Cl.
CPC .............. *A63F 13/42* (2014.09); *A63F 13/00* (2013.01); *A63F 13/02* (2013.01); *A63F 13/214* (2014.09); *A63F 13/218* (2014.09); *A63F 13/235* (2014.09); *A63F 2300/105* (2013.01); *A63F 2300/1056* (2013.01); *A63F 2300/1068* (2013.01)

(58) Field of Classification Search
CPC .................................................... A63F 13/428
USPC ................................ 345/156, 167; 463/36, 43
See application file for complete search history.

(56) References Cited

U.S. PATENT DOCUMENTS

| | | | |
|---|---|---|---|
| 5,613,690 A * | 3/1997 | McShane et al. ............ 273/449 |
| 5,860,861 A * | 1/1999 | Lipps et al. ..................... 463/36 |
| 6,225,977 B1 * | 5/2001 | Li .................................. 345/156 |
| 6,362,817 B1 * | 3/2002 | Powers et al. ................ 345/419 |
| 6,685,480 B2 * | 2/2004 | Nishimoto et al. ........... 434/247 |
| 2008/0261696 A1 | 10/2008 | Yamazaki et al. |

(Continued)

FOREIGN PATENT DOCUMENTS

| | | |
|---|---|---|
| GB | 2 345 440 | 7/2000 |
| JP | 52-037472 | 3/1977 |
| JP | 9-108391 | 4/1997 |

(Continued)

OTHER PUBLICATIONS

Office Action in corresponding Japanese Application No. 2009-112465 dated Mar. 25, 2015 (with translation).

(Continued)

*Primary Examiner* — Dmitry Suhol
*Assistant Examiner* — Brandon Gray
(74) *Attorney, Agent, or Firm* — Nixon & Vanderhye, P.C.

(57) ABSTRACT

A game apparatus includes a CPU, the CPU judges a motion of a player on the basis of a cycle of a load value input from a load controller, and selectively displays an animation of a player object according to the motion. Furthermore, the CPU controls a moving amount or a moving velocity of the player object on the basis of the load value input from the load controller, and controls a moving direction of the player object according to a barycentric position of the player detected by the load controller.

27 Claims, 30 Drawing Sheets

(56) References Cited

U.S. PATENT DOCUMENTS

2009/0093315 A1* 4/2009 Matsunaga et al. ............ 463/43

FOREIGN PATENT DOCUMENTS

| JP | 9-197951 | 7/1997 |
|----|----------|--------|
| JP | 2005-352580 | 12/2005 |
| JP | 2008-015887 | 1/2008 |
| JP | 2008-234212 | 10/2008 |
| JP | 2008-264195 | 11/2008 |
| WO | 2008/099582 | 8/2008 |

OTHER PUBLICATIONS

U.S. Appl. No. 12/631,245, filed Dec. 4, 2009, Storage Medium Storing Information Processing Program, Information Processing Apparatus and Information Processing Method.
Japanese Office Action for Application No. 2009-218510 dated Jan. 28, 2014 (with translation).
Dong Soo "Luie" Han, "Report on Nintendo of America Booth for Wii Titles Experiencing 4-player simultaneous play in 'New Super Mario Bros. Wii' and Archery in 'Wii Sports Resort,'" [online] uploaded on Game Watch by Impress Watch Corporation on Jun. 5, 2009 [searched on Jan. 20, 2014], Internet <URL:http://game.watch.impress.co.jp/docs/news/20090605_212624.html>.
Communication received in EP Application No. 09 177 598.1 dated May 28, 2015.
U.S. Appl. No. 12/631,211, filed Dec. 4, 2009, Storage Medium Storing Information Processing Program, Information Processing Apparatus and Information Processing Method.
U.S. Appl. No. 12/633,327, filed Dec. 8, 2009, Storage Medium Storing Information Processing Program, Information Processing Apparatus and Information Processing Method.

\* cited by examiner

FIG. 11
(A) GAME SCREEN 200 (DURING NORMAL FLYING)
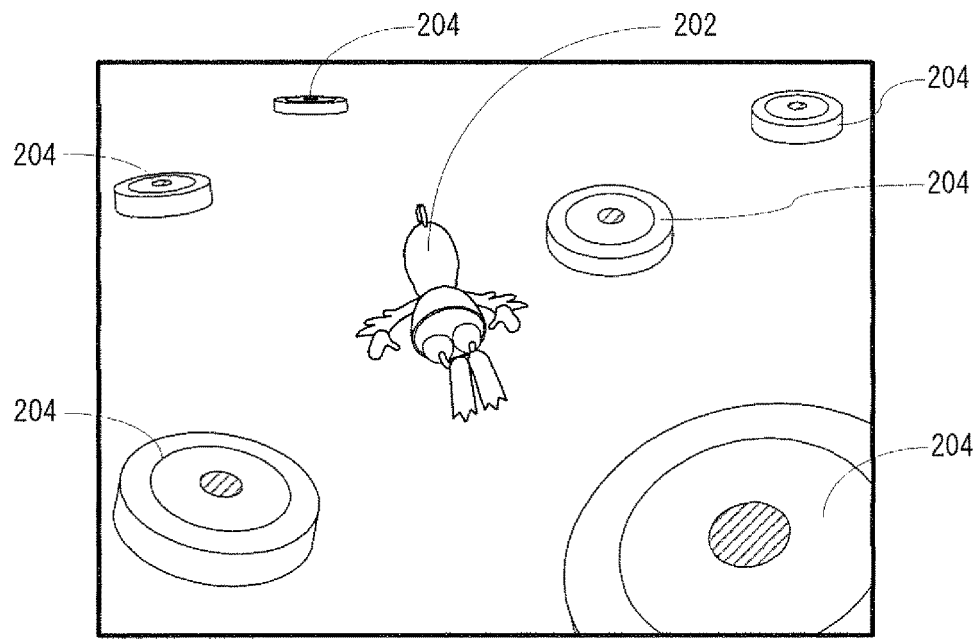
(B) GAME SCREEN 200 (DURING DESCENDING)
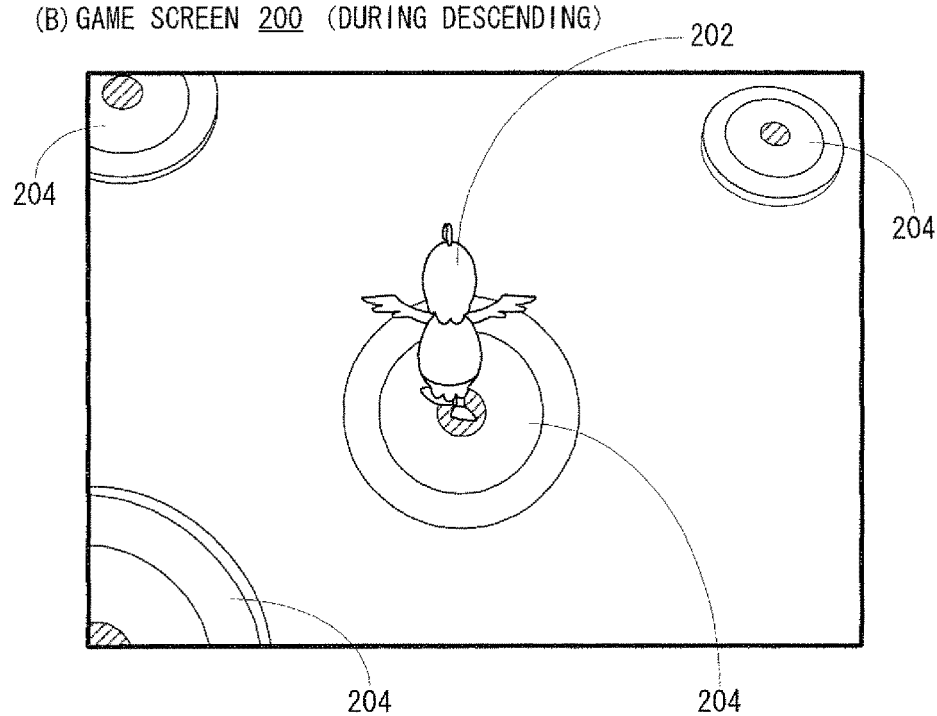

FIG. 12
(A) LARGE-FLAPPING MOTION
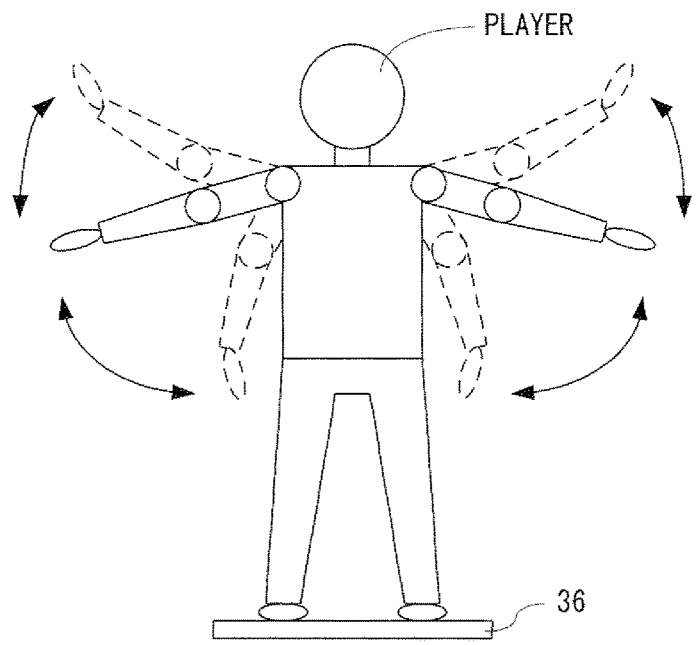
(B) SMALL-FLAPPING MOTION
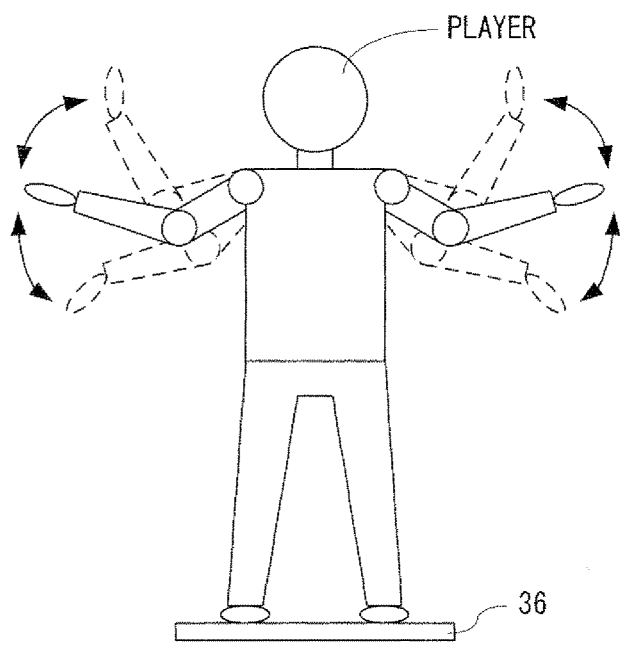

FIG. 16
(A) RANGE OF DETECTION
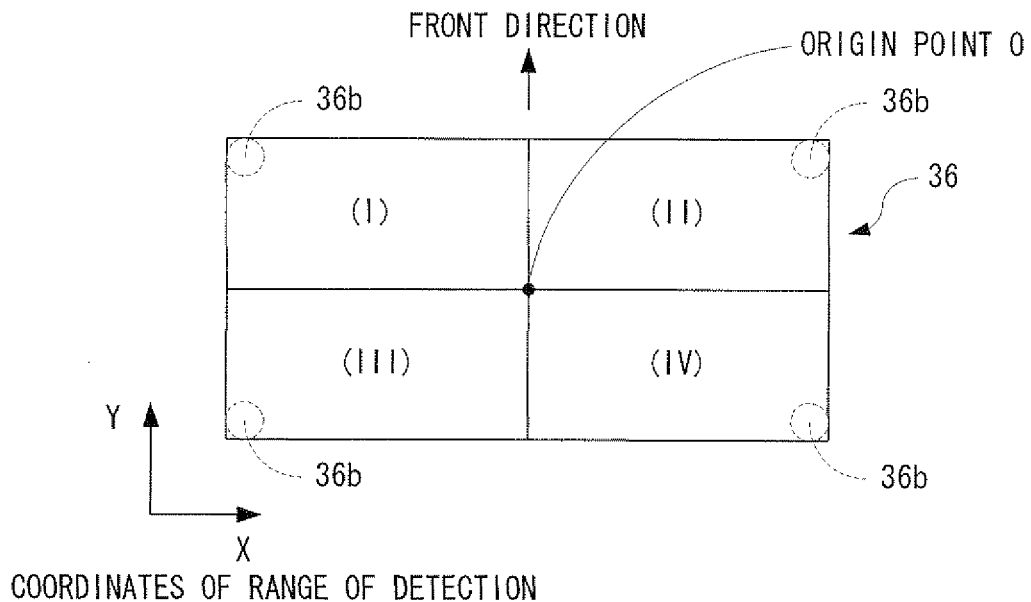
COORDINATES OF RANGE OF DETECTION
(B) MOVING DIRECTION OF PLAYER OBJECT (RIGHT AND LEFT)
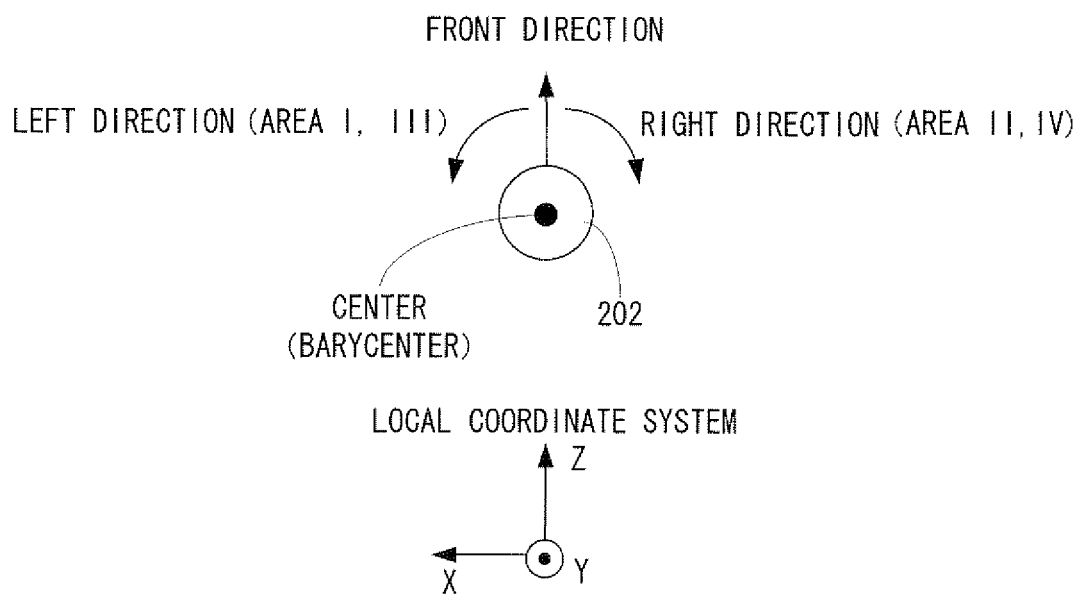
LOCAL COORDINATE SYSTEM FIG. 17
MOVING DIRECTION OF PLAYER OBJECT  (FORWARD DIRECTION : EXCEPT WHEN DESCENDING)
←FRONT DIRECTION                    ←FRONT DIRECTION
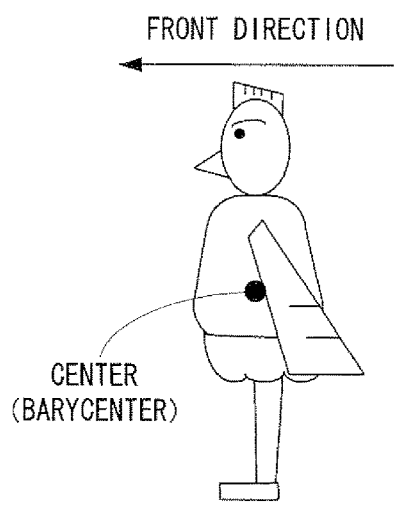                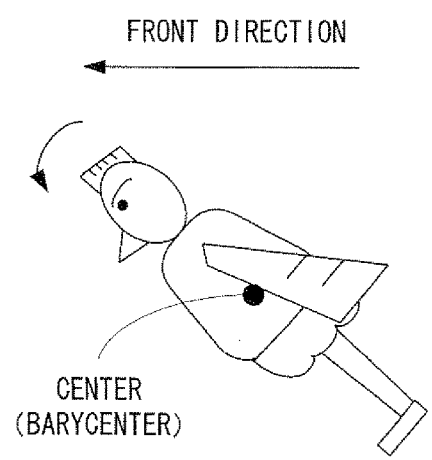
CENTER                              CENTER
(BARYCENTER)                        (BARYCENTER)
BARYCENTRIC POSITION :              BARYCENTRIC POSITION :
ORIGIN POINT O                      FORWARD (AREA I, II)
LOCAL COORDINATE SYSTEM             LOCAL COORDINATE SYSTEM
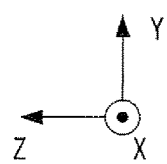                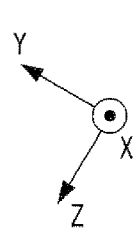

FIG. 18
MOVING DIRECTION OF PLAYER OBJECT (FORWARD DIRECTION : DURING DESCENDING)
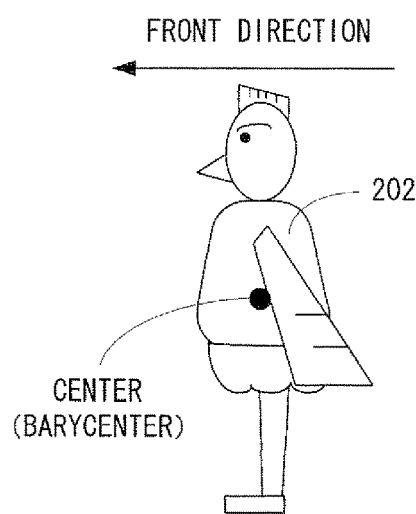
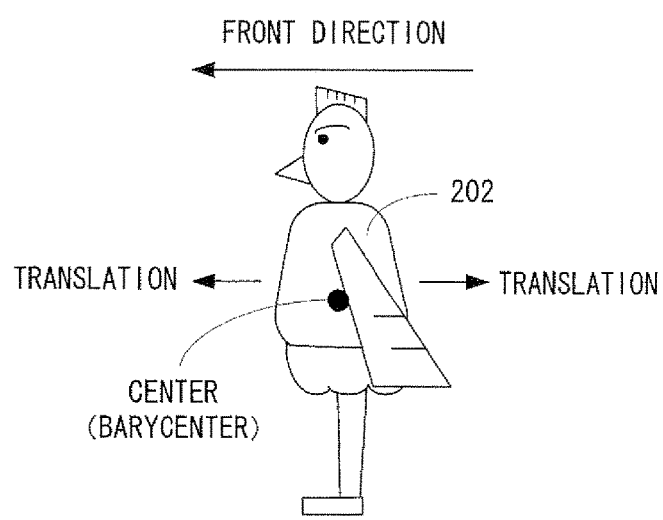
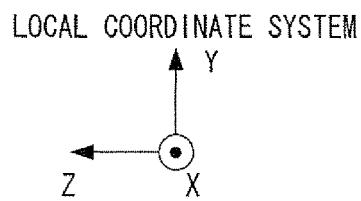
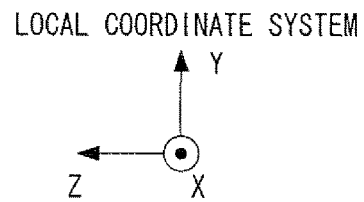

FIG. 21

| DATA MEMORY AREA 404 | |
|---|---|
| WEIGHT RATIO DATA BUFFER | 404a |
| IMAGE DATA | 404b |
| LARGE-FLAPPING ANIMATION DATA | 404c |
| SMALL-FLAPPING ANIMATION DATA | 404d |
| DESCENDING-TIME ANIMATION DATA | 404e |
| REFERENCE VALUE DATA | 404f |
| CURRENT LOAD VALUE DATA | 404g |
| BARYCENTRIC POSITION DATA | 404h |
| DURING-DESCENDING FLAG | 404i |
| WEIGHT-RATIO-DECLINING FLAG | 404j |
| ARM-RAISING-DETERMINATION FLAG | 404k |
| ARM-LOWERING-DETERMINATION FLAG | 404m |
| ARM-RAISING-ACCELERATION FLAG | 404n |
| ARM-LOWERING-ACCELERATION FLAG | 404p |
| LARGE-FLAPPING FLAG | 404q |
| SMALL-FLAPPING FLAG | 404r |
| LANDING-SUCCESSFUL FLAG | 404s |
| LANDING-UNSUCCESSFUL FLAG | 404t |
| GAME CLEAR FLAG | 404u |
| GAME OVER FLAG | 404v |
| ⋮ | |

STORAGE MEDIUM STORING INFORMATION PROCESSING PROGRAM, INFORMATION PROCESSING APPARATUS AND INFORMATION PROCESSING METHOD

CROSS REFERENCE OF RELATED APPLICATION

The disclosure of Japanese Patent Application No. 2009-112465 is incorporated herein by reference.

BACKGROUND OF THE INVENTION

Field of the Invention

The present invention relates to a storage medium storing an information processing program, an information processing apparatus, and an information processing method. More specifically, the present invention relates to a storage medium storing an information processing program, an information processing apparatus, and an information processing method which performs an operation by utilizing a load value indicating a load of a user.

Description of the Related Art

One example of the related art is disclosed in a Japanese Patent Application Laid-Open No. 2008-264195 [A63F 13/04, A63F 13/00] (Document 1) laid-open on Nov. 6, 2008. In the game apparatus of the Document 1, a player rides the legs on a support plate of a game controller which includes four load sensors, and a load value detected by the four load sensors is input as operation data. Accordingly, in the game apparatus, the game processing is executed on the basis of the load value input as operation data.

However, in the game apparatus shown in the Document 1, the game processing is executed only on the basis of the variation of the load value input as the operation data, so that the game relatively becomes simple. Thus, there is room for improvement of execution of many kinds of processing according to a variation of an input operation by a load value and enrichment of an interest to the game.

SUMMARY OF THE INVENTION

Therefore, it is a primary object of the present invention is to provide a novel storage medium storing an information processing program, a novel information processing apparatus, and a novel information processing method.

Another object of the present invention is to provide a storage medium storing an information processing program, an information processing apparatus, and an information processing method which are able to execute many kinds of processing in correspondence with a variation of an input operation by utilizing a load value.

The present invention employs following features in order to solve the above-described problems. It should be noted that reference numerals and the supplements inside the parentheses show one example of a corresponding relationship with the embodiments described later for easy understanding of the present invention, and do not limit the present invention.

A first invention is a storage medium storing an information processing program, the information processing program causes a computer to execute: a load value acquiring step for acquiring a load value indicating a load of a user on the basis of a signal from a load detecting apparatus, a cycle judging step for judging a cycle of a load variation of the user on the basis of the load value acquired by the load value acquiring step, and an information processing step for executing predetermined information processing on the basis of the cycle judged by the cycle judging step.

In the first invention, an information processing program causes a computer to execute a load value acquiring step (40, S3, S7), a cycle judging step (40, S121, S131), and an information processing step (40, S15, S17, S21, S23, S57, S75, S77). The load value acquiring step acquires a load value indicating a load of a user on the basis of a signal from a load detecting apparatus (36). The cycle judging step judges a cycle of a load variation of the user on the basis of the load value acquired by the load value acquiring step. The information processing step executes predetermined information processing on the basis of the cycle judged by the cycle judging step.

According to the first invention, the predetermined information processing is executed on the basis of the cycle of the load variation of the user, and therefore, it is possible to execute many kinds of processing according to the variation of the input operations by the load values.

A second invention is according to the first invention, and the information processing step executes at least first information processing or second information processing different from the first information processing on the basis of the cycle judged by the cycle judging step.

In the second invention, the information processing step executes at leas first information processing (S21, S23, S75, S77) or second information processing (S15, S17, S75, S77) different from the first information processing on the basis of the cycle judged by the cycle judging step.

According to the second invention, at least the two different information processing are performed on the basis of the cycle of the load variation of the user, so that it is possible to execute many kinds of processing according to the variation of the input operations by the load values.

A third invention is according to the second invention, and the information processing program causes a computer to further execute a condition determining step for determining whether or not the cycle judged by the cycle judging step satisfies a predetermined condition, and the information processing step executes the first information processing when the condition determining step determines that the cycle satisfies the predetermined condition, and executes the second information processing when the condition determining step determines that the cycle does not satisfy the predetermined condition.

In the third invention, an information processing program causes a computer to further execute a condition determining step (40, S137). The condition determining step determines whether or not the cycle judged by the cycle judging step satisfies a predetermined condition. The information processing step executes the first information processing when the condition determining step determines that the cycle satisfies the predetermined condition ("YES" in S137), and executes the second information processing when the condition determining step determines that the cycle does not satisfy the predetermined condition ("NO" in S137).

According to the third invention, it is possible to execute different information processing by merely determining whether or not the cycle of the load variation of the user satisfies the predetermined condition.

A fourth invention is according to the third invention, and the condition determining step determines whether or not a cycle of the cycle judged by the cycle judging step is equal to or more than a first predetermined value, and the information processing step executes the second information processing when the condition determining step determines that the frequency is equal to or more than the first predetermined value.

In the fourth invention, the condition determining step determines whether or not a frequency of the cycle judged by the cycle judging step is equal to or more than a first predetermined value. The information processing step executes the second information processing when the condition determining step determines that the frequency is equal to or more than the first predetermined value ("YES" in S137).

According to the fourth invention, it is possible to execute the second information processing by merely determining whether or not the frequency of the cycle of the load variation of the user is equal to or more than the threshold value.

A fifth invention is according to the third invention, and the cycle judging step judges the cycle on the basis of a frequency spectrum of the load variation of the user, the condition determining step determines whether or not the frequency of the cycle judged by the cycle judging step is a second predetermined value and a power spectrum of a frequency larger than the frequency is equal to or more than a maximum value of a spectrum noise, and the information processing step executes the second information processing when the condition determining step determines that the frequency is a second predetermined value and a power spectrum of a frequency larger than the frequency is equal to or more than a maximum value of a spectrum noise.

In the fifth invention, the cycle judging step, for example, judges the cycle on the basis of a frequency spectrum of the load variation of the user. Furthermore, the condition determining step determines whether or not the frequency of the cycle judged by the cycle judging step is a second predetermined value and a power spectrum of a frequency larger than the frequency is equal to or more than a maximum value of a spectrum noise. The information processing step executes the second information processing when the condition determining step determines that the frequency is a second predetermined value and a power spectrum of a frequency larger than the frequency is equal to or more than a maximum value of a spectrum noise ("YES" in S137).

According to the fifth invention, in a case that the cycle is judged on the basis of the frequency spectrum of the load variation of the user as well, by merely comparing the magnitude of the power spectrum with the maximum value of the spectrum noise, it is possible to execute the second information processing.

A sixth invention is according to the first invention, and the information processing program causes a computer to further execute a movement controlling step for controlling a magnitude of at least a moving distance or a moving velocity of an object displayed on a display screen on the basis of the load value acquired by the load acquiring step.

In the sixth invention, the information processing program causes a computer to further execute a movement controlling step (40, S25-S35, S36, S39, S93-S107). The movement controlling step controls a magnitude of at least a moving distance or a moving velocity of an object displayed on a display screen on the basis of the load value of the user. That is, the parameter as to the moving distance or the moving velocity is decided.

According to the sixth invention, the magnitude of the moving distance or the moving amount of the object is decided on the basis of the load value, and therefore, it is possible to execute a variety of processing in correspondence with the load value of the user, and control the movement of the object in correspondence with the load value.

A seventh invention is according to the sixth invention, and the movement controlling step increases the moving distance or the moving velocity of the object as an amplitude of the variation of the load value acquired by the load value acquiring step is large.

In the seventh invention, the movement controlling step increases the moving distance or the moving velocity of the object as an amplitude of the variation of the load value acquired by the load value acquiring step is large, that is, as the load variation of the user is large.

According to the seventh invention, as the load variation of the user is large, the moving distance or the moving velocity of the object is increased, and therefore, it is possible to control the movement of the object in accordance with the motion of the user.

An eighth invention is according to the sixth invention, and the movement controlling step increases the moving distance or the moving velocity of the object when the load value acquired by the load acquiring step is less than a predetermined value.

In the eighth invention, for example, the movement controlling step increases the moving distance or the moving velocity of the object when the load value acquired by the load acquiring step is less than a predetermined value. That is, when an unweight is made, the moving distance or the moving velocity of the object is increased.

According to the eighth invention, similar to the sixth invention, it is possible to execute a variety of processing in accordance with the load value of the user, and control the movement of the object in accordance with the load value.

A ninth invention is according to the sixth invention, and the movement controlling step increases the moving distance or the moving velocity of the object when the cycle of the variation of the load value acquired by the load acquiring step is long.

In the ninth invention, for example, the movement controlling step increases the moving distance or the moving velocity when the cycle of the variation of the load value acquired by the load acquiring step is long. That is, even when the user performs the same motion, if the motion is made largely, the moving distance or the moving velocity of the object is also increased in associated therewith.

According to the ninth invention, similar to the sixth invention, it is possible to execute a variety of processing in correspondence with the load value of the user, and control the movement of the object in correspondence with the load value.

A tenth invention is according to the sixth invention, and the information processing program causes a computer to further execute a barycentric position detecting step for detecting a barycentric position of the user on a two-dimensional plane on the basis of a signal from the load detecting apparatus, and the movement controlling step controls a moving direction of the object on the basis the barycentric position detected by the barycentric position detecting step.

In the tenth invention, the information processing program causes a computer to further execute a barycentric position detecting step (40, S9). The barycentric position detecting step detects a barycentric position of the user on a two-dimensional plane on the basis of a signal from the load detecting apparatus. The movement controlling step controls a moving direction of the object on the basis of the barycentric position detected by the barycentric position detecting step. That is, the parameter as to the moving direction is decided.

According to the tenth invention, the moving direction of the object is controlled according to the baricentric position, so that it is possible to control the moving direction of the object as well as the moving distance or the moving velocity depending on how to impose the load.

An eleventh invention is according to the tenth invention, and the object moves in the virtual space, and the movement controlling step decides the moving direction of the object according to different deciding processing between when the object moves to a predetermined direction and when the object moves to a direction other than the direction.

In the eleventh invention, the object moves in the virtual space, and the movement controlling step decides the moving direction of the object according to different deciding method between when the object moves to a predetermined direction ("YES" in S35) and when the object moves to a direction other than the direction ("NO" in S35).

According to the eleventh invention, the deciding method of the moving direction by the barycentric position is changed according to the moving direction of the object, so that it is possible to enrich a variation of the movement of the object.

A twelfth invention is according to the eleventh invention, and the movement controlling step decides a first moving direction as a moving direction of the object on the basis of the barycentric position detected by the barycentric position detecting step in a case that the object moves to the predetermined direction, and decides a second moving direction as a moving direction of the object on the basis of the barycentric position detected by the barycentric position detecting step in a case that the object moves to the direction other than the predetermined direction.

In the twelfth invention, for example, the movement controlling step decides a first moving direction as a moving direction of the object on the basis of the barycentric position detected by the barycentric position detecting step (S36) in a case that the object moves to the predetermined direction ("YES" in S35), and decides a second moving direction as a moving direction of the object on the basis of the barycentric position detected by the barycentric position detecting step (S39) in a case that the object moves to the direction other than the predetermined direction ("NO" in S35).

According to the twelfth invention, similar to the eleventh invention, it is possible to enrich a variation of the movement of the object.

A thirteenth invention is according to the first invention, and the information processing step changes at least a display manner of the object displayed on the display screen on the basis of the cycle judged by the cycle judging step.

In the thirteenth invention, the information processing step changes at least a display manner of the object displayed on the display screen on the basis of the cycle judged by the cycle judging step.

According to the thirteenth invention, the display manner of the object is changed on the basis of the cycle of the load value, and therefore, it is possible to execute many kinds of processing according to the variation of the input operations by the load values.

A fourteenth invention is according to the thirteenth invention, and the object is a moving image object, and the information processing step displays the moving image object on the display screen by a different animation on the basis of the cycle judged by the cycle judging step.

In the fourteenth invention, the object is a moving image object. The information processing step displays the moving image object on the display screen by a different animation on the basis of the cycle judged by the cycle judging step.

According to the fourteenth invention, it is possible to display the moving image object by a different animation in accordance with a variation of the input operations by the load values.

A fifteenth invention is according to the fourteenth invention, and the information processing step changes an updating velocity of an animation frame on the basis of the cycle judged by the cycle judging step and a frame number of the animation frame constructing of the animation.

In the fifteenth invention, the information processing step changes an updating velocity of an animation frame on the basis of the cycle judged by the cycle judging step and a frame number of the animation frame constructing of the animation According to the fifteenth invention, by changing the updating velocity of the animation frame, it is possible to synchronize the cycle of the load value with the animation.

A sixteenth invention is according to the first invention, and the information processing program causes a computer to further execute a ratio calculating step for calculating a ratio of the load value acquired by the load value acquiring step to a body weight value of the user, and the cycle judging step judges a cycle as to the variation of the ratio calculated by the ratio calculating step.

In the sixteenth invention, the information processing program causes a computer to further execute a ratio calculating step (40, S91). The ratio calculating step calculates a ratio of the load value to the body weight value of the user. The cycle judging step judges a cycle as to the variation of the ratio calculated by the ratio calculating step.

According to the sixteenth invention, a cycle of the ratio of the load value to the body weight value of the user is calculated to thereby judge the cycle, capable of absorbing the difference in the body weight between the users.

A seventeenth invention is an information processing apparatus and comprises a load value acquiring means for acquiring a load value indicating a load of a user on the basis of a signal from a load detecting apparatus, a cycle judging means for judging a cycle of a load variation of the user on the basis of the load value acquired by the load value acquiring means, and an information processing means for executing predetermined information processing on the basis of the cycle judged by the cycle judging means.

In the seventeenth invention as well, similar to the first invention, it is possible to execute many kinds of processing according to the variation of the input operations by the load values.

An eighteenth invention is an information processing method of an information processing apparatus, and following steps of: (a) acquiring a load value indicating a load of a user on the basis of a signal from a load detecting apparatus, (b) judging a cycle of a load variation of the user on the basis of the load value acquired by step (a), and (c) executing predetermined information processing on the basis of the cycle judged by the step (b).

In the eighteenth invention, similar to the first invention, it is possible to execute many kinds of processing according to the variation of the input operations by the load values.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 11 is an illustrative view showing one example of a game screen to be displayed on a monitor shown in FIG. 1;

FIG. 12 is an illustrative view showing an example of a motion of a player when the virtual game of this embodiment is played;

FIG. 16 is an illustrative view showing a barycentric position of the player detected by the load controller and a direction of a player object corresponding thereto;

FIG. 17 is an illustrative view showing a direction of the player object except when the player object is falling in correspondence with the barycentric position of the player detected by the load controller;

FIG. 18 is an illustrative view showing a direction of the player object when the player object is falling in correspondence with the barycentric position of the player detected by the load controller;

FIG. 21 is an illustrative view showing a detailed content of a data memory area shown in FIG. 20;

DETAILED DESCRIPTION OF THE PREFERRED EMBODIMENTS

Figure 1:
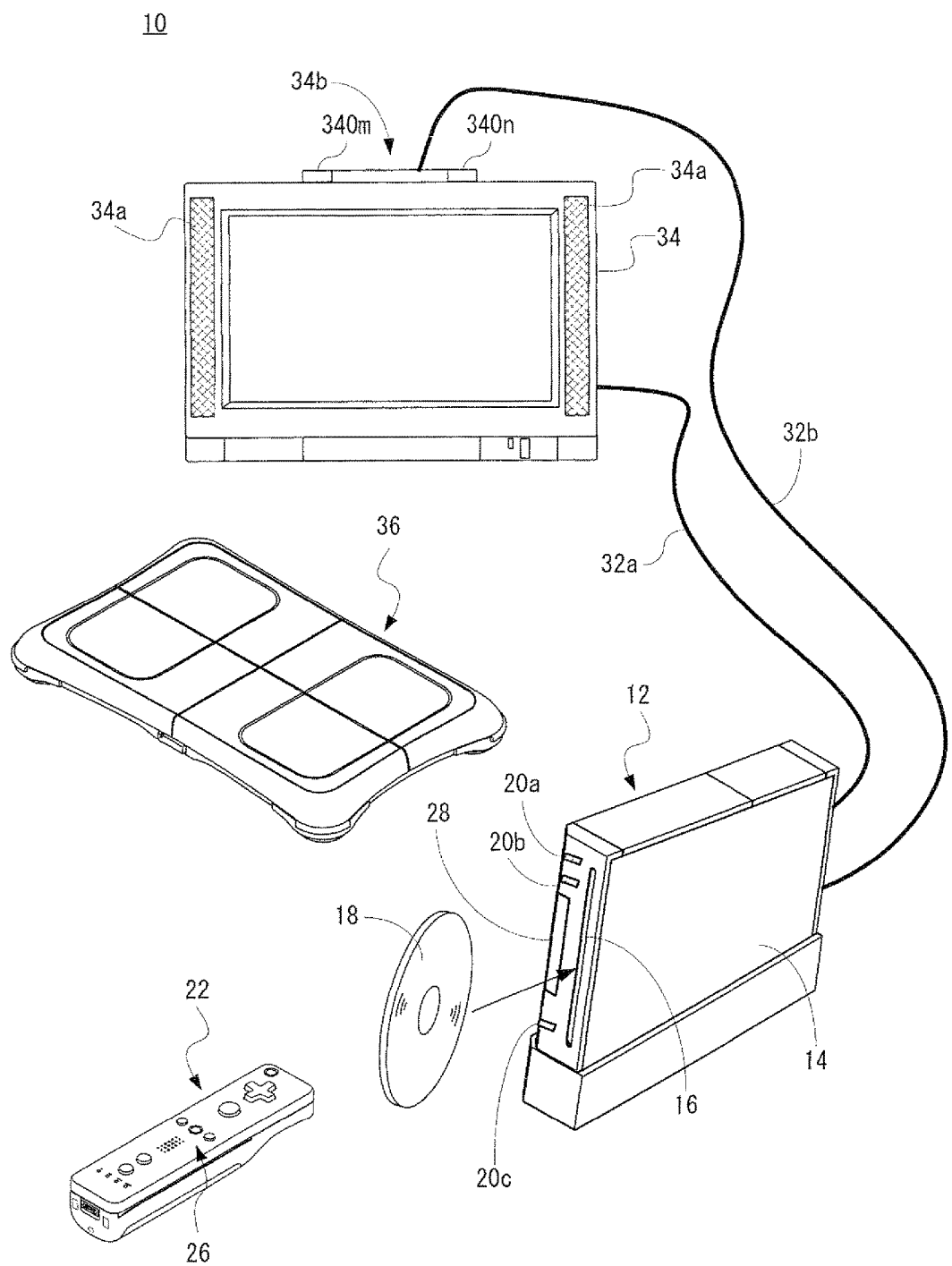
FIG. 1 is an illustrative view showing one embodiment of a game system of the present invention.

Referring to FIG. 1, a game system 10 of one embodiment of the present invention includes a video game apparatus (hereinafter, simply referred to as "game apparatus") 12, a controller 22 and a load controller 36. Although illustration is omitted, the game apparatus 12 of this embodiment is designed such that it can be connected to four controllers (22, 36) at the maximum. Furthermore, the game apparatus 12 and the respective controllers (22, 36) are connected in a wireless manner. The wireless communication is executed according to a Bluetooth (registered trademark) standard, for example, but may be executed by other standards such as infrared rays, a wireless LAN.

The game apparatus 12 includes a roughly rectangular parallelepiped housing 14, and the housing 14 is furnished with a disk slot 16 on a front surface. An optical disk 18 as one example of an information storage medium storing game program, etc. as one example of an information processing program is inserted from the disk slot 16 to be loaded into a disk drive 54 (see FIG. 2) within the housing 14. Around the disk slot 16, an LED and a light guide plate are arranged so as to be light on or off in accordance with various processing.

Furthermore, on a front surface of the housing 14 of the game apparatus 12, a power button 20a and a reset button 20b are provided at the upper part thereof, and an eject button 20c is provided below them. In addition, a connector cover for external memory card 28 is provided between the reset button 20b and the eject button 20c, and in the vicinity of the disk slot 16. Inside the connector cover for external memory card 28, an connector for memory card 62 (see FIG. 2) is provided, through which an external memory card (hereinafter simply referred to as a "memory card") not shown is inserted. The memory card is employed for loading the game program, etc. read from the optical disk 18 to temporarily store it, storing (saving) game data (result data or proceeding data of the game) of the game played by means of the game system 10, and so forth. It should be noted that storing the game data described above may be performed on an internal memory, such as a flash memory 44 (see FIG. 2) inside the game apparatus 12 in place of the memory card. Also, the memory card may be utilized as a backup memory of the internal memory.

It should be noted that a general-purpose SD card can be employed as a memory card, but other general-purpose memory cards, such as MemoryStick, Multimedia Card (registered trademark) can be employed.

The game apparatus 12 has an AV cable connector 58 (see FIG. 2) on the rear surface of the housing 14, and by utilizing the AV cable connector 58, a monitor 34 and a speaker 34*a* are connected to the game apparatus 12 through an AV cable 32*a*. The monitor 34 and the speaker 34*a* are typically a color television receiver, and through the AV cable 32*a*, a video signal from the game apparatus 12 is input to a video input terminal of the color television, and a sound signal from the game apparatus 12 is input to a sound input terminal. Accordingly, a game image of a three-dimensional (3D) video game, for example, is displayed on the screen of the color television (monitor) 34, and stereo game sound, such as a game music, a sound effect, etc. is output from right and left speakers 34*a*. Around the monitor 34 (on the top side of the monitor 34, in this embodiment), a marker unit 34*b* including two infrared ray LEDs (markers) 340*m* and 340*n* is provided. The marker unit 34*b* is connected to the game apparatus 12 through a power source cable 32*b*. Accordingly, the marker unit 34*b* is supplied with power from the game apparatus 12. Thus, the markers 340*m* and 340*n* emit lights ahead of the monitor 34.

Furthermore, the power of the game apparatus 12 is applied by means of a general AC adapter (not illustrated). The AC adapter is inserted into a standard wall socket for home use, and the game apparatus 12 transforms the house current (commercial power supply) to a low DC voltage signal suitable for driving. In another embodiment, a battery may be utilized as a power supply.

In the game system 10, a user or a player turns the power of the game apparatus 12 on for playing the game (or applications other than the game). Then, the user selects an appropriate optical disk 18 storing a program of a video game (or other applications the player wants to play), and loads the optical disk 18 into the disk drive 54 of the game apparatus 12. In response thereto, the game apparatus 12 starts to execute a video game or other applications on the basis of the program recorded in the optical disk 18. The user operates the controller 22 in order to apply an input to the game apparatus 12. For example, by operating any one of the operating buttons of the input means 26, a game or other application is started. Besides the operation on the input means 26, by moving the controller 22 itself, it is possible to move a moving image object (player object) in different directions or change the perspective of the user (camera position) in a 3-dimensional game world.

Figure 2:
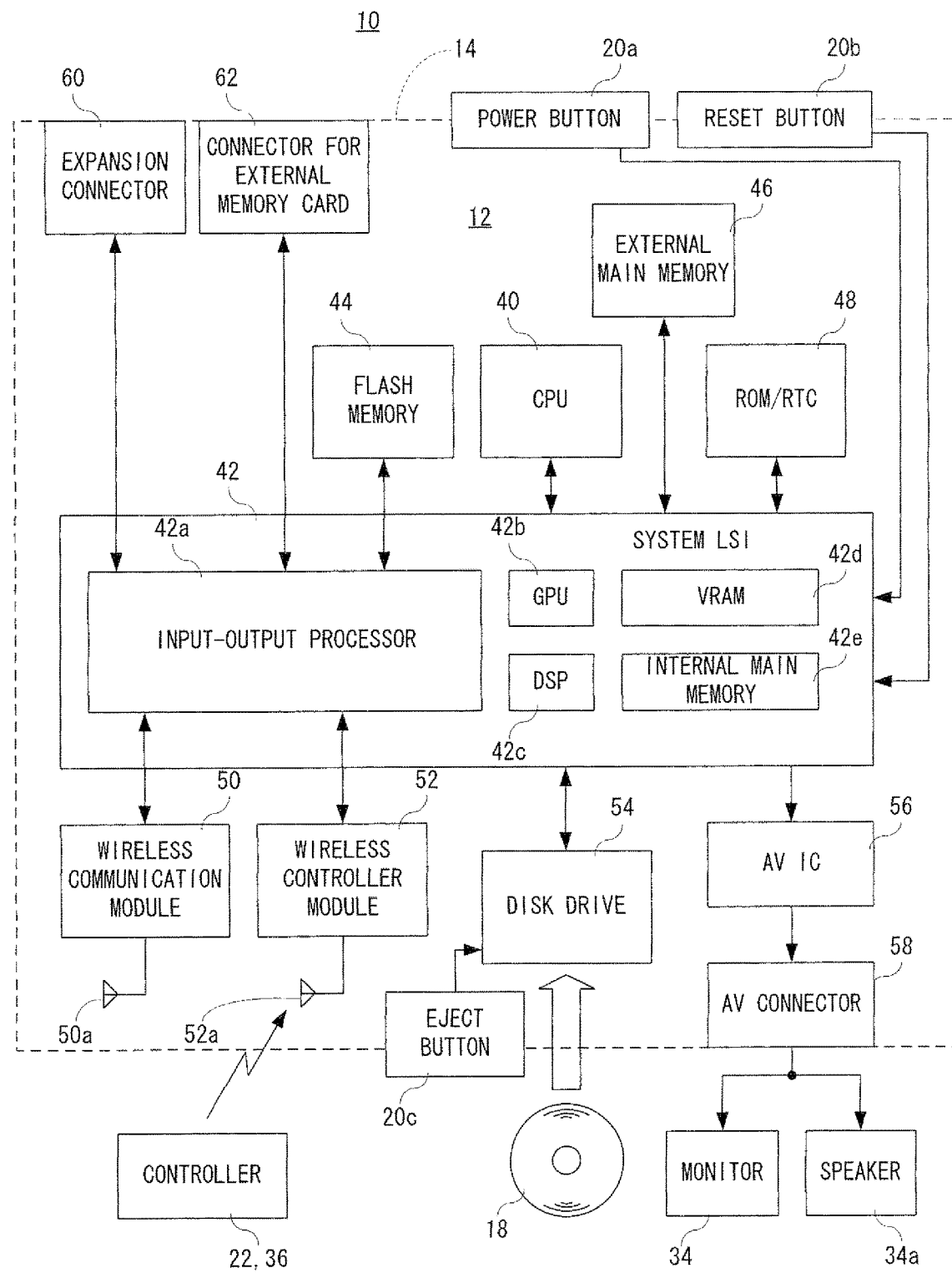
FIG. 2 is a block diagram showing an electric configuration of the game system shown in FIG. 1.

FIG. 2 is a block diagram showing an electric configuration of the video game system 10 shown in FIG. 1 embodiment. Although illustration is omitted, respective components within the housing 14 are mounted on a printed board. As shown in FIG. 2, the game apparatus 12 has a CPU 40. The CPU 40 functions as a game processor. The CPU 40 is connected with a system LSI 42. The system LSI 42 is connected with an external main memory 46, a ROM/RTC 48, a disk drive 54, and an AV IC 56.

The external main memory 46 is utilized as a work area and a buffer area of the CPU 40 by storing programs like a game program, etc. and various data. The ROM/RTC 48, which is a so-called boot ROM, is incorporated with a program for activating the game apparatus 12, and is provided with a time circuit for counting a time. The disk drive 54 reads program data, texture data, etc. from the optical disk 18, and writes them in an internal main memory 42*e* described later or the external main memory 46 under the control of the CPU 40.

The system LSI 42 is provided with an input-output processor 42*a*, a GPU (Graphics Processor Unit) 42*b*, a DSP (Digital Signal Processor) 42*c*, a VRAM 42*d* and an internal main memory 42*e*, and these are connected with one another by internal buses although illustration is omitted.

The input-output processor (I/O processor) 42*a* executes transmitting and receiving data and executes downloading of the data. Reception and transmission and download of the data are explained in detail later.

The GPU 42*b* is made up of a part of a drawing means, and receives a graphics command (construction command) from the CPU 40 to generate game image data according to the command. Additionally, the CPU 40 applies an image generating program required for generating game image data to the GPU 42*b* in addition to the graphics command.

Although illustration is omitted, the GPU 42*b* is connected with the VRAM 42*d* as described above. The GPU 42*b* accesses the VRAM 42*d* to acquire data (image data: data such as polygon data, texture data, etc.) required to execute the construction command. Additionally, the CPU 40 writes image data required for drawing to the VRAM 42*d* via the GPU 42*b*. The GPU 42*b* accesses the VRAM 42*d* to create game image data for drawing.

In this embodiment, a case that the GPU 42*b* generates game image data is explained, but in a case of executing an arbitrary application except for the game application, the GPU 42*b* generates image data as to the arbitrary application.

Furthermore, the DSP 42*c* functions as an audio processor, and generates audio data corresponding to a sound, a voice, music, or the like to be output from the speaker 34*a* by means of the sound data and the sound wave (tone) data stored in the internal main memory 42*e* and the external main memory 46.

The game image data and audio data generated as described above are read by the AV IC 56, and output to the monitor 34 and the speaker 34*a* via the AV connector 58. Accordingly, a game screen is displayed on the monitor 34, and a sound (music) necessary for the game is output from the speaker 34*a*.

Furthermore, the input-output processor 42*a* is connected with a flash memory 44, a wireless communication module 50 and a wireless controller module 52, and is also connected with an expansion connector 60 and a connector for memory card 62. The wireless communication module 50 is connected with an antenna 50*a*, and the wireless controller module 52 is connected with an antenna 52*a*.

The input-output processor 42*a* can communicate with other game apparatuses and various servers to be connected to a network via a wireless communication module 50. It should be noted that it is possible to directly communicate with another game apparatus without going through the network. The input-output processor 42*a* periodically accesses the flash memory 44 to detect the presence or absence of data (referred to as data to be transmitted) being required to be transmitted to a network, and transmits it to the network via the wireless communication module 50 and the antenna 50*a* in a case that data to be transmitted is present. Furthermore, the input-output processor 42*a* receives data (referred to as received data) transmitted from another game apparatuses via the network, the antenna 50*a* and the wireless communication module 50, and stores the received data in the flash memory 44. If the received data does not satisfy a predetermined condition, the reception data is abandoned as it is. In addition, the input-output processor 42*a* can receive data (download data) downloaded from the download server via the network, the antenna 50*a* and the wireless communication module 50, and store the download data in the flash memory 44.

Furthermore, the input-output processor 42*a* receives input data transmitted from the controller 22 and the load controller 36 via the antenna 52*a* and the wireless controller module 52, and (temporarily) stores it in the buffer area of the internal main memory 42e or the external main memory 46. The input data is erased from the buffer area after being utilized in game processing by the CPU 40.

In this embodiment, as described above, the wireless controller module 52 makes communications with the controller 22 and the load controller 36 in accordance with Bluetooth standards.

Furthermore, for the sake of the drawings, FIG. 2 collectively shows the controller 22 and the load controller 36.

In addition, the input-output processor 42a is connected with the expansion connector 60 and the connector for memory card 62. The expansion connector 60 is a connector for interfaces, such as USB, SCSI, etc., and can be connected with medium such as an external storage, and peripheral devices such as another controller. Furthermore, the expansion connector 60 is connected with a cable LAN adaptor, and can utilize the cable LAN in place of the wireless communication module 50. The connector for memory card 62 can be connected with an external storage like a memory card. Thus, the input-output processor 42a, for example, accesses the external storage via the expansion connector 60 and the connector for memory card 62 to store and read the data.

Although a detailed description is omitted, as shown in FIG. 1, the game apparatus 12 (housing 14) is furnished with the power button 20a, the reset button 20b, and the eject button 20c. The power button 20a is connected to the system LSI 42. When the power button 20a is turned on, the system LSI 42 sets a mode of a normal energized state (referred to as "normal mode") in which the respective components of the game apparatus 12 are supplied with power through an AC adapter not shown. On the other hand, when the power button 20a is turned off, the system LSI 42 sets a mode in which a part of the components of the game apparatus 12 is supplied with power, and the power consumption is reduced to minimum (hereinafter referred to as "standby mode"). In this embodiment, in a case that the standby mode is set, the system LSI 42 issues an instruction to stop supplying the power to the components except for the input-output processor 42a, the flash memory 44, the external main memory 46, the ROM/RTC 48 and the wireless communication module 50, and the wireless controller module 52. Accordingly, the standby mode is a mode in which the CPU 40 never executes an application.

Although the system LSI 42 is supplied with power even in the standby mode, supply of clocks to the GPU 42b, the DSP 42c and the VRAM 42d are stopped so as not to be driven, realizing reduction in power consumption.

Although illustration is omitted, inside the housing 14 of the game apparatus 12, a fan is provided for excluding heat of the IC, such as the CPU 40, the system LSI 42, etc. to outside. In the standby mode, the fan is also stopped.

However, in a case that the standby mode is not desired to be utilized, when the power button 20a is turned off, by making the standby mode unusable, the power supply to all the circuit components are completely stopped.

Furthermore, switching between the normal mode and the standby mode can be performed by turning on and off the power switch 26h of the controller 22 by remote control. If the remote control is not performed, setting is made such that the power supply to the wireless controller module 52 is not performed in the standby mode.

The reset button 20b is also connected with the system LSI 42. When the reset button 20b is pushed, the system LSI 42 restarts the activation program of the game apparatus 12.

The eject button 20c is connected to the disk drive 54. When the eject button 20c is pushed, the optical disk 18 is ejected from the disk drive 54.

Figure 3:
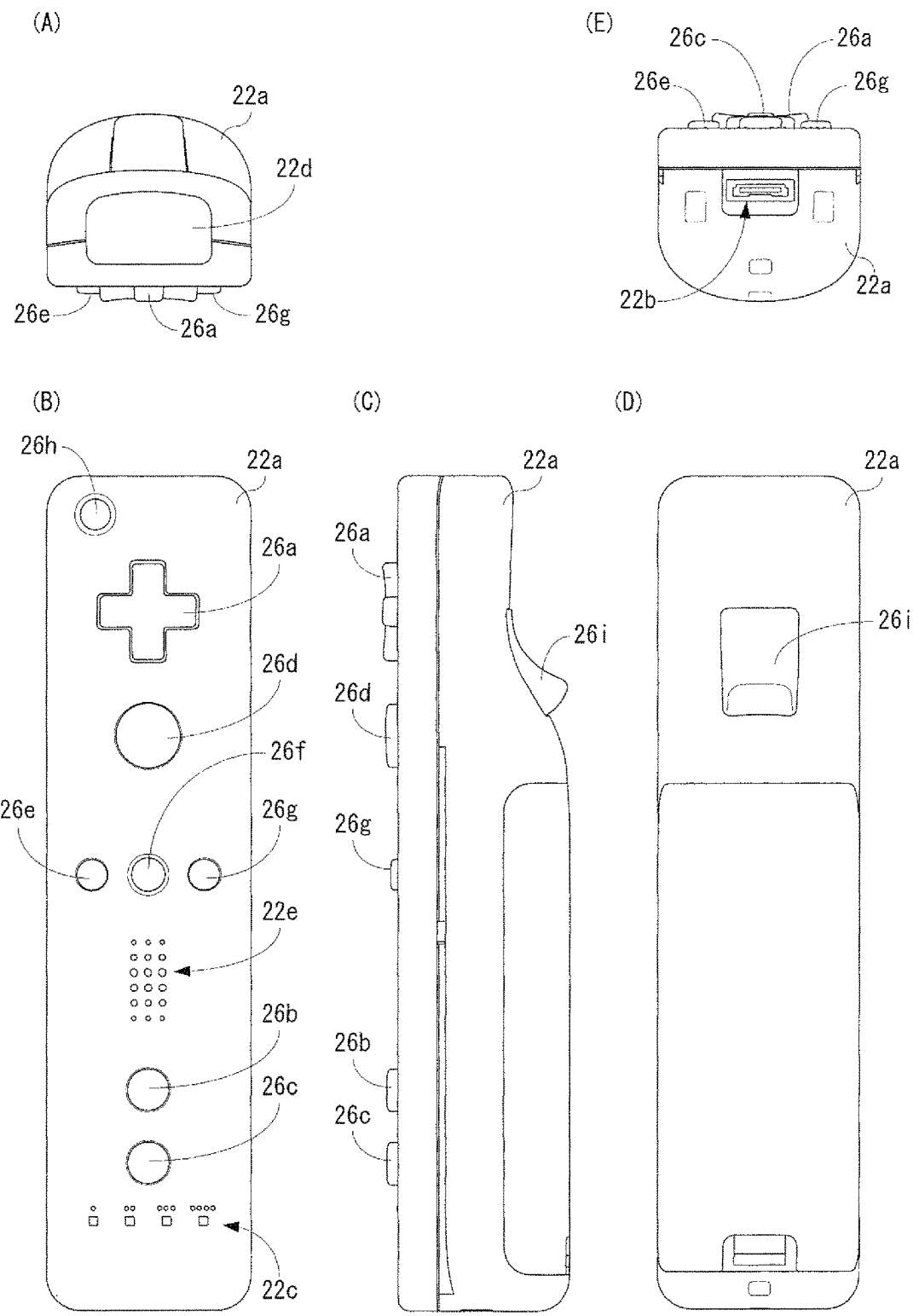
FIG. 3 is an illustrative view showing an appearance of a controller shown in FIG. 1.

Each of FIG. 3(A) to FIG. 3(E) shows one example of an external appearance of the controller 22. FIG. 3(A) shows a front end surface of the controller 22, FIG. 3(B) shows a top surface of the controller 22, FIG. 3(C) shows a right side surface of the controller 22, FIG. 3(D) shows a lower surface of the controller 22, and FIG. 3(E) shows a back end surface of the controller 22.

Referring to FIG. 3(A) and FIG. 3(E), the controller 22 has a housing 22a formed by plastic molding, for example. The housing 22a is formed into an approximately rectangular parallelepiped shape and has a size to be held by one hand of a user. The housing 22a (controller 22) is provided with the input means (a plurality of buttons or switches) 26. Specifically, as shown in FIG. 3(B), on an upper face of the housing 22a, there are provided a cross key 26a, a 1 button 26b, a 2 button 26c, an A button 26d, a − button 26e, a HOME button 26f, a + button 26g and a power switch 26h. Moreover, as shown in FIG. 3(C) and FIG. 3(D), an inclined surface is formed on a lower surface of the housing 22a, and a B-trigger switch 26i is formed on the inclined surface.

The cross key 26a is a four directional push switch, including four directions of front (or upper), back (or lower), right and left operation parts. By operating any one of the operation parts, it is possible to instruct a moving direction of a character or object (player character or player object) that is be operable by a player or instruct the moving direction of a cursor.

The 1 button 26b and the 2 button 26c are respectively push button switches, and are used for a game operation, such as adjusting a viewpoint position and a viewpoint direction on displaying the 3D game image, i.e. a position and an image angle of a virtual camera. Alternatively, the 1 button 26b and the 2 button 26c can be used for the same operation as that of the A-button 26d and the B-trigger switch 26i or an auxiliary operation.

The A-button switch 26d is the push button switch, and is used for causing the player character or the player object to take an action other than that instructed by a directional instruction, specifically arbitrary actions such as hitting (punching), throwing, grasping (acquiring), riding, and jumping, etc. For example, in an action game, it is possible to give an instruction to jump, punch, move a weapon, and so forth. Also, in a roll playing game (RPG) and a simulation RPG, it is possible to give an instruction to acquire an item, select and determine the weapon and command, and so forth.

The − button 26e, the HOME button 26f, the + button 26g, and the power supply switch 26h are also push button switches. The − button 26e is used for selecting a game mode. The HOME button 26f is used for displaying a game menu (menu screen). The + button 26g is used for starting (re-starting) or pausing the game. The power supply switch 26h is used for turning on/off a power supply of the game apparatus 12 by remote control.

In this embodiment, note that the power supply switch for turning on/off the controller 22 itself is not provided, and the controller 22 is set at on-state by operating any one of the switches or buttons of the input means 26 of the controller 22, and when not operated for a certain period of time (30 seconds, for example) or more, the controller 22 is automatically set at off-state.

The B-trigger switch 26i is also the push button switch, and is mainly used for inputting a trigger such as shooting and designating a position selected by the controller 22. In a case that the B-trigger switch 26*i* is continued to be pushed, it is possible to make movements and parameters of the player object constant. In a fixed case, the B-trigger switch 26*i* functions in the same way as a normal B-button, and is used for canceling the action determined by the A-button 26*d*.

As shown in FIG. 3(E), an external expansion connector 22*b* is provided on a back end surface of the housing 22*a*, and as shown in FIG. 3(B), an indicator 22*c* is provided on the top surface and the side of the back end surface of the housing 22*a*. The external expansion connector 22*b* is utilized for connecting another expansion controller not shown. The indicator 22*c* is made up of four LEDs, for example, and shows identification information (controller number) of the controller 22 corresponding to the lighting LED by lighting any one of the four LEDs, and shows the remaining amount of power of the controller 22 depending on the number of LEDs to be emitted.

In addition, the controller 22 has an imaged information arithmetic section 80 (see FIG. 4), and as shown in FIG. 3(A), on the front end surface of the housing 22*a*, a light incident opening 22*d* of the imaged information arithmetic section 80 is provided. Furthermore, the controller 22 has a speaker 86 (see FIG. 4), and the speaker 86 is provided inside the housing 22*a* at the position corresponding to a sound release hole 22*e* between the 1 button 26*b* and the HOME button 26*f* on the tope surface of the housing 22*a* as shown in FIG. 3(B).

Note that, the shape of the controller 22 and the shape, number and setting position of each input means 26 shown in FIG. 3(A) to FIG. 3(E) are simply examples, and needless to say, even if they are suitably modified, the present invention can be realized.

Figure 4:
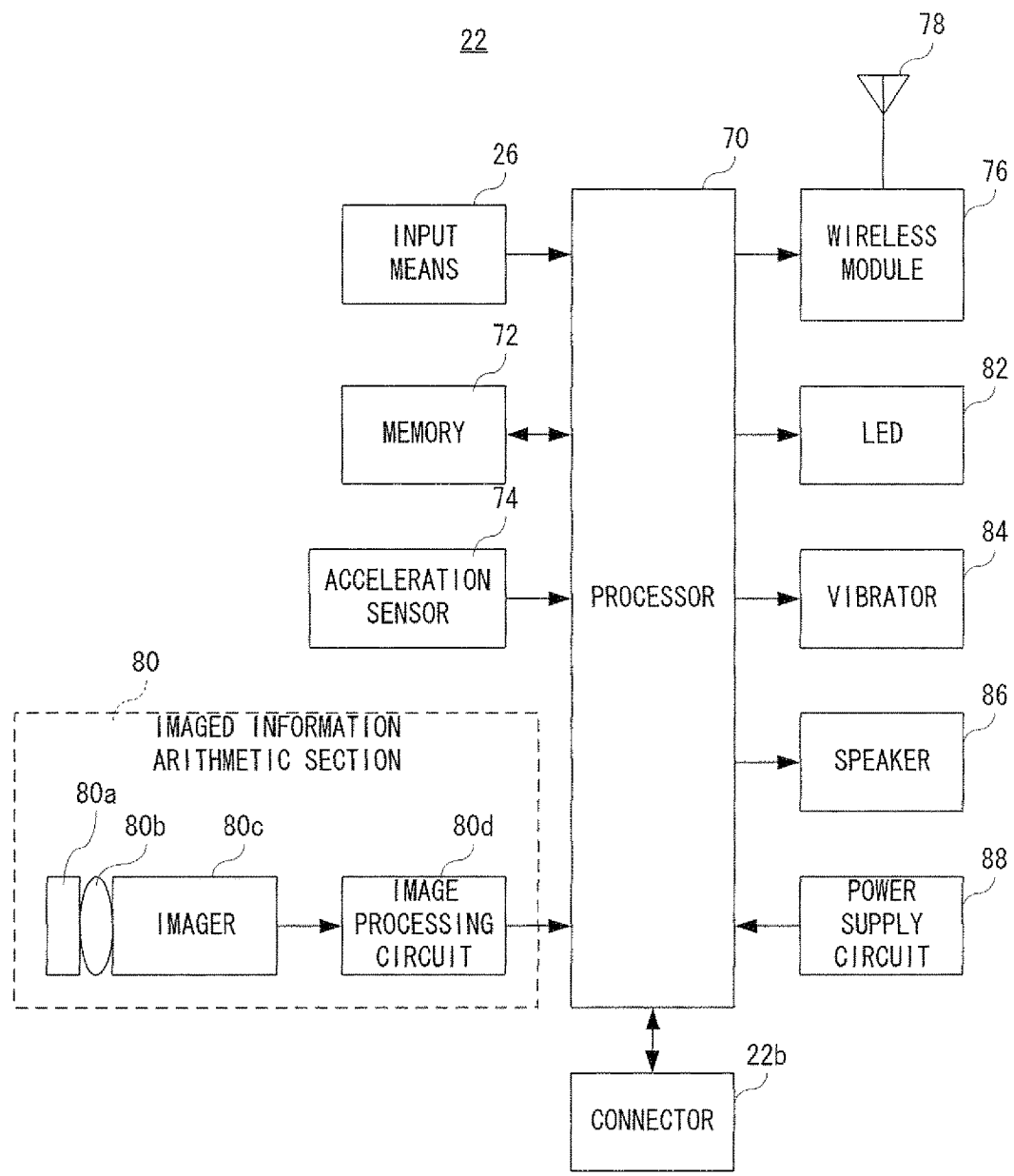
FIG. 4 is a block diagram showing an electric configuration of the controller shown in FIG. 3.

FIG. 4 is a block diagram showing an electric configuration of the controller 22. Referring to FIG. 4, the controller 22 includes a processor 70, and the processor 70 is connected with the external expansion connector 22*b*, the input means 26, a memory 72, an acceleration sensor 74, a wireless communication module 76, the imaged information arithmetic section 80, an LED 82 (the indicator 22*c*), an vibrator 84, a speaker 86, and a power supply circuit 88 by an internal bus (not shown). Moreover, an antenna 78 is connected to the wireless communication module 76.

The processor 70 is in charge of an overall control of the controller 22, and transmits (inputs) information (input information) inputted by the input means 26, the acceleration sensor 74, and the imaged information arithmetic section 80 as input data, to the game apparatus 12 via the wireless communication module 76 and the antenna 78. At this time, the processor 70 uses the memory 72 as a working area or a buffer area.

An operation signal (operation data) from the aforementioned input means 26 (26*a* to 26*i*) is inputted to the processor 70, and the processor 70 stores the operation data once in the memory 72.

Moreover, the acceleration sensor 74 detects each acceleration of the controller 22 in directions of three axes of vertical direction (y-axial direction), lateral direction (x-axial direction), and forward and rearward directions (z-axial direction). The acceleration sensor 74 is typically an acceleration sensor of an electrostatic capacity type, but the acceleration sensor of other type may also be used.

For example, the acceleration sensor 74 detects the accelerations (ax, ay, and az) in each direction of x-axis, y-axis, z-axis for each first predetermined time, and inputs the data of the acceleration (acceleration data) thus detected in the processor 70. For example, the acceleration sensor 74 detects the acceleration in each direction of the axes in a range from −2.0 g to 2.0 g (g indicates a gravitational acceleration. The same thing can be said hereafter.) The processor 70 detects the acceleration data given from the acceleration sensor 74 for each second predetermined time, and stores it in the memory 72 once. The processor 70 creates input data including at least one of the operation data, acceleration data and marker coordinate data as described later, and transmits the input data thus created to the game apparatus 12 for each third predetermined time (5 msec, for example).

In this embodiment, although omitted in FIG. 3(A) to FIG. 3(E), the acceleration sensor 74 is provided inside the housing 22*a* and in the vicinity on the circuit board where the cross key 26*a* is arranged.

The wireless communication module 76 modulates a carrier of a predetermined frequency by the input data, by using a technique of Bluetooth, for example, and emits its weak radio wave signal from the antenna 78. Namely, the input data is modulated to the weak radio wave signal by the wireless communication module 76 and transmitted from the antenna 78 (controller 22). The weak radio wave signal is received by the radio controller module 52 provided to the aforementioned game apparatus 12. The weak radio wave thus received is subjected to demodulating and decoding processing. This makes it possible for the game apparatus 12 (CPU 40) to acquire the input data from the controller 22. Then, the CPU 40 performs game processing, following the input data and the program (game program).

In addition, as described above, the controller 22 is provided with the imaged information arithmetic section 80. The imaged information arithmetic section 80 is made up of an infrared rays filter 80*a*, a lens 80*b*, an imager 80*c*, and an image processing circuit 80*d*. The infrared rays filter 80*a* passes only infrared rays from the light incident from the front of the controller 22. As described above, the markers 340*m* and 340*n* placed near (around) the display screen of the monitor 34 are infrared LEDs for outputting infrared lights ahead of the monitor 34. Accordingly, by providing the infrared rays filter 80*a*, it is possible to image the image of the markers 340*m* and 340*n* more accurately. The lens 80*b* condenses the infrared rays passing thorough the infrared rays filter 80*a* to emit them to the imager 80*c*. The imager 80*c* is a solid imager, such as a CMOS sensor and a CCD, for example, and images the infrared rays condensed by the lens 80*b*. Accordingly, the imager 80*c* images only the infrared rays passing through the infrared rays filter 80*a* to generate image data. Hereafter, the image imaged by the imager 80*c* is called an "imaged image". The image data generated by the imager 80*c* is processed by the image processing circuit 80*d*. The image processing circuit 80*d* calculates a position of an object to be imaged (markers 340*m* and 340*n*) within the imaged image, and outputs each coordinate value indicative of the position to the processor 70 as imaged data for each fourth predetermined time. It should be noted that a description of the process in the image processing circuit 80*d* is made later.

Figure 5:
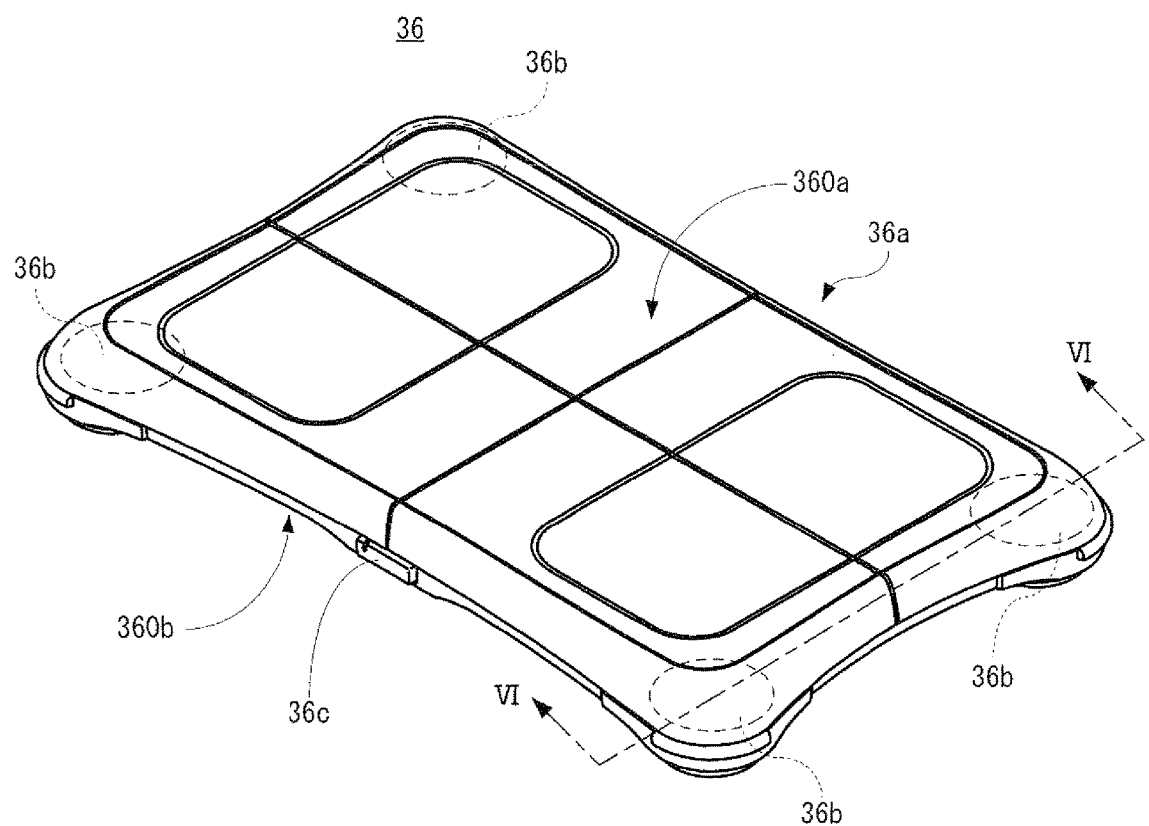
FIG. 5 is an illustrative view showing an appearance of a load controller shown in FIG. 1.

FIG. 5 is a perspective view showing an appearance of the load controller 36 shown in FIG. 1. As shown in FIG. 5, the load controller 36 includes a board 36*a* on which a player rides (a player puts his or her foot) and at least four load sensors 36*b* that detect loads applied on the board 36*a*. The load sensors 36*b* are accommodated in the board 36*a* (see FIG. 6 and FIG. 7), and the arrangement of the load sensors 36*b* is shown by dotted line in FIG. 5.

The board 36*a* is formed in a substantially rectangle, and the board 36*a* has a substantially rectangular shape when viewed from above. For example, a short side of the rectangular is set in the order of 30 cm, and a long side thereof is set in the order of 50 cm. An upper surface of the board 36a on which the player rides is formed in flat. Side faces at four corners of the board 36a are formed so as to be partially projected in a cylindrical shape.

In the board 36a, the four load sensors 36b are arranged at predetermined intervals. In the embodiment, the four load sensors 36b are arranged in peripheral portions of the board 36a, specifically, at the four corners. The interval between the load sensors 36b is set an appropriate value such that player's intention can accurately be detected for the load applied to the board 36a in a game manipulation.

Figure 6:
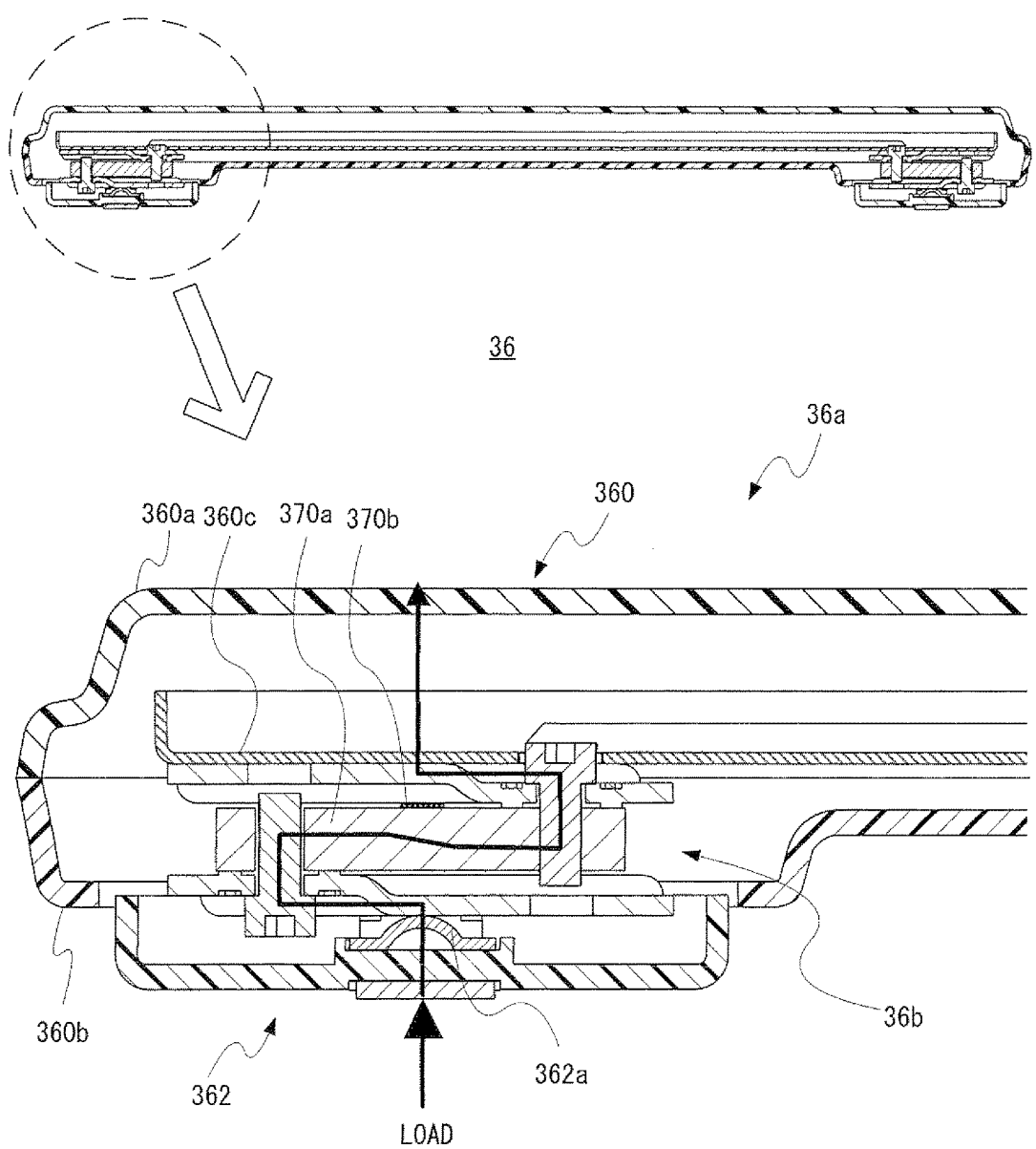
FIG. 6 is a cross-sectional view of the load controller shown in FIG. 5.

FIG. 6 shows a sectional view taken along the line VI-VI of the load controller 36 shown in FIG. 5, and also shows an enlarged corner portion disposed in the load sensor 36b. As can be seen from FIG. 6, the board 36a includes a support plate 360 on which the player rides and legs 362. The legs 362 are provided at positions where the load sensors 36b are arranged. In the embodiment, because the four load sensors 36b are arranged at four corners, the four legs 362 are provided at the four corners. The leg 362 is formed in a cylindrical shape with bottom by, e.g., plastic molding. The load sensor 36b is placed on a spherical part 362a provided in the bottom of the leg 362. The support plate 360 is supported by the leg 362 while the load sensor 36b is interposed.

The support plate 360 includes an upper-layer plate 360a that constitutes an upper surface and an upper side face, a lower-layer plate 360b that constitutes a lower surface and a lower side face, and an intermediate-layer plate 360c provided between the upper-layer plate 360a and the lower-layer plate 360b. For example, the upper-layer plate 360a and the lower-layer plate 360b are formed by plastic molding and integrated with each other by bonding. For example, the intermediate-layer plate 360c is formed by pressing one metal plate. The intermediate-layer plate 360c is fixed onto the four load sensors 36b. The upper-layer plate 360a has a lattice-shaped rib (not shown) in a lower surface thereof, and the upper-layer plate 360a is supported by the intermediate-layer plate 360c while the rib is interposed.

Accordingly, when the player rides on the board 36a, the load is transmitted to the support plate 360, the load sensor 36b, and the leg 362. As shown by an arrow in FIG. 6, reaction generated from a floor by the input load is transmitted from the legs 362 to the upper-layer plate 360a through the spherical part 362a, the load sensor 36b, and the intermediate-layer plate 360c.

The load sensor 36b is formed by, e.g., a strain gage (strain sensor) type load cell, and the load sensor 36b is a load transducer that converts the input load into an electric signal. In the load sensor 36b, a strain inducing element 370a is deformed to generate a strain according to the input load. The strain is converted into a change in electric resistance by a strain sensor 370b adhering to the strain inducing element 370a, and the change in electric resistance is converted into a change in voltage. Accordingly, the load sensor 36b outputs a voltage signal indicating the input load from an output terminal.

Other types of load sensors such as a folk vibrating type, a string vibrating type, an electrostatic capacity type, a piezoelectric type, a magneto-striction type, and gyroscope type may be used as the load sensor 36b.

Returning to FIG. 5, the load controller 36 is further provided with a power button 36c. When the power button 36c is turned on, power is supplied to the respective circuit components (see FIG. 7) of the load controller 36. It should be noted that the load controller 36 may be turned on in accordance with an instruction from the game apparatus 12. Furthermore, the power of the load controller 36 is turned off when a state that the player does not ride continues for a given time of period (30 seconds, for example). Alternatively, the power may be turned off when the power button 36c is turned on in a state that the load controller 36 is activated.

Figure 7:
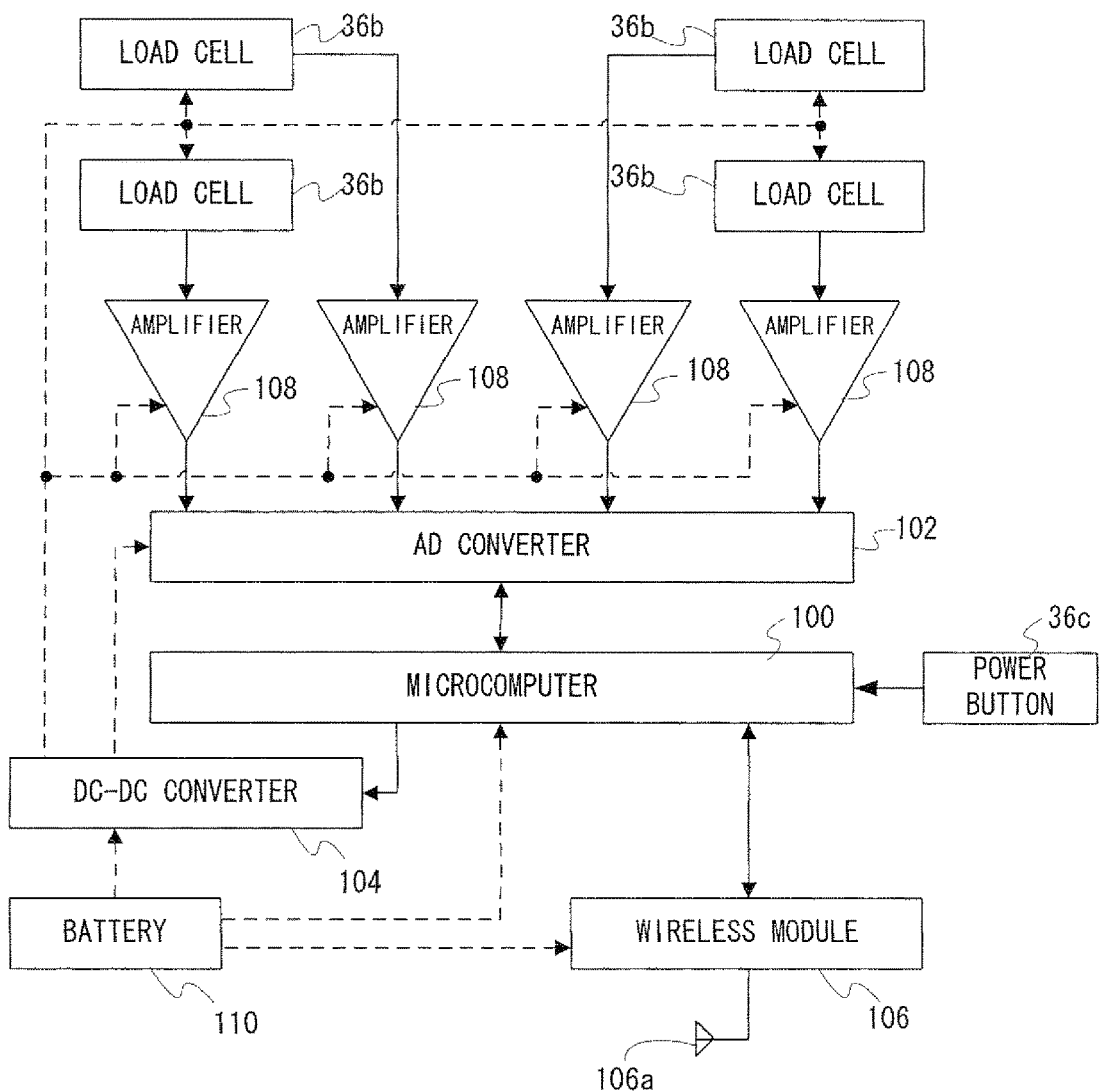
FIG. 7 is a block diagram showing an electric configuration of the load controller shown in FIG. 5.

FIG. 7 is a block diagram showing an example of an electric configuration of the load controller 36. In FIG. 7, the signal and communication stream are indicated by solid-line arrows, and electric power supply is indicated by broken-line arrows.

The load controller 36 includes a microcomputer 100 that controls an operation of the load controller 36. The microcomputer 100 includes a CPU, a ROM and a RAM (not shown), and the CPU controls the operation of the load controller 36 according to a program stored in the ROM.

The microcomputer 100 is connected with the power button 36c, the A/D converter 102, a DC-DC converter 104 and a wireless module 106. In addition, the wireless module 106 is connected with an antenna 106a. Furthermore, the four load sensors 36b are displayed as a load cell 36b in FIG. 3. Each of the four load sensors 36b is connected to the A/D converter 102 via an amplifier 108.

Furthermore, the load controller 36 is provided with a battery 110 for power supply. In another embodiment, an AC adapter in place of the battery is connected to supply a commercial power supply. In such a case, a power supply circuit has to be provided for converting alternating current into direct current and stepping down and rectifying the direct voltage in place of the DC-DC converter. In this embodiment, the power supply to the microcomputer 100 and the wireless module 106 are directly made from the battery. That is, power is constantly supplied to a part of the component (CPU) inside the microcomputer 100 and the wireless module 106 to thereby detect whether or not the power button 36c is turned on, and whether or not a power-on (load detection) command is transmitted from the game apparatus 12. On the other hand, power from the battery 110 is supplied to the load sensor 36b, the A/D converter 102 and the amplifier 108 via the DC-DC converter 104. The DC-DC converter 104 converts the voltage level of the direct current from the battery 110 into a different voltage level, and applies it to the load sensor 36b, the A/D converter 102 and the amplifier 108.

The electric power may be supplied to the load sensor 36b, the A/D converter 102, and the amplifier 108 if needed such that the microcomputer 100 controls the DC-DC converter 104. That is, when the microcomputer 100 determines that a need to operate the load sensor 36b to detect the load arises, the microcomputer 100 may control the DC-DC converter 104 to supply the electric power to each load sensor 36b, the A/D converter 102, and each amplifier 108.

Once the electric power is supplied, each load sensor 36b outputs a signal indicating the input load. The signal is amplified by each amplifier 108, and the analog signal is converted into digital data by the A/D converter 102. Then, the digital data is inputted to the microcomputer 100. Identification information on each load sensor 36b is imparted to the detection value of each load sensor 36b, allowing for distinction among the detection values of the load sensors 36b. Thus, the microcomputer 100 can obtain the pieces of data indicating the detection values of the four load sensors 36b at the same time.

On the other hand, when the microcomputer 100 determines that the need to operate the load sensor 36b does not arise, i.e., when the microcomputer 100 determines it is not the time the load is detected, the microcomputer 100 controls the DC-DC converter 104 to stop the supply of the electric power to the load sensor 36*b*, the A/D converter 102 and the amplifier 108. Thus, in the load controller 36, the load sensor 36*b* is operated to detect the load only when needed, so that the power consumption for detecting the load can be suppressed.

Typically, the time the load detection is required shall means the time the game apparatus 12 (FIG. 1) obtains the load data. For example, when the game apparatus 12 requires the load information, the game apparatus 12 transmits a load obtaining command to the load controller 36. When the microcomputer 100 receives the load obtaining command from the game apparatus 12, the microcomputer 100 controls the DC-DC converter 104 to supply the electric power to the load sensor 36*b*, etc., thereby detecting the load. On the other hand, when the microcomputer 100 does not receive the load obtaining command from the game apparatus 12, the microcomputer 100 controls the DC-DC converter 104 to stop the electric power supply. Alternatively, the microcomputer 100 determines it is the time the load is detected at regular time intervals, and the microcomputer 100 may control the DC-DC converter 104. In the case when the microcomputer 100 periodically obtains the load, information on the period may initially be imparted from the game machine 12 to the microcomputer 100 or previously stored in the microcomputer 100.

The data indicating the detection value from the load sensor 36*b* is transmitted as the manipulation data (input data) of the load controller 36 from the microcomputer 100 to the game apparatus 12 (FIG. 1) through the wireless module 106 and the antenna 106*a*. For example, in the case where the command is received from the game apparatus 12 to detect the load, the microcomputer 100 transmits the detection value data to the game apparatus 12 when receiving the detection value data of the load sensor 36*b* from the A/D converter 102. Alternatively, the microcomputer 100 may transmit the detection value data to the game apparatus 12 at regular time intervals.

Additionally, the wireless module 106 can communicate by a radio standard (Bluetooth, wireless LAN, etc.) the same as that of the radio controller module 52 of the game apparatus 12. Accordingly, the CPU 40 of the game apparatus 12 can transmit a load obtaining command to the load controller 36 via the radio controller module 52, etc. The microcomputer 100 of the load controller 36 can receive a command from the game apparatus 12 via the wireless module 106 and the antenna 106*a*, and transmit input data including load detecting values (or load calculating values) of the respective load sensors 36*b* to the game apparatus 12.

Figure 8:
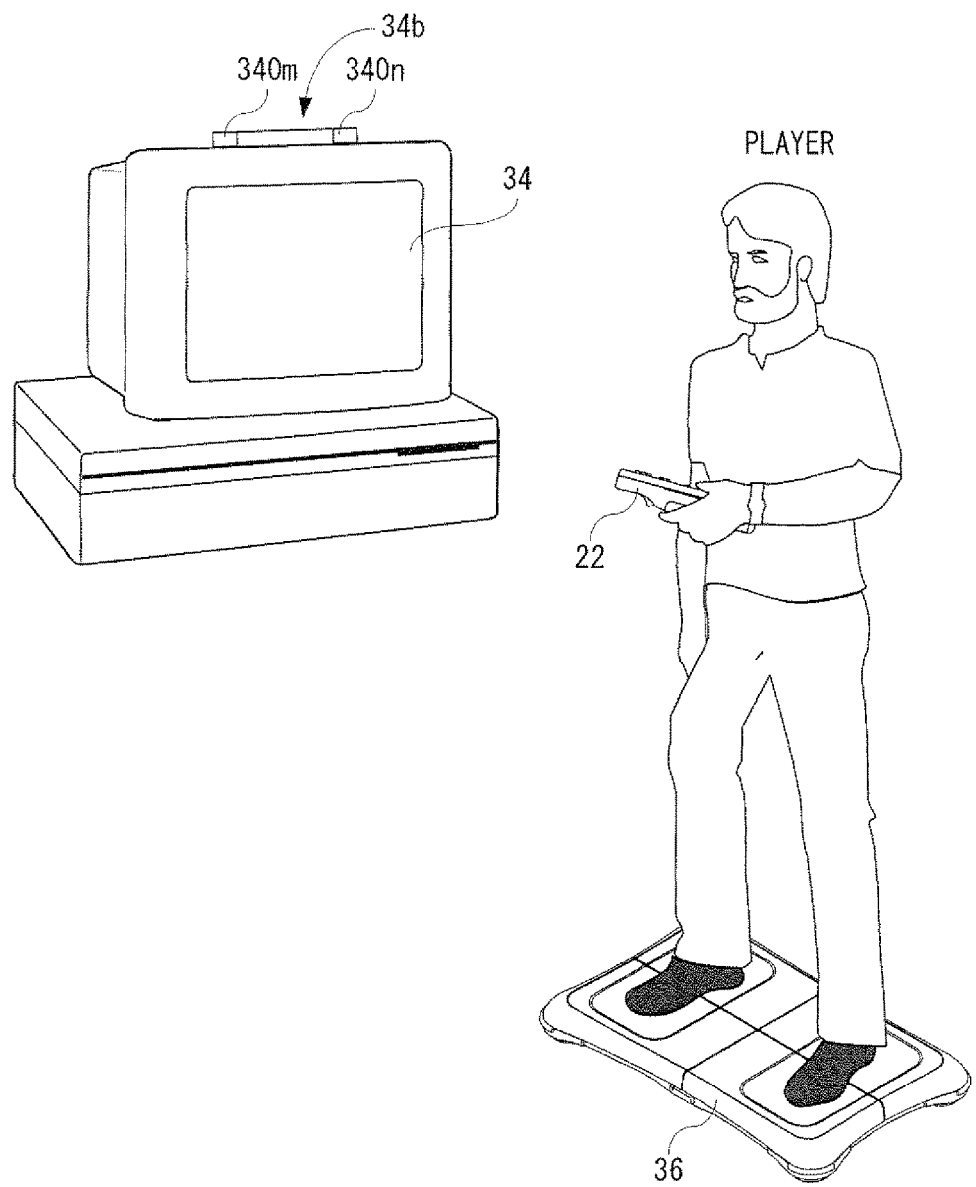
FIG. 8 is an illustrative view showing a situation in which a virtual game is played by utilizing the controller and the load controller shown in FIG. 1.

FIG. 8 is an illustrative view roughly explaining a state in which the virtual game is played using the controller 22 and load controller 36. As shown in FIG. 8, when playing the virtual game by utilizing the controller 22 and the load controller 36 in the video game system 10, the player grasps the controller 22 in one hand while riding on the load controller 36. Exactly, the player grasps the controller 22 with the front-end surface (the side of the incident port 22*d* to which the light imaged by the imaged information arithmetic section 80 is incident) of the controller 22 orientated toward the markers 340*m* and 340*n* while riding on the load controller 36. However, as can be seen from FIG. 1, the markers 340*m* and 340*n* are disposed in parallel with the crosswise direction of the screen of the monitor 34. In this state of things, the player changes the position on the screen indicated by the controller 22 or the distance between the controller 22 and the marker 340*m* or 340*n* to perform the game manipulation.

It should be noted that in FIG. 8, the load controller 36 is vertically placed such that the player turns sideways with respect to the screen of the monitor 34, but depending on the game, the load controller 36 may be horizontally placed such that the player turns front with respect to the screen of the monitor 34.

Figure 9:
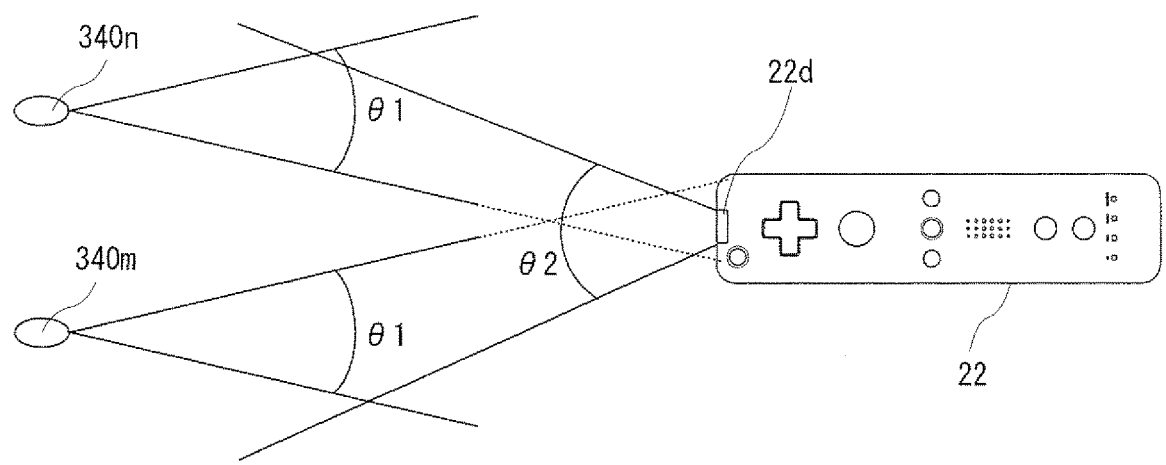
FIG. 9 is an illustrative view showing viewing angles of markers and the controller shown in FIG. 1.

FIG. 9 is an illustrative view for explaining view angles of the markers 340*m* and 340*n* and controller 22. As shown in FIG. 9, the markers 340*m* and 340*n* each emit the infrared ray in a range of a view angle θ1. The imager 80*c* of the imaged information arithmetic section 80 can receive the incident light in a range of a view angle θ2 around a visual axis direction of the controller 22. For example, each of the markers 340*m* and 340*n* has the view angle θ1 of 34° (half-value angle), and the imager 80*c* has the view angle θ2 of 41°. The player grasps the controller 22 such that the imager 80*c* is set to the position and orientation at which the infrared rays can be received from the two markers 340*m* and 340*n*. Specifically, the player grasps the controller 22 such that at least one of the markers 340*m* and 340*n* exists in the view angle θ2 of the imager 80*c* while the controller 22 exists in the view angle θ1 of at least one of the markers 340*m* and 340*n*. In this state, the controller 22 can detect at least one of the markers 340*m* and 340*n*. The player can change the position and orientation of the controller 22 to perform the game manipulation in the range satisfying this state.

In the case where the position and orientation of the controller 22 are out of the range, the game manipulation cannot be performed based on the position and orientation of the controller 22. Hereinafter the range is referred to as "manipulable range".

Figure 10:
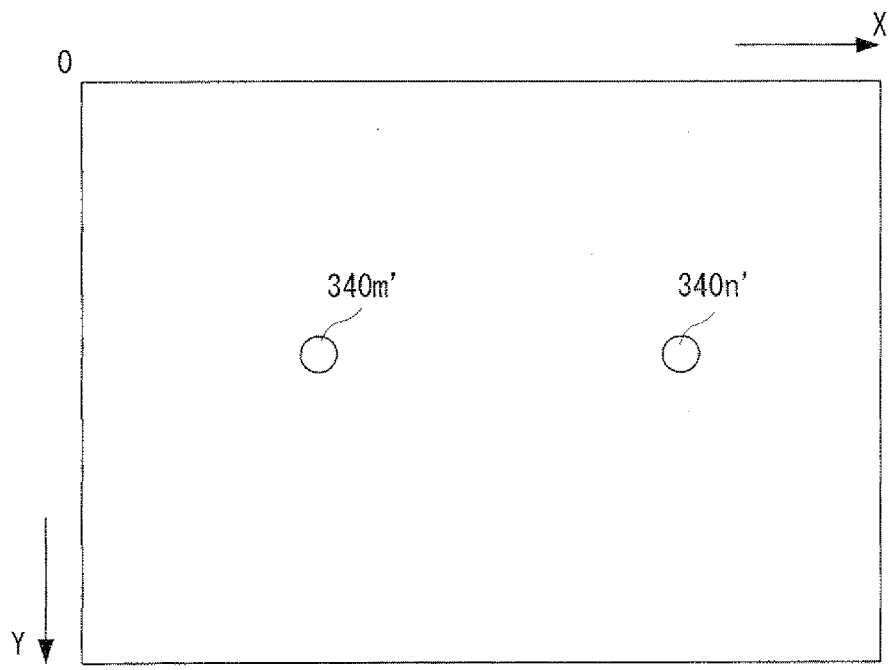
FIG. 10 is an illustrative view showing one example of an imaged image including object images.

In the case where the controller 22 is grasped in the manipulable range, the images of the markers 340*m* and 340*n* are taken by the imaged information arithmetic section 80. That is, the imaged image obtained by the imager 80*c* includes the images (target images) of the markers 340*m* and 340*n* that are of the imaging target. FIG. 10 is a view showing an example of the imaged image including the target image. Using the image data of the imaged image including the target image, the image processing circuit 80*d* computes the coordinate (marker coordinate) indicating the position in the imaged images of the markers 340*m* and 340*n*.

Because the target image appears as a high-brightness portion in the image data of the imaged image, the image processing circuit 80*d* detects the high-brightness portion as a candidate of the target image. Then, the image processing circuit 80*d* determines whether or not the high-brightness portion is the target image based on the size of the detected high-brightness portion. Sometimes the imaged image includes not only images 340*m*' and 340*n*' corresponding to the two markers 340*m* and 340*n* that are of the target image but also the image except for the target image due to the sunlight from a window or a fluorescent light. The processing of the determination whether or not the high-brightness portion is the target image is performed in order to distinguish the images 340*m*' and 340*n*' of the makers 340*m* and 340*n* that are of the target image from other images to exactly detect the target image. Specifically, the determination whether or not the detected high-brightness portion has the size within a predetermined range is made in the determination processing. When the high-brightness portion has the size within the predetermined range, it is determined that the high-brightness portion indicates the target image. On the contrary, when the high-brightness portion does not have the size within the predetermined range, it is determined that the high-brightness portion indicates the image except for the target image.

Then, the image processing circuit 80*d* computes the position of the high-brightness portion for the high-brightness portion in which it is determined indicate the target image as a result of the determination processing. Specifically, a position of the center of gravity of the high-brightness portion is computed. Hereinafter, the coordinate of the position of the center of gravity is referred to as marker coordinate. The position of the center of gravity can be computed in more detail compared with resolution of the imager 80*c*. At this point, it is assumed that the image taken by the imager 80*c* has the resolution of 126×96 and the position of the center of gravity is computed in a scale of 1024×768. That is, the marker coordinate is expressed by an integer number of (0, 0) to (1024, 768).

The position in the imaged image is expressed by a coordinate system (XY-coordinate system) in which an origin is set to an upper left of the imaged image, a downward direction is set to a positive Y-axis direction, and a rightward direction is set to a positive X-axis direction.

In the case where the target image is correctly detected, two marker coordinates are computed because the two high-brightness portions are determined as the target image by the determination processing. The image processing circuit 80*d* outputs the pieces of data indicating the two computed marker coordinates. As described above, the outputted pieces of marker coordinate data are added to the input data by the processor 70 and transmitted to the game apparatus 12.

When the game apparatus 12 (CPU 40) detects the marker coordinate data from the received input data, the game apparatus 12 can compute the position (indicated coordinate) indicated by the controller 22 on the screen of the monitor 34 and the distances between the controller 22 and the markers 340*m* and 340*n* based on the marker coordinate data. Specifically, the position toward which the controller 22 is orientated, i.e., the indicated position is computed from the position at the midpoint of the two marker coordinates. The distance between the target images in the imaged image is changed according to the distances between the controller 22 and the markers 340*m* and 340*n*, and therefore, by computing the distance between the marker coordinates, the game apparatus 12 can compute the current distances between the controller 22 and the markers 340*m* and 340*n*.

As described above, in a case that the virtual game is played by utilizing the controller 22 and the load controller 36, game processing can be executed on the basis of a load value detected in the load controller 36. In this embodiment, when the virtual game is started, prior to starting of the main part, load values of the four load sensors 36*b* in a state the player is in a static state are detected by the load controller 36, from the detected four load values, a body weight value of the player is calculated (measured), the measured body weight value is set as a reference value (stored in the main memory 42*e* or 46), and the game processing is executed on the basis of the set reference value and the load value detected during execution of the virtual game (total value of the load values detected by the four load sensors 36*b* in this embodiment), for example. That is, the body weight value of the player becomes a reference value in a case that the game processing is executed. Here, in the virtual game of this embodiment, in order to eliminate advantage and disadvantage due to the difference in weight of the player, the game processing is executed according to the value (hereinafter referred to as "weight ratio") obtained by dividing the current load value by the reference value.

FIG. 11(A) and FIG. 11(B) each shows an example of a game screen 200 to be displayed on the monitor 34 in a case of playing the virtual game of this embodiment. For example, FIG. 11(A) shows the game screen 200 when the player object 202 flies in the sky with its wings flapping (during normal flying). Furthermore, FIG. 11(B) shows the game screen 200 when the player object 202 descends with its wings spread widely in an upstanding state almost in order to land in a non player object 204 (during descending). As shown in FIG. 11(A) and FIG. 11(B), on the game screen 200, the player object 202 is displayed, and a plurality of non player objects 204 are displayed. The player object (game character) 202 is an object (moving image object) imitating a bird. The non player object 204 is an object as a target to be landed by the player object 202.

In the virtual game, the player object 202 moves (flies) according to an operation by the player, and aims at a final target position (goal) while landing in the plurality of non player objects 204. For example, when the player object 202 arrives at the goal within a time limit via all of the non player objects 204 to be landed, the game is to be cleared. On the other hand, when the time limit expires before the player object 202 arrives at the goal, when a certain period of time (10 seconds, for example) elapses after the player object 202 falls in the sea surrounding the non player object 204, or when the player object 202 falls by fixed number of times (three times, for example), the game is over.

During the game, the player rides on the load controller 36, and moves his or her both hands up and down as if a bird flaps (performs a flapping operation). Thereupon, the load value detected by the load controller 36 is varied. Accordingly, the weight ratio WR is also varied. Based on the variation of the weight ratio WR, the movement of the player object 202 is controlled. In this embodiment, the moving amount (moving velocity) of the player object 202 is controlled depending on the strength (change amount of the weight ratio WR) of the swing of the hands (arms) when the player performs a flapping motion, and the moving direction of the player object 202 is controlled in correspondence with a barycentric position of the player on the load controller 36.

More specifically, as shown in FIG. 12(A), the player largely spreads both of the hands on the load controller 36, and performs a motion of largely swinging the both hands up and down with centering on the shoulder (a motion of largely flapping), or as shown in FIG. 12(B), the player small spreads both of the hands on the load controller 36, and performs a motion of swinging the forearms up and down with centering on the elbows (motion of small flapping).

Although illustration is omitted, when the player performs a motion of largely flapping (large-flapping motion), the player object 202 is also displayed by the animation of a large-flapping motion on the monitor 34, and when the player performs a motion of small flapping (small-flapping motion), the player object 202 is also displayed by the animation of a small-flapping motion on the monitor 34. Although illustration is omitted, the animation of the large-flapping motion is set to make the movable range (movable range in the up and down direction) of the wings wider (larger) in comparison with the animation of the small-flapping motion.

Figure 13:
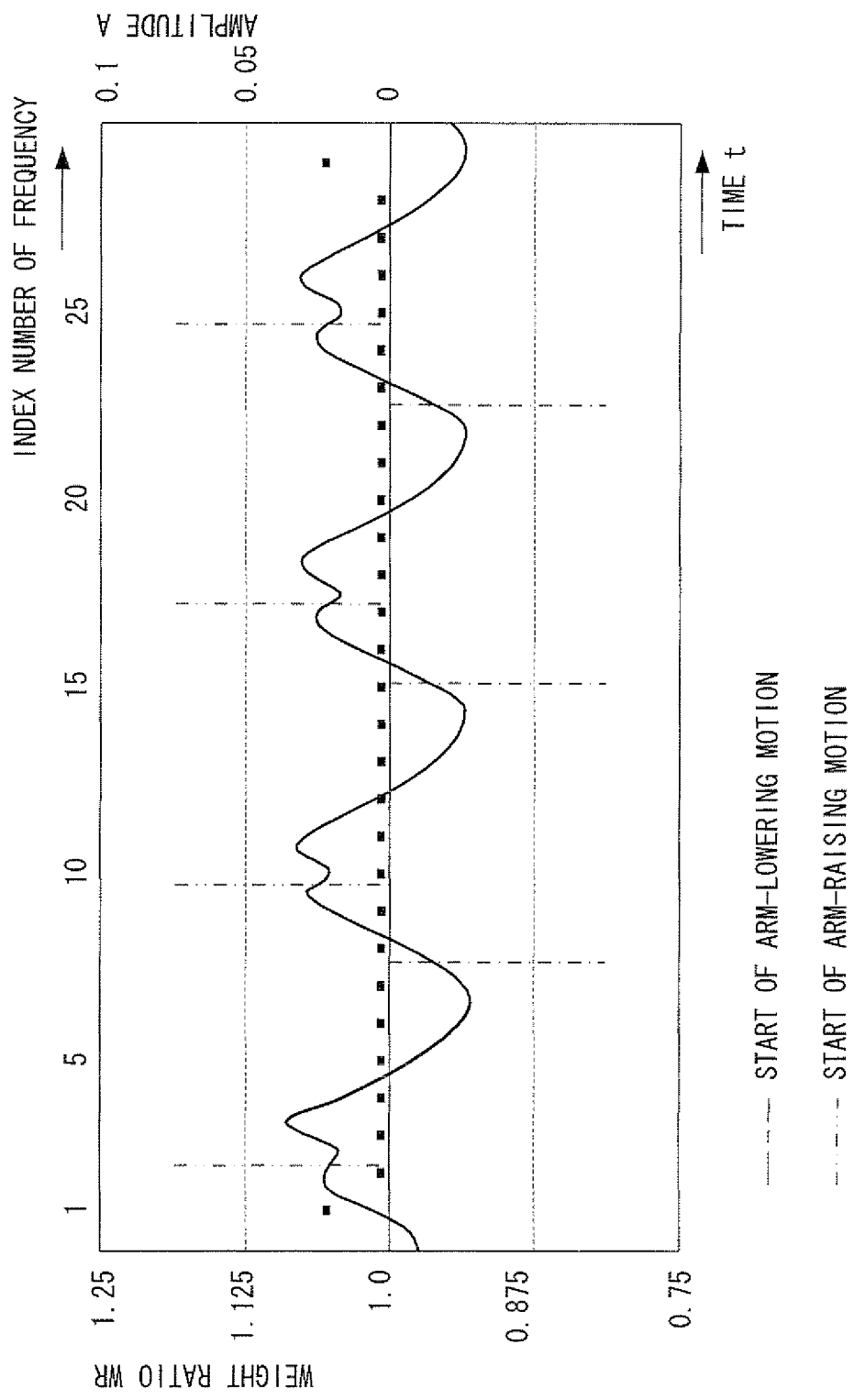
FIG. 13 is a graph indicating a time variation of a weight ratio which is detected when the player performs a large-flapping motion as shown in FIG. 12(A) and a frequency spectrum of it.
Figure 14:
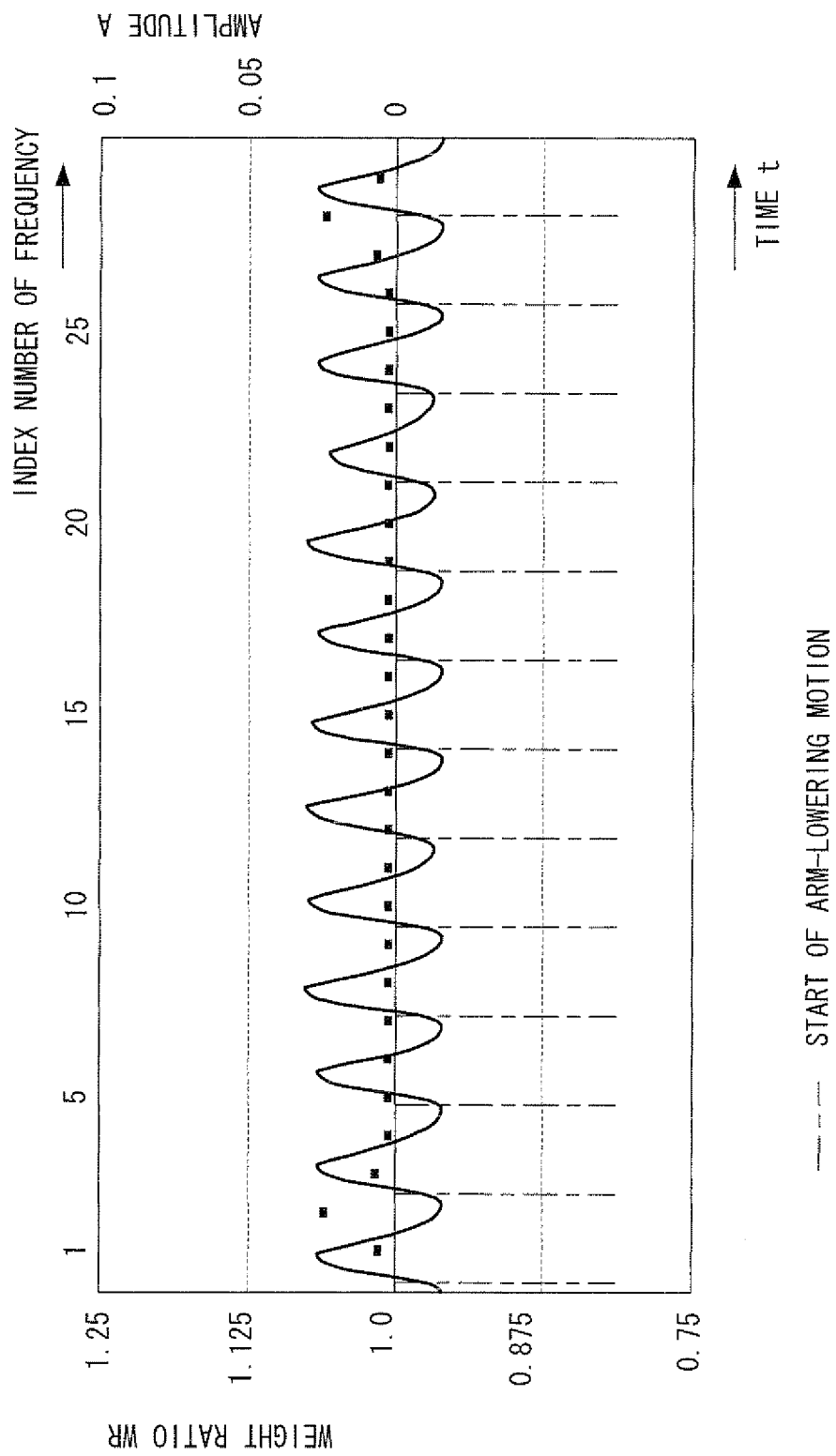
FIG. 14 is a graph indicating a time variation of a weight ratio and a frequency spectrum which is detected when the player performs a small-flapping motion as shown in FIG. 12(B) and a frequency spectrum of it.

Here, judgment method as to the large-flapping motion and the small-flapping motion which are to be performed by the player is explained. FIG. 13 shows one example of a graph of a time variation of the weight ratio WR when the player performs a large-flapping motion shown in FIG. 12(A). Furthermore, FIG. 14 shows one example of a graph of a variation of the weight ratio WR when the player performs a small-flapping motion shown in FIG. 12(B). In FIG. 13 and FIG. 14 (this is true for FIG. 15), the time variation of the weight ratio WR is indicated by a solid line waveform. Here, by regarding when the weight ratio WR is 1.0, that is, when the body weight value (reference value) and the current load value match with each other as a reference, the upper side of the graph is a side where the load of the player detected by the load controller 36 is added, and on the lower side of the graph is a side where the load of the player detected by the load controller 36 is reduced.

When each of the time variations of the weight ratio WR as shown in FIG. 13 and FIG. 14 is subjected to a discrete Fourier transform, a power spectrum (the amplitude A with respect to the index number n of the frequency) is obtained. In FIG. 13 and FIG. 14 (this holds true for FIG. 15), the power spectrum is indicated by a dot. The reason why the discrete Fourier transforming processing is executed is for correctly confirming a flapping motion of the player (specifically, large-flapping motion). That is, this is because that it is difficult to distinguish between the small-flapping motion and the large-flapping motion from the waveform of the time variation of the weight ratio WR.

Here, when in the discrete Fourier transform, and the number of data of the waveform shall be x, a time interval shall be dt (seconds), the frequencies f are 1/(x·dt) intervals. In this embodiment, x=30, dt=1/60 (game frame), and thus the frequencies f (Hz) is 2 intervals. Accordingly, the value obtained by doubling the index number n becomes the frequency f (Hz). Here, the game frame is a screen updating rate.

As understood from FIG. 13, in a case of a large-flapping motion, when the index number n=1 of the frequency, the amplitude A becomes the maximum value. Furthermore, as understood from FIG. 14, in a case of a small-flapping motion, when the index number n=2 of the frequency, the amplitude A becomes the maximum value. Accordingly, the time variation of the weight ratio WR is subjected to the discrete Fourier transform, and by searching the index number n of the frequency when the amplitude A is the maximum, it is considered that whether a large-flapping motion or a small-flapping motion is performed can be judged. Although illustration is omitted, depending on the result of the experiments, in a case of that the player performs a large-flapping motion as well, when the index number n=2 of the frequency, the amplitude A sometimes becomes the maximum value due to the influence of a noise. Thus, in this embodiment, whether the large-flapping motion or the small-flapping motion is judged according to Equation 1. In a case that the index number n, or the index number n of the frequency when the amplitude A becomes the maximum value and the amplitude A satisfy the Equation 1, the small-flapping motion is judged, and when they do not satisfy the Equation 1, the large-flapping motion is judged. Here, the maximum value of the noise (spectrum noise) when the large-flapping motion is performed shall be Pn (0.0001).

$$n \geq 3$$ [Equation 1]

or n=2 and the A is the maximum, and n=3 and A≥Pn

However, when the Equation 1 is not satisfied, if as to all the index numbers n=1-15 of the frequency, each of all the amplitude A is less than Pn, it is considered that there is no cyclic motion, and thus, it is determined that the player does not perform a flapping motion.

When the presence or absence of a flapping motion of the player and the kind (large-flapping motion or small-flapping motion) of the flapping motion are judged, an animation is selected depending on the kind of the flapping motion, and selected animation is reproduced. Accordingly, as described above, according to the flapping motion of the player, an animation showing the flapping motion of the player object 202 is displayed on the monitor 34.

Here, if the player does not perform a flapping motion, and the player object 202 descends in the three-dimensional virtual space, an animation showing that the player object 202 is descending (animation during descending) is reproduced.

Figure 15:
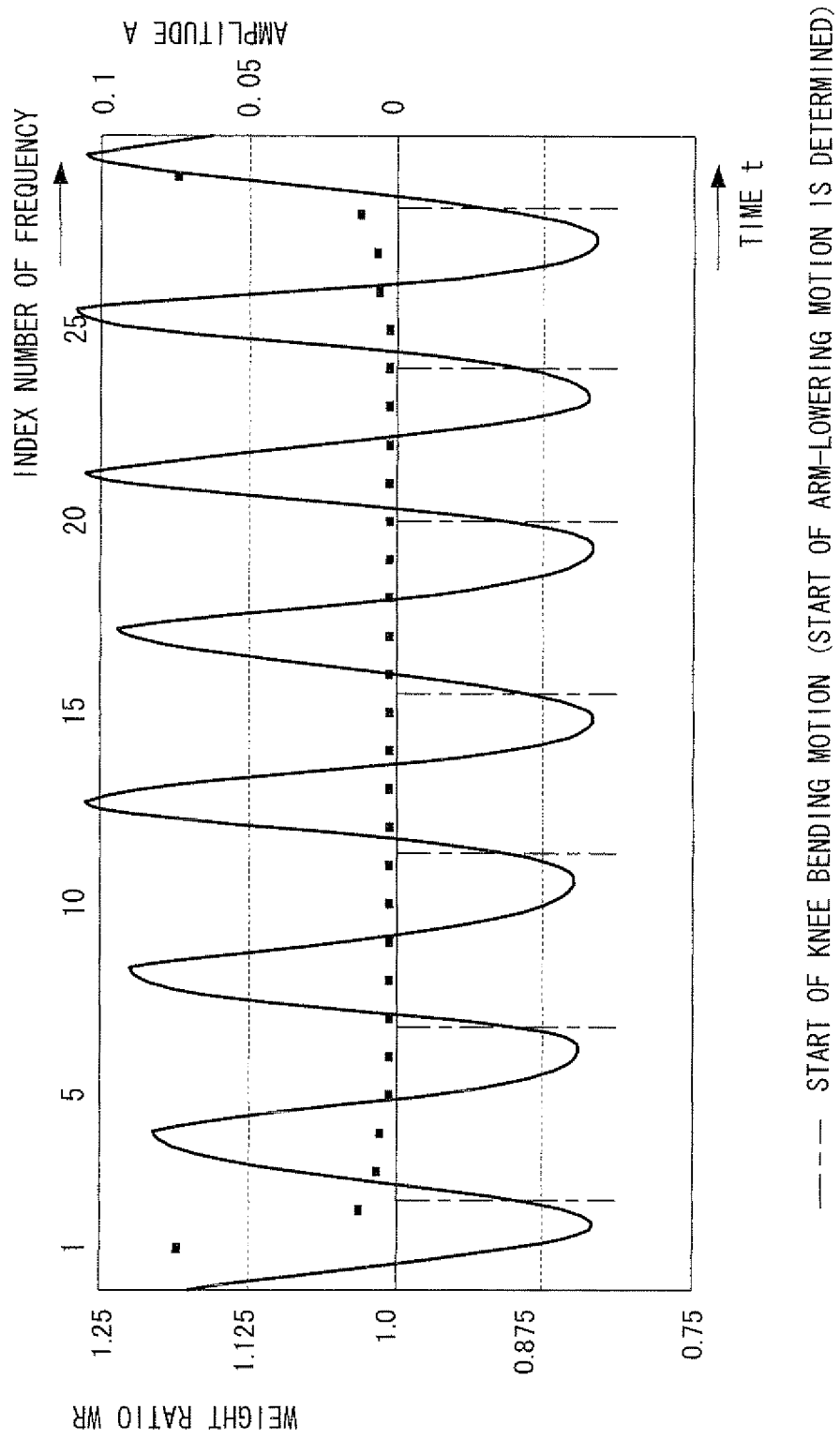
FIG. 15 is a graph indicating a time variation of a weight ratio which is detected when the player performs bending and stretching exercises and a frequency spectrum of it.

As described above, in this embodiment, the player riding on the load controller 36 performs a flapping motion, so that the load value detected by the load controller 36 is varied, and the weight ratio WR is also varied. Accordingly, for example, in a case that the player riding on the load controller 36 performs bending and stretching exercises as well, the load value detected by the load controller 36 is cyclically varied similar to a case that the player performs a flapping motion. One example of the graph of a time variation of the weight ratio WR is shown in FIG. 15. As can be understood by comparison with FIG. 13 or FIG. 15, in a case that the bending and stretching exercises is performed, the variation of the weight ratio WR is made larger in comparison with a case that a flapping motion is performed.

Although shown in detail later, in this embodiment, a driving force depending on the magnitude of the weight ratio WR (negative value) is given to the player object 202, and by the driving force, the player object 202 moves within the three-dimensional virtual space. Thus, in a case that the player performs the bending and stretching exercises, a driving force larger than a case that the player performs a flapping motion can be applied to the player object 202 to thereby allow the player object 202 to be moved largely. However, such the bending and stretching exercises is not an operation method that the developer, et al. intends to.

Accordingly, in this embodiment, in a case that there is a weight ratio WR above a fixed threshold value (1.3, for example) in the immediately-preceding flapping motion (flapping section) of the player, it is determined that an unintended motion, such as the bending and stretching exercises is performed, the score of the virtual game is decreased, or the player object 202 is made to be hard to advance.

In this embodiment, a section from the start of the last-but-one-arm-lowering motion to the start of the previous (immediately-preceding)-arm-lowering motion is recognized as an immediately-preceding-flapping motion (flapping section). Here, in FIG. 13-FIG. 15, the start point of an arm-lowering motion is represented by alternate long and short dash lines. The arm-lowering motion means a motion of lowering the both hands or the arms down in the flapping motion. The determination method of the start of the arm-lowering motion is explained in detail later. However, as described above, since the time variation of the weight ratio WR shown in FIG. 15 is obtained is when the player performs the bending and stretching exercises, in the determination processing described later, not the start of an arm-lowering motion but the start of a leg-bending motion is determined.

As described above, during the game, a driving force Acc based on the weight ratio WR is applied to the player object 202. In this embodiment, the driving force Acc is calculated according to Equation 2. Here, the weight ratio WR is less than a predetermined threshold value (0.985 in this embodiment). The reason why the driving force Acc is applied when the weight ratio WR is smaller than 1.0 is to allow the player object 202 to obtain a driving force when the player performs an arm-lowering motion just as a bird obtains a driving force when it moves the wings down. Accordingly, it can be said that in the flapping motion to be performed by the player, raising the both hands or the both arms upward (arm-raising motion) is a preparation motion of an arm-lowering motion to obtain a driving force. Furthermore, the reason whey the weight ratio WR is less than the predetermined threshold value is to eliminate the influence of the noise.

$$\text{driving force Acc} = 1.0 - \text{weight ratio WR} \qquad \text{[Equation 2]}$$

Here, as understood from the Equation 2, the smaller the weight ratio WR is, the larger the driving force Acc is. That is, in a case of a large variation of the load value, the driving force Acc becomes large. In addition, the driving force Acc is given when the weight ratio WR is less than the predetermined threshold value and the driving force Acc is reflected on the movement of the player object 202 every one game frame, so that the longer the time during which the weight ratio WR is less than the predetermined threshold value is, that is, the longer the one cycle of the flapping motion is, such as a large-flapping motion, the more the number of obtainments of the driving force Acc is. As a result, a large driving force Acc is applied to the player object 202, and thus, a moving distance or a moving velocity of the player object 202 is increased (see Equation 3 and Equation 4).

The driving force Acc calculated in the Equation 2 is a scalar quantity, but in the three-dimensional virtual space, a unit vector (Y vector) AccDir extending from the head directly above in a state that the player object 202 stands still is multiplied by the scalar quantity which is transformed into a value (AccSim) utilized in an integration simulation. Here, the unit vector AccDir is decided by rotating the player object 202 about the x-axis and the y-axis of the local coordinates in correspondence with the barycentric position of the player as described later.

In the integration simulation, the position (three-dimensional position) Pos of the player object 202 after movement is calculated according to Equation 3 and Equation 4 on the basis of the driving force Acc. Here, the player object 202 is moved to a direction the head turns to, that is, the direction of the unit vector AccDir in the current game frame (current frame). In addition, in the Equation 3 and Equation 4, a velocity of the player object 202 in a next game frame (next frame) shall be Vel_new, a velocity before movement, that is, the velocity in the current frame shall be Vel_old, a gravitational acceleration vector in the three-dimensional virtual space shall be Gravity, a three-dimensional position in the current frame shall be Pos_old, and a three-dimensional position in the next frame shall be Pos_new. Furthermore, in the Equation 3, an acceleration vector (AccBoard×FallTransDir) in a case that the player object 202 moves in a forward and backward direction during descending is reflected on the velocity in the next frame Vel_new. Here, the AccBoard is a translational acceleration (acceleration in the horizontal direction), and the FallTransDir is a direction vector in a translational direction (horizontal direction) (vector of the front direction or back direction of the player object 202).

$$\text{Vel\_new} = \{\text{Vel\_old} + (\text{AccSim} \times \text{AccDir}) + (\text{AccBoard} \times \text{FallTransDir}) + \text{Gravity}\} \times 0.994 \qquad \text{[Equation 3]}$$

$$\text{Pos\_new} = \text{Pos\_old} + \text{Vel\_new} \qquad \text{[Equation 4]}$$

Here, in this embodiment, the gravitational acceleration vector Gravity shall be (0, −0.014, 0). In this embodiment, the distance 1 m in the real world shall be a distance 10 within the three-dimensional virtual space, but when the gravitational acceleration. Gravity is set in correspondence with the ratio, it is difficult to obtain enough driving force to fly the player object 202 by the flapping motion of the player, and therefore, the gravitational acceleration Gravity is set to a relatively smaller value empirically obtained by experiments, etc. In addition, 0.994 is air resistance. This is not required to be a constant, and may be variably set in correspondence to the progress of the virtual game.

As understood from the Equation 3, the velocity in the next frame Vel_new can be obtained by adding the acceleration vector ((AccSim×AccDir) or (AccBoard×FallTransDir)) and the gravitational acceleration vector Gravity to the velocity in the current frame Vel_old and then multiplying the added value by the air resistance. Furthermore, as understood from the Equation 4, the coordinate in the next frame Pos_new is obtained by adding the velocity in the next frame Vel_new to the coordinate in the current frame Pos_old. This is obtained as a result of integrating the driving force AccSim to be used in the simulation (twice integration).

Additionally, in a case that no flapping operation is made by the player, the weight ratio WR is 1 or approximately 1, and the driving force AccSim (acceleration vector (AccSim×AccDir)) to be used for the simulation becomes 0, and the Equation 3 is shown as in Equation 5.

$$\text{Vel\_new} = \{\text{Vel\_old} + (\text{AccBoard} \times \text{FallTransDir}) + \text{Gravity}\} \times 0.994 \qquad \text{[Equation 5]}$$

Accordingly, a Y component of the velocity in the next frame Vel_new is reduced by 0.014 for each game frame. Thus, free fall in the three-dimensional virtual space is represented. That is, in the Equation 3, a translational movement of the object when a driving force occurs in the gravitational filed within the three-dimensional virtual space is described.

Furthermore, in a case that a flapping operation by the player occurs, and the player object 202 does not descend, the acceleration vector (AccBoard×FallTransDir) of the player object 202 in the forward and backward direction during descending becomes 0 according to the Equation 3.

In this manner, the three-dimensional position Pos_new after movement in the three-dimensional virtual space of the player object 202 is calculated, and the player object 202 is placed in the three-dimensional virtual space according to the determinant A shown in Equation 6. Here, each element of the determinant A shown in FIG. 6 means as follows. An element (Xx, Xy, Xz) is a direction to which an x-axis of the local coordinate of the player object 202 is applied, an element (Yx, Yy, Yz) is a direction to which a y-axis of the local coordinate of the player object 202 is applied, an element (Zx, Zy, Zz) is a direction to which a z-axis of the local coordinates of the player object 202 is applied, and an element (Px, Py, Pz) is world coordinate (three-dimensional coordinate) where the center (gravity) of the local coordinate of the player object 202 is placed.

$$A = \begin{bmatrix} Xx & Yx & Zx & Px \\ Xy & Yy & Zy & Py \\ Xz & Yz & Zz & Pz \end{bmatrix} \qquad \text{[Equation 6]}$$

Furthermore, during the game, depending on the barycentric position of the load of the player on the load controller 36, the direction of travel (moving direction) of the player object 202 is decided (controlled). In FIG. 16(A), the center of the top surface (surface of the upper-layer plate 360a of the support plate 360) of the load controller 36, that is, the center of the range of detection of the barycentric position is set to the origin point O (0, 0), and the orientation (moving direction) of the head of the player object 202 is decided by a shift length of the barycentric position from the origin point O in a horizontal plane. Here, a horizontal direction of the support plate 360 of the load controller 36 is an x-axis direction of the range of detection, and a vertical direction thereof is a y-axis direction of the range of detection. It should be noted that the direction of the face when the player correctly rides on the load controller 36 (front direction) is an upper direction of the paper in FIG. 16(A). Furthermore, as shown in FIG. 16(A), a right direction of the range of detection is a plus direction of the x-axis, and an upper direction of the range of detection is a plus direction of the y-axis.

Here, in a situation in FIG. 16(A), the load detection value at the upper left of the load sensor 36b is R1, the load detection value at the lower left of the load sensor 36b is R2, the load detection value at the upper right of the load sensor 36b is R3, and the load detection value at the lower right of the load sensor 36b is R4, an x coordinate (XG) of the barycenter in the coordinate system of the range of detection is calculated on the basis of the difference between the right load value and the left load value, and a y coordinate (YG) of the barycenter is calculated on the basis of the difference between the upper load value and the lower load value. The x coordinate (XG) of the barycenter is calculated according to Equation 7, and the y coordinate of the barycenter (YG) is calculated according to Equation 8.

$XG=((R3+R4)-(R1+R2))\times k1$ [Equation 7]

$YG=((R1+R3)-(R2+R4))\times k2$ [Equation 8]

Here, k1, k2 are constants. Noted that $-1\leq XG\leq 1$, $-1\leq YG\leq 1$.

Additionally, in this embodiment, the center of the range of detection of the load controller 36 is set to be the origin point O, but a standing position is different from player to player, and therefore, the barycentric position when the player rides on the load controller 36 and measure the body weight value may be set to the origin point O. In this embodiment, in a case that the player object 202 flies, a controlling method of the moving direction is differentiated between when the player object 202 descends and does not descend. Each case is explained in detail hereafter.

In a case that the player object 202 does not descend, the player object 202 rotates in the right and left direction according to the x coordinate of the barycentric position of the load detected by the load controller 36 and rotates in the forward and backward direction according to the y coordinate of the barycentric position.

In a case that the barycentric position is included in an area (I) or an area (III) within the range of detection, and the x coordinate of the barycentric position is negative, the player object 202 is rotated counterclockwise (to the left direction) about the y-axis of the local coordinate. Furthermore, in a case that the barycentric position is included in an area (II) or an area (IV) within the range of detection, and the x coordinate of the barycentric position is positive, the player object 202 is rotated clockwise (to the right direction) about the y-axis of the local coordinate.

More specifically, as shown in FIG. 16(B), in a case that the player object 202 is seen from above, a counterclockwise rotation amount of the player object 202 about the y-axis of the local coordinates is decided according to the negative value of the x-coordinate of the barycentric position, and a clockwise rotation amount of the player object 202 about the y-axis of the local coordinate is decided according to the positive value of the x-coordinate of the barycentric position. The rotation amount is proportional to the magnitude of the x-coordinate of the barycentric position. Furthermore, in a case that the x-coordinate of the barycentric position is a positive value, the player object 202 continues to rotate clockwise about the y-axis of the local coordinate.

Here, in this embodiment, in the local coordinate system, when the player object 202 is a standstill state, a lateral (horizontal) direction is an x-axis direction, and a longitudinal (vertical) direction is a y-axis direction, and a backward and forward (depth) direction is a z-axis direction. Furthermore, each axis passes through the center or the barycenter of the player object 202. In addition, when the player object 202 is in a standstill state, the left hand (left wing) direction is a plus direction of the x-axis of the local coordinate, the upper direction is a plus direction of the y-axis of the local coordinate, and the forward direction (direction of the belly) is a plus direction of the z-axis of the local coordinate.

Furthermore, in a case that the barycentric position is included in the area (I) or the area (II) within the range of detection, and the y-coordinate of the barycentric position is positive, the player object 202 is rotated about the x-axis of the local coordinate such that the head is inclined forward (front direction) as shown in FIG. 17. The inclination amount (rotation amount) to the front direction is proportion to the magnitude of the y-coordinate of the barycentric position, but the maximum inclination amount is 55 degrees from the standstill state of the player object 202.

Although illustration is omitted, in a case that the barycentric position is included in the area (III) or the area (IV) within the range of detection, and the y-coordinate of the barycentric position is negative, the player object 202 is rotated about the x-axis of the local coordinate backward. It should be noted that the maximum inclination amount of the player object 202 backward is set to 35 degrees. This is because of eliminating an undesired state in which the player object 202 flies with the belly upward.

On the other hand, in a case that the player object 202 descends, the player object 202 is rotated to the horizontal direction according to the x-coordinate of the barycentric position of the load detected by the load controller 36, and translated in the forward and backward direction according to the y-coordinate of the barycentric position.

In a case that the player object 202 descends as well, the player object 202 is rotated about the y-axis of the local coordinate according to the x-coordinate of the barycentric position. This is the same explanation as that made with reference to FIG. 16(B), and therefore, a redundant explanation is omitted.

Furthermore, in a case that the player object 202 descends, the player object 202 is moved (translated) in the forward and backward direction according to the y-coordinate of the barycentric position as shown in FIG. 18. That is, in such a case, the head of the player object 202 is not inclined. Furthermore, the moving amount (displacement amount) when the player object 202 is translated is decided by the magnitude of the y-coordinate of the barycentric position. The reason why the player object 202 is thus translated according to the y-coordinate of the barycentric position when descending is to make it easy to land the player object 202 in the non player object 204. In a case that the y-coordinate of the barycentric position is positive, the player object 202 is moved (translated) in the front direction. At this time, when the y-coordinate becomes large, the moving amount is also increased. On the other hand, in a case that the y-coordinate of the barycentric position is negative, the player object 202 translates in a direction opposite to the front direction (rear direction). At this time, when the y-coordinate becomes small, that is, becomes large in the negative direction, the moving amount is increased. It should be noted that the maximum value of the moving amount by the player object 202 for one game frame is set in advance.

Furthermore, from the time variation of the weight ratio WR shown in FIG. 13-FIG. 15, a start of a motion of raising the arms upward by the player (arm-raising motion) is determined (arm-raising determination) while a start of a motion of lowering the arms downward (arm-lowering motion) is determined (arm-lowering determination). This is because of synchronizing the flapping motion of the player and the animation of the flapping motion of the player object 202.

Explanation is made on an arm-lowering determination method, an arm-raising determination method, and a synchronization between the flapping motion of the player and the animation of the flapping motion of the player object 202, in order.

In this embodiment, when the weight ratio WR in the current frame is smaller than weight ratio WR in the immediately-preceding game frame (previous frame), and the value of the weight ratio WR in the current frame becomes less than a certain value (0.985), it is determined that an arm-lowering motion is started. Alternatively, in this embodiment, when the value of the weight ratio WR is equal to or more than a certain value (0.98), and the weight ratio WR is decreased and then increased, it is determined that an arm-raising motion is started. More specifically, in a case that the weight ratio WR in the previous frame is smaller than the weight ratio WR in a last-but-one game frame (last but one frame), and the weight ratio WR in the current frame is equal to or more than the weight ratio WR in the previous frame by a certain value (0.001) or more, it is detected that the weight ratio WR is decreased and then increased, and moreover, in a case that the weight ratio WR in the previous frame is equal to or more than the certain value (0.98), it is determined that an arm-raising motion is started. Thus, when on the side of the area where the weight ratio WR is lager than the reference value (1.0) (upper side), on the basis of the variation of the weight ratio WR during a fixed section (3 game frames), it is detected that the weight ratio WR is locally (temporarily) decreased (decrease of the load value) and increased, it is determined that a arm-raising motion is started. These are determination methods empirically obtained on the basis of the time variation of the weight ratio WR as shown in FIG. 13 and FIG. 14.

Here, the decrease of the weight ratio WR means that the weight ratio WR in the current frame is smaller than the weight ratio WR in the previous frame, and the increase of the weight ratio WR means that the weight ratio WR in the current frame is larger than the weight ratio WR in the previous frame. Furthermore, the reason why in a case of determining the start of an arm-raising motion, the weight ratio WR is equal to or more than the certain value is made as a condition is to prevent the start of the arm-raising motion in the vicinity of the minimum value, such as around 0.9, from being determined as shown in FIG. 13. That is, in this embodiment, in a case that the player performs a large-flapping motion, a motion of raising the both hands (the both arms) as high as or higher than the shoulder is determined to be an "arm-raising motion". This is the "arm-raising motion" of the player intended by a developer, et al.

In FIG. 13-FIG. 15 described above, the start of the arm-lowering motion is shown by the alternate long and short dash line. Furthermore, in FIG. 13, the start of the arm-raising motion is shown by alternate long and two short dashes line.

Next, the synchronization between the flapping motion of the player and the animation of the flapping motion of the player object 202 is explained. First, the animation of the player object 202 is constructed of 60 frames irrespective of the kind (large or small) of flapping motion. As described above, the difference depending on the flapping kinds is only the size of a movable range of the wing. The synchronization between the flapping motion of the player and the animation of the flapping motion of the player object 202 is explained later as to the large-flapping motion, but this holds true for the small-flapping motion.

Figure 19:
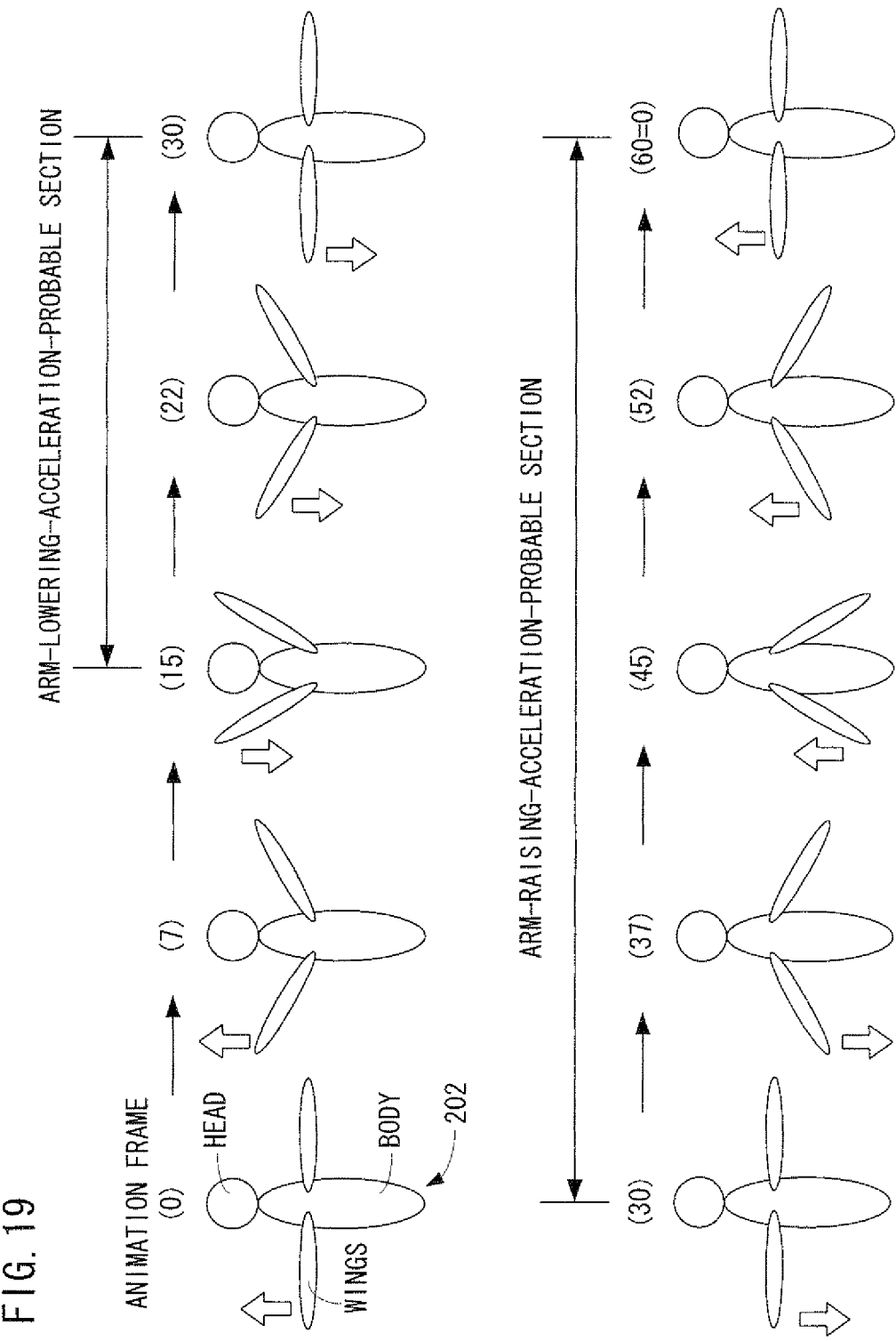
FIG. 19 is an illustrative view showing a part of an animation frame as to the player object.

In FIG. 19, the characteristic animation frames (0 (60), 7, 15, 22, 30, 37, 45, 52, here) out of 60 frames (animation frame) as to the large-flapping animation are extracted. The animation frame starts from 0 to 59, and returns to 0 at the animation frame 60. Here, in FIG. 19, for simplicity, only the head, the body, and the wings of the player object 202 are shown. Furthermore, in FIG. 19, the front direction of the player object 202 is a vertical direction with respect to the paper. In addition, in FIG. 19, on the upper line, the animation frame from 0 to 30 is represented, and on the lower line, the animation frame from 30 to 60 (0) is shown.

As shown in FIG. 19, when the animation frame is 0, the player object 202 spreads the wings in the horizontal direction, for example, and the angle formed by the wings with respect to the horizontal plane of the three-dimensional virtual space is 0 degrees. In this embodiment, when the animation frame is reproduced, the player object 202 raises the wing from the spread state in the horizontal direction, and reaches the wings at the highest position when the animation frame is the 15th frame, and then lowers the wings. Then, the wings reach the lowest position when the animation frame is 45th frame, and then is raised to return to the initial state at the 60th frame (0th frame).

Accordingly, from the 15th frame until just before the 45th frame (15→22→30→37→45) correspond to the animation frame as to an arm-lowering motion of the player object 202, and from the 45th frame until just before the 15th frame (45→52→60(0)→7→15) correspond to the animation frame as to an arm-raising motion of the player object 202.

Furthermore, as shown in FIG. 19, an arm-lowering-acceleration-probable section (15-30th frames) is set in correspondence with an arm-lowering motion of the player object 202 or the animation frame (15-45th frames), and an arm-raising-acceleration-probable section (30-60th frames) is set in correspondence with an arm-raising motion of the player object 202 or the animation frame (45-15th frames). That is, the arm-lowering-acceleration-probable section is set from the start to the middle of the animation frame as the arm-lowering motion. Alternatively, the arm-raising-acceleration-probable section is set from the middle of the animation frame as to the arm-lowering motion to the middle of the animation frame as to the arm-raising motion. Accordingly, the arm-raising-acceleration-probable section includes the animation frame (30-45th frames) as to a part of the arm-lowering motion (preliminary motion for the arm-raising motion). As shown in FIG. 19, the reasons why the arm-lowering-acceleration-probable section and the arm-raising-acceleration-probable section are set is described later, and are omitted here.

It should be noted that the animation frame is 60 pieces (60 frames), the number of frames (fame number) may be designated by arithmetic point. For example, the angle (angle formed by the horizontal plane) of the arms of the player object 202 is 0 degrees of the 0th frame in the animation frame, and the angle of the arms of the player object 202 in the first frame in the animation frame is 10 degrees, and when 0.5 is designated as a frame number, it is possible to obtain the player object 202 with 5 degrees of the angle of the arms. Accordingly, logically, the pose of the player object 202 can take limitless kinds.

In this embodiment, as a method of taking a synchronization between the flapping motion of the player and the animation frame of the player object 202, there are an advancing method A of the animation frame when it is determined that the arm-lowering motion is started or after it is determined that the arm-lowering motion is started and an advancing method B of the animation frame when it is determined that an arm-raising motion is started or after it is determined that an arm-raising motion is started. Here, in a case that the player performs a small-flapping motion, the arm-raising motion is not determined, and therefore, the synchronization is taken only by the advancing method A of the animation frame. That is, in a case that the player performs a large-flapping motion intended by the developer, et al. as explained with reference to FIG. 12(A), an arm-lowering motion and the arm-raising motion are determined, and therefore, by utilizing the advancing method A of the animation frame and the advancing method. B of the animation fame, a synchronization is taken between the flapping motion of the player and the animation frame of the player object 202.

First, the advancing method A of the animation frame is explained. As described above, when it is determined that an arm-lowering motion is started, an arm-lowering-acceleration flag 404p (see FIG. 21) described later is turned on. In a case that the arm-lowering-acceleration flag 404p is turned on, it is determined whether or not the current animation frame is within the arm-lowering-acceleration-probable section (fame number: equal to or more than 15 and less than 30) shown in FIG. 19.

Here, as described later, the arm-lowering-acceleration flag 404p is turned off when an updating (advancing) velocity of the animation frame in the arm-lowering-acceleration-probable section is accelerated.

When it is determined that an arm-lowering motion is started, if the current animation frame is within the arm-lowering-acceleration-probable section, an arm-lowering acceleration is generated. That is, a value larger than 0 is set to the acceleration FrameAcc of the animation frame, and the updating velocity is made faster than the game frame (1/60 (seconds)). In this embodiment, the frame acceleration FrameAcc of the animation frame is calculated according to the Equation 9. Here, the AnimFrameMax is the maximum number of frames (60, in this embodiment). Furthermore, the CycleSwing is a time required for one flapping motion (flapping section), that is, a time interval during which an arm-lowering determination is made, and is represented by the number of game frames. This holds true hereafter. Accordingly, as a cycle during which a flapping motion is performed is short, the frame acceleration FrameAcc of the animation frame is set to a larger value, and the updating velocity of the animation frame is made high.

$$\text{FrameAcc} = \text{AnimFrameMax}/\text{CycleSwing} \quad \text{[Equation 9]}$$

Thus, when the frame acceleration FrameAcc is generated at a time when or directly after the arm-lowering motion by the player is made, the advance of the animation frame is made faster at this moment, and the animation showing that the player object 202 moves the wings downward is reproduced at the same time. Thus, it seems that the flapping motion of the player and flapping motion of the player object 202 take synchronization (are linked). Thereafter, the animation frame advances through inertia until a next arm-lowering motion or arm-raising motion is determined. That is, if there is no acceleration (FrameAcc=0), the frame velocity of the animation frame is reduced due to the air resistance, and becomes 0 to thereby stop reproducing the animation soon.

More specifically, the number of frames of the animation frame when the game screen is displayed (updated) is decided according to Equation 10 and Equation 11. Here, the updating (advancing) velocity of the animation frame (frame velocity) is represented by FrameVel, the acceleration of the animation frame (frame acceleration) is represented by FrameAcc, and the number of frames (number) of the animation frame is represented by Frame. Furthermore, "old" is applied to the value of the current frame (at this time), and "new" is applied to the next frame (at the next time). Accordingly, in the Equation 10, the next frame velocity taking the air resistance into account is calculated, and in the Equation 11, the next frame number is calculated.

$$\text{FrameVel\_new} = (\text{FrameVel\_old} + \text{FrameAcc}) \times 0.99 \quad \text{[Equation 10]}$$

$$\text{Frame\_new} = \text{Frame\_old} + \text{FrameVel\_new} \quad \text{[Equation 11]}$$

Here, 0.99 is air resistance. Accordingly, the air resistance need not to be a constant, and may be variably set in correspondence with the progress of the game.

On the other hand, when it is determined that the arm-lowering motion is started, if the current animation frame is not within the arm-lowering-acceleration-probable section, the animation frame is advanced according to the frame velocity (Noted that frame acceleration AnimeVcc=0) calculated in Equation 12 to the arm-lowering-acceleration-probable section.

$$\text{FrameVel\_old} = \text{AnimFrameMax} \times 1.7/\text{CycleSwing} \quad \text{[Equation 12]}$$

Then, when the animation frame advance to the arm-lowering-acceleration-probable section, the frame acceleration FrameAcc is generated as described above, the synchronization between the flapping motion of the player and the flapping motion of the player object 202 is taken Here, as understood by comparing the Equation 9 and the Equation 12, the frame velocity obtained in the Equation 12 is 1.7 times as fast as the acceleration FrameAcc obtained in the Equation 9. For example, in a case that the animation frame is 7th frame, when it is determined that an arm-lowering motion is started, the animation frame advances to reach the 15th frame at the 1.7-fold frame velocity obtained in the Equation 12, and then advances to reach the 30th frame at the frame velocity calculated in the Equation 10. Here, in this case, the arm-lowering motion is performed outside the arm-lowering-acceleration-probable section, and therefore the acceleration FrameAcc is 0 from the 15th frame to the 30th frame. Accordingly, the frame velocity of the animation frame is reduced (attenuated) from the 15th frame to the 30th frame due to the air resistance (0.99, here).

That is, the frame velocity from the 7th frame to the 15th frame is faster than the frame velocity from the 15th frame to the 30th frame (arm-lowering-acceleration-probable section), and is constant velocity.

Accordingly, in this case, the updating velocity of the animation frame is not temporarily accelerated and then decelerated from the 15th frame to the 30th frame, and therefore, it is impossible to make the player object 202 perform a motion as if a real bird (relatively large bird) is flapping.

However, in a case that the determination as to the start of the arm-lowering motion is out of the arm-lowering-acceleration-probable section as described above, the animation frame advances to the 15th frame at the 1.7-fold frame velocity, decelerates from the 15th frame to the 30th frame, and then enter a next arm-lowering determination, as a cycle (hereinafter, referred to as "cycle A"), so that one flapping motion by the player ensures one flapping motion by the player object 202 (animation frame advances from the 0-th frame to the 59th frame). Furthermore, in such a case, in the arm-lowering-acceleration-probable section, the frame velocity is not accelerated, but the animation frame is updated at the 1.7-fold frame velocity in response to the player starting an arm-lowering motion. That is, in response to a motion by the player, the motion of the player object 202 is controlled, so that the player does not feel uncomfortably.

In addition, the frame velocity evaluated according to the Equation 12 is inverse proportion to the flapping section (flapping cycle) CycleSwing being a time interval for determining the start of an arm-lowering motion, so that if a slow flapping motion is performed, the cycle A slowly proceeds, and if a quickly flapping motion is performed, the cycle A quickly proceeds.

Thus, even if the advance of the animation frame is controlled by merely determining the start of the arm-lowering motion, it is possible to take a synchronization between the flapping motion of the player and animation.

As described above, when it is determined that an arm-lowering motion is started, in a case that the current animation frame is within the arm-lowering-acceleration-probable section, the frame acceleration FrameAcc is generated, and then, the animation frame is updated through inertia according to the Equation 10 and Equation 11. However, this results in the animation frame being late for a flapping motion including a next arm-lowering motion by the player.

In order to cancel the delay, in this embodiment, in a case it is determined that an arm-raising motion is started in accordance with the player performing a large-flapping motion, the advancement of the animation frame is controlled not only by the advancing method A of the animation frame but also the advancing method B of the animation frame.

That is, the synchronization between a flapping motion of the player and the animation frame is taken to a certain degree by the advancing method A of the animation frame, and the synchronization between the flapping motion of the player and the animation frame is taken more precisely by the advancing method B of the animation frame.

As described above, the frame velocity obtained in the Equation 12 is 1.7 times as fast as the acceleration FrameAcc obtained in the Equation 9. This is the magnification set for making the frame velocity higher than the acceleration FrameAcc obtained by the flapping motion (arm-lowering motion) of the player, and is a numerical value empirically obtained by experiment, etc.

Next, the advancing method B of the animation frame is explained. As described above, when it is determined that an arm-raising motion is started, an arm-raising-acceleration flag 404n (see FIG. 21) described later is turned on. In a case that the arm-raising-acceleration flag 404n is turned on, it is determined whether or not the current animation frame is within the arm-raising-acceleration-probable section (fame number: equal to or more than 30 and less than 60) shown in FIG. 19.

As described later, when the updating velocity of the animation frame is accelerated in the arm-raising-acceleration-probable section, the arm-raising-acceleration flag 404n is turned off.

When it is determined that the arm-raising motion is started, in a case that the current animation frame is within the arm-raising-acceleration-probable section, an arm-raising acceleration is generated. That is, a value larger than 0 (2, in this embodiment) is set to the frame acceleration FrameAcc, and the updating velocity is set to be faster than the game frame ($1/60$ (seconds)). Here, if the current frame velocity FrameVel_old is equal to or more than 2, the frame acceleration FrameAcc is set to 0. That is, when or directly after an arm-raising motion by the player is performed, a frame acceleration FrameAcc is generated, and the advancement of the animation frame is made the fastest at this moment, and an animation showing that the player object 202 moves the wings upward at the same time. Thus, it seems that the flapping motion of the player and the flapping motion of the player object 202 are synchronized with each other. Accordingly, in a case that it does not seem that the flapping motion of the player and the animation frame are synchronized, the player can understand that his or her own flapping motion, especially, an arm-raising motion is not correctly performed through the screen (game screen 200, etc.). It is considered that this prompts the player to perform a (correct) flapping motion (motion for training) intended by the developer, et al.

On the other hand, when it is determined that an arm-raising motion is started, in a case that the current animation frame is not within the arm-raising-acceleration-probable section, the animation frame advances through inertia. Although detailed explanation omitted, the number of frames in a case of the arm-raising motion is also calculated according to the above-described Equation 10 and Equation 11.

Here, the reason why the arm-lowering-acceleration-probable section is set to equal to or more than the 15th frame and less than the 30th frame is that if the animation frame is accelerated during the period, the player feels that the player object 202 moves down the wings in synchronization with the arm-lowering motion by the player.

Assuming that a progress of the animation frame accelerates in the vicinity of the 37th frame to advance faster to the 45th frame, the player feels that the player object 202 moves the wing downward, and then moves the wing upward soon. That is, the player feels that an arm-raising motion is confirmed irrespective of the player performing an arm-lowering motion.

Furthermore, the reason why the arm-raising-acceleration-probable section is set to the section equal to or more than 30th frame and less than 60th frame is that when with respect to section equal to or more than the 45th frame and less than the 60th frame, the animation frame is accelerated during the period similar to the arm-lowering-acceleration-probable section, the player feels that the player object 202 raises the wings in synchronization with the arm-raising motion of the player.

In addition, the reason why the arm-raising-acceleration-probable section includes the section equal to or more than the 30th frame and less than the 45th frame is that the animation frame moves to the arm-lowering-acceleration-probable section as close as possible in preparation for the determination of the start of an arm-lowering motion of the player which is to be made several frames after. In this case, in the section equal to or more than the 30th frame and less than the 45th frame of the animation frame, to the eye, an arm-lowering animation is reproduced, and thus, the arm-lowering animation is reproduced irrespective of the player performing an arm-raising motion. However, in the flapping motion, the player performs an arm-lowering motion directly after an arm-raising motion, and therefore, by making it easy to advance the animation frame by making a projection on a next motion, it is possible to take a synchronization between the flapping motion of the player and the animation. On the contrary, the player is not required to perform an arm-raising motion directly after an arm-lowering motion. This is because an arm-lowering motion may be performed and remained as it is, and eve if the player performs an arm-raising motion, the start of the arm-raising motion may not be determined according to the above-described method, sot that there is no need of making it easy to advance the animation frame by making a projection on a next motion.

Furthermore, the reason why the arm-raising-acceleration-probable section includes the section equal to or more than the 30th frame and less than the 45th frame is that in the above-described cycle A, the section (hereinafter referred to as "correction section"), in which the animation frame is advanced at the 1.7-fold frame velocity before the 15th frame, is made smaller. More specifically, when the arm-raising-acceleration-probable section is long, a start of the arm-raising motion is determined during the section, the updating velocity (frame velocity) of the animation frame is accelerated, and the animation frame advances largely. Thus, the frame acceleration FrameAcc by the arm-raising motion after the arm-lowering motion by the player can be obtained, and when a start of an arm-lowering motion is determined next, the animation frame increase the chance of advancing in the vicinity of the 15th frame. That is, the correction section can be shortened. Furthermore, depending on the timing, the correction section may be lost. If the correction section is lost, the start of the arm-lowering motion is determined from the 15th frame to the 30th frame, and the animation frame is accelerated once, and then decelerated. In such a case, the flapping motion of the player and the animation are correctly synchronized with each other.

Although illustration is omitted, in a case that the player performs a small-flapping motion, without performing the arm-raising determination, by merely accelerating the animation frame during the arm-lowering-acceleration-probable section, it is possible to take the synchronization between the flapping motion of the player and the animation of the flapping motion of the player object 202. This holds true for a case that the player performs a large-flapping motion. Accordingly, it is considered that a determination processing of the start of the arm-raising motion and the acceleration processing in the arm-raising-acceleration-probable section are not required to be executed.

However, in this embodiment, in order to take a more precise synchronization, the determination processing of the start of the arm-raising motion is performed, and the acceleration processing in the arm-raising-acceleration-probable section is executed.

Figure 20:
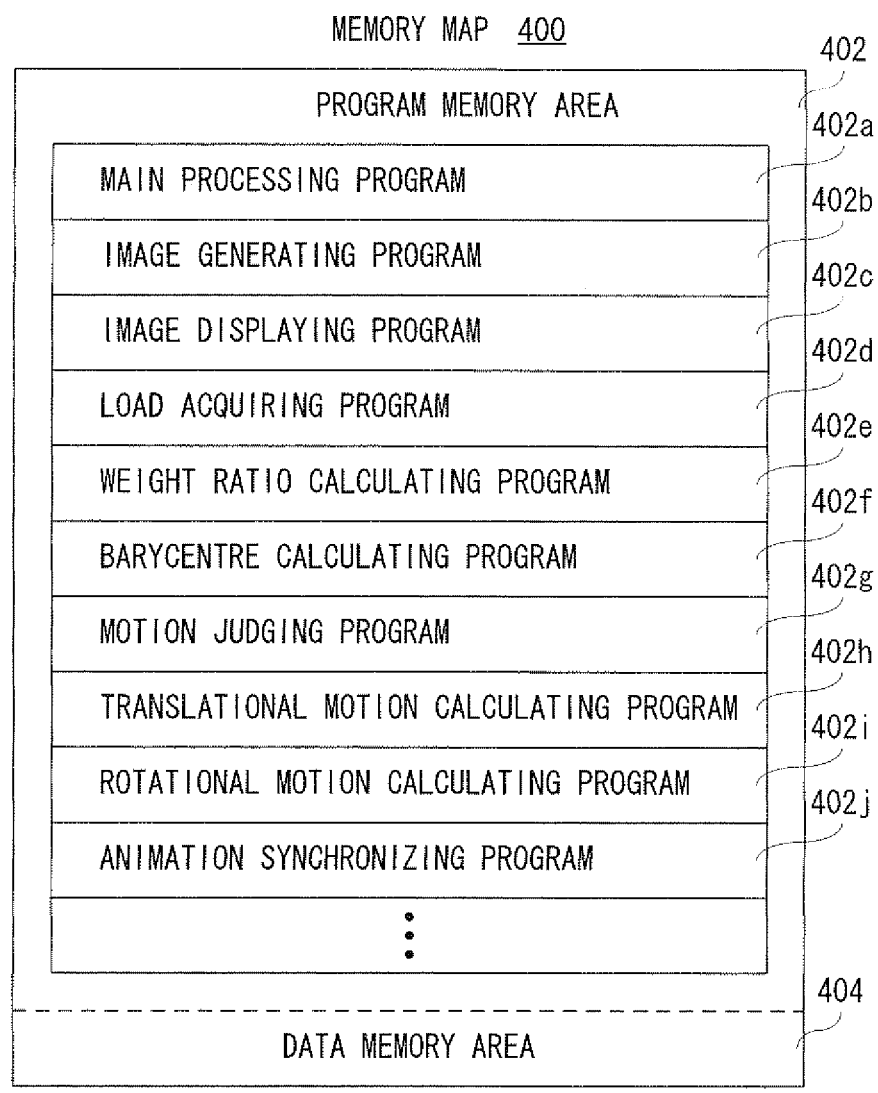
FIG. 20 is an illustrative view showing an example of a memory map of a main memory shown in FIG. 2.

FIG. 20 is an illustrative view showing one example of a memory map 400 of a main memory (42e, 46) shown in FIG. 2. As shown in FIG. 20, in a main memory (42e, 46), a program memory area 402 and a data memory area 404 are provided. The program memory area 402 stores a game program, and the game program is constructed of a main processing program 402a, an image generating program 402b, an image displaying program 402c, a load acquiring program 402d, a weight ratio calculating program 402e, a barycentre calculating program 402f, a motion judging program 402g, a translational motion calculating program 402h, a rotational motion calculating program 402i, an animation synchronizing program 402j, etc.

The main processing program 402a is a program to perform a main routine of the virtual game of this embodiment. The image generating program 402b is a program for generating (updating) game image data by utilizing image data 404b described later. The image displaying program 402c is a program for displaying (outputting) game image data generated according to the image generating program 402b as the game screen (200, etc.) on the monitor 34.

The load acquiring program 402d is a program for acquiring a current load value measured (detected) by the load controller 36. More specifically, the load values detected by the four load sensors 36b are added up. In this embodiment, prior to the start of the main part of the virtual game, the body weight value of the player is detected in a state that the player rides on the load controller 36 in a static state. The numerical value data corresponding to the body weight value is acquired, and is stored in the data memory area 404 as reference value data 404f described later. Furthermore, during the game, a load value is detected for each game frame, and numerical value data corresponding to the detected load value is acquired, and stored as current load value data 404g described later in the data memory area 404.

The weight ratio calculating program 402e is for calculating a weight ratio WR for each game frame obtained by dividing the current load value (in the current frame) acquired according to the load acquiring program 402d by the body weight value (reference value) of the player acquired according to the load acquiring program 402d. The numerical value data of the weight ratio WR calculated according to the weight ratio calculating program 402e is stored in chronological order as weight ratio data in the weight ratio data buffer 404a described later.

The barycentre calculating program 402f is a program for calculating coordinate (XG, YG) of the barycentric position according to the Equation 7 and the Equation 8 by utilizing the load value in each load sensor 36b detected according to the load acquiring program 402d, and storing the coordinate data corresponding to the calculate coordinate (XG, YG) as barycentric position data 404h described later in the data memory area 404.

The motion judging program 402g is a program for determining a presence or absence of a flapping motion by the player and the kind of the flapping motion (large-flapping motion or small-flapping motion) on the basis of the result obtained by performing discrete Fourier transform on the time variation of the weight ratio WR calculated for each game frame for a certain period of time (30 game frames in this embodiment).

The translational motion calculating program 402h is a program for calculating a position (three-dimensional coordinate) after a certain period of time (1 game frame) of the player object 202 on the basis of a driving force obtained by a flapping motion or the y-coordinate of the barycentric position (YG) calculated according to the barycentre calculating program 402.

The rotational motion calculating program 402i is a program for calculating a rotation amount about the x-axis of the local coordinate of the player object 202 and a rotation amount about the y-axis of the local coordinate of the player object 202 on the basis of the coordinate (XG, YG) of the barycentric position calculated according to the barycentre calculating program 402f. The animation synchronizing program 402j is a program for synchronizing an animation of the flapping motion of the player object 202 with the flapping motion of the player.

Although illustration is omitted, the game program includes a sound output program, a backup program, etc. The sound output program is a program for generating a sound necessary for the game, such as a voice of the player object (onomatopoeic sound), a sound effect, a music (BGM), and outputting the same from the speaker 34a. The backup program is a program for saving game data (proceeding data, result data) stored in the main memory (42e, 46) in the flash memory 44 and an SD card.

FIG. 21 shows a detailed content of the data memory area 404. As shown in FIG. 21, the data memory area 404 is provided with a weight ratio data buffer 404a. Furthermore, the data memory area 404 stores image data 404b, large-flapping animation data 404c, small-flapping animation data 404d, descending-time animation data 404e, reference value data 404f, current load value data 404g and barycentric position data 404h. In addition, the data memory area 404 is provided with a during-descending flag 404i, a weight-ratio-declining flag 404j, an arm-raising-determination flag 404k, an arm-lowering-determination flag 404m, an arm-raising-acceleration flag 404n, an arm-lowering-acceleration flag 404p, a large-flapping flag 404q, a small-flapping flag 404r, a landing-successful flag 404s, a landing-unsuccessful flag 404t, a game clear flag 404u, and a game over flag 404v.

The weight ratio data buffer 404a is a data buffer for storing in chronological order weight ratio data calculated for each game frame according to the ratio calculating program 402e.

The image data 404b is data, such as polygon data, texture data, etc. to be used when game image data is generated according to the image generating program 402b. The large-flapping animation data 404c is animation data in a case that the player object 202 performs a large-flapping motion, and is constructed of 60 pieces (frames) of the animation frame. The small-flapping animation data 404d is animation data in a case that the player object 202 performs a small-flapping motion, and is constructed of 60 pieces of animation frame. As described above, only a movable range of the wings is different between the large-flapping motion and the small-flapping motion. The descending-time animation data 404e is animation data in a case that the player object 202 is descending, and is constructed of 45 pieces of animation frame.

The reference value data 404f is numerical value data as to the load value acquired according to the load acquiring program 402d prior to the start of the main part of the virtual game, that is, as to the body weight value of the player. The current load value data 404g is numerical value data as to the current load value (in the current frame) acquired according to the load acquiring program 402d. The barycentric position data 404h is coordinate data as to coordinate (XG, YG) of the current barycentric position (in the current frame) calculated according to the barycentre calculating program 402f.

The during-descending flag 404i is a flag for determining whether or not the player object 202 is being descending, and is constructed of a one-bit register. In a case that the player object 202 is descending, the during-descending flag 404i is established (turned on), and a data value of "1" is set to the register. On the other hand, in a case that the player object 202 is not descending, the during-descending flag 404i is not established (turned off), and a data value of "0" is set to the register.

The weight-ratio-declining flag 404j is a flag for determining whether or not the weight ratio WR declines (reduces), and is constructed of a one-bit register. In a case that the weight ratio WR declines, the weight-ratio-declining flag 404j is turned on, and a data value of "1" is set to the register. On the other hand, in a case that the weight ratio WR does not decline, that is, in a case that the weight ratio WR rises or does not change, the weight-ratio-declining flag 404j is turned off, and a data value of "0" is set to the register.

The arm-raising-determination flag 404k is a flag for determining whether or not the start of the arm-raising motion is judged, and is constructed of a one-bit register. When it is determined that an arm-raising motion is started, the arm-raising-determination flag 404k is turned on, and a data value of "1" is set to the register. On the other hand, when it is determined an arm-lowering motion is started, the arm-raising-determination flag 404k is turned off, and a data value of "0" is set to the register. It should be noted that in a case that the arm-lowering-determination flag 404m described later is turned on as well, the arm-raising-determination flag 404k is turned off.

The arm-lowering-determination flag 404m is a flag for determining whether or not an arm-lowering motion is started, and is constructed of a one-bit register. When it is determined that an arm-lowering motion is started, the arm-lowering-determination flag 404m is turned on, and a data value of "1" is set to the register. On the other hand, when it is determined an arm-raising motion is started, the arm-lowering-determination flag 404m is turned off, and a data value of "0" is set to the register. It should be noted that in a case that the above-described arm-raising-determination flag 404k is turned on as well, the arm-lowering-determination flag 404m is turned off.

The arm-raising-acceleration flag 404n is a flag for determining whether or not the animation frame is accelerated in correspondence with an arm-raising motion, and is constructed of a one-bit register. When it is determined that an arm-raising motion is started, the arm-raising-acceleration flag 404n is turned on, and a data value of "1" is set to the register. Furthermore, when it is determined that the arm-raising motion is started, and the animation frame is accelerated, the arm-raising-acceleration flag 404n is turned off, and a data value of "0" is set to the register.

The arm-lowering-acceleration flag 404p is a flag for determining whether or not the animation frame is accelerated in correspondence with an arm-lowering motion, and is constructed of a one-bit register. When it is determined that an arm-lowering motion is started, the arm-lowering-acceleration flag 404p is turned on, and a data value of "1" is set to the register. Furthermore, it is determined that an arm-lowering motion is started, and the animation frame is accelerated, the arm-lowering-acceleration flag 404p is turned off, and a data value of "0" is set to the register.

The large-flapping flag 404q is a flag for determining whether or not a large-flapping motion is judged, and is constructed of a one-bit register. When a large-flapping motion is judged, the large-flapping flag 404q is turned on, and a data value of "1" is set to the register. On the other hand, when a large-flapping motion is not judged, the large-flapping flag 404q is turned off, and a data value of "0" is set to the register. It should be noted that in a case that the small-flapping flag 404r described later is turned on and in a case that the player performs no flapping motion as well, the large-flapping flag 404q is turned off.

The small-flapping flag 404r is a flag for determining whether or not a small-flapping motion is judged, and is constructed of a one-bit register. When a small-flapping motion is judged, the small-flapping flag 404r is turned on, and a data value of "1" is set to the register. On the other hand, if a small-flapping motion is not judged, the small-flapping flag 404r is turned off, and a data value of "0" is set to the register. It should be noted that in a case that the above-described large-flapping flag 404q is turned on, and in a case that the player performs no flapping motion as well, the small-flapping flag 404r is turned off.

The landing-successful flag 404s is a flag for determining whether or not the player object 202 is successful in landing in the non player object 204, and is constructed of a one-bit register. When the player object 202 is successful in landing in the non player object 204, the landing-successful flag 404s is turned on, and a data value of "1" is set to the register. On the other hand, if the player object 202 is not successful in landing in the non player object 204, the landing-successful flag 404s is turned off, and a data value of "0" is set to the register.

The landing-unsuccessful flag 404t is a flag for determining whether or not the player object 202 is unsuccessful in landing in the non player object 204, and is constructed of a one-bit register. When the player object 202 is unsuccessful in landing in the non player object 204, the landing-unsuccessful flag 404t is turned on, and a data value of "1" is set to the register. On the other hand, when the player object 202 is not unsuccessful in landing in the non player object 204, the landing-unsuccessful flag 404t is turned off, and a data value of "0" is set to the register.

The game clear flag 404u is a flag for determining whether or not the virtual game is to be cleared, and is constructed of a one-bit register. When the game is to be cleared, the game clear flag 404u is turned on, and a data value "1" is set to the register. On the other hand, when the game is not to be cleared, the game clear flag 404u is turned off, and a data value "0" is set to the register.

The game over flag 404v is a flag for determining whether or not the virtual game becomes a game over, is constructed of a one-bit register. When it becomes the game over, the game over flag 404v is turned on, and a data value of "1" is set to the register. On the other hand, when it does not become a game over, the game over flag 404v is turned off, and a data value of "0" is set to the register.

Although illustration is omitted, the data memory area 404 stores other data such as sound data, and is provided with a timer (counter) and other flags necessary for execution of the game program.

More specifically, the CPU 40 shown in FIG. 2 executes entire processing according to a flowchart shown in FIG. 22-FIG. 25. Although illustration is omitted, the CPU 40 performs a discrete Fourier transform processing on the time variation of the weight ratio WR every certain period of time (30 game frames) by a task separate from the entire processing.

Figure 22:
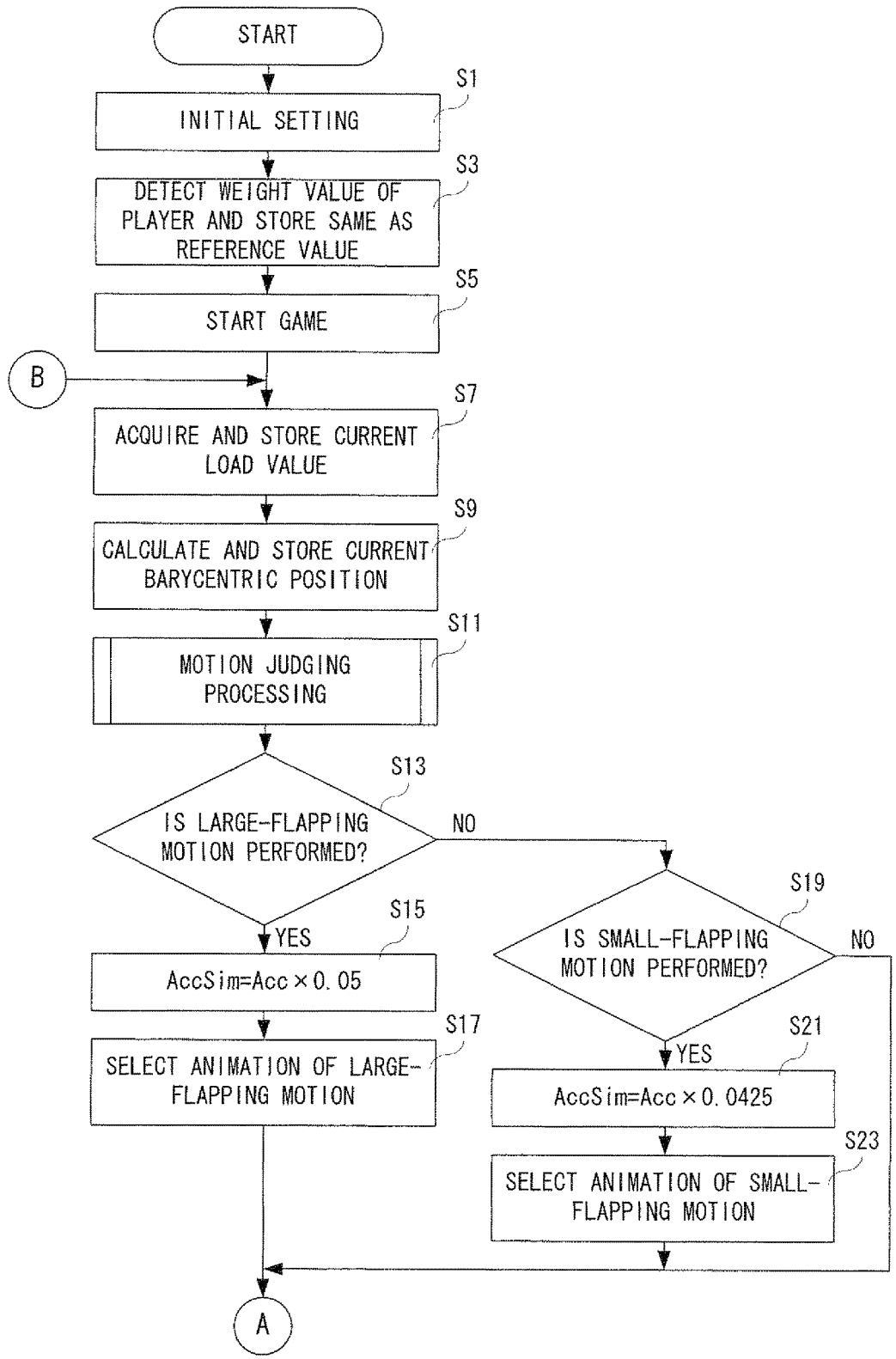
FIG. 22 is a flowchart showing a part of game entire processing by the CPU shown in FIG. 2.

As shown in FIG. 22, when the entire processing is started, an initial setting is executed in a step S1. In the step S1, the CPU 40 clears the weight ratio data buffer 404a, the reference value data 404f, the current load value data 404g and the barycentric position data 404h, loads the image data 404b, the large-flapping animation data 404c, the small-flapping animation data 404d and the descending-time animation data 404e into the data memory area 404, and turns each of the flags 404i-404v off.

In a next step S3, a body weight value of the player is detected, and stored as a reference value. That is, prior to the start of the main part of the virtual game, the CPU 40 acquires a sum of the load values detected in the four load sensors 36b as a body weight value, and stores the numerical value data as the reference value data 404f in the data memory area 404. Then, in a step S5, the main part of the virtual game is started.

Succeedingly, in a step S7, a current load value (in the current frame) is acquired, and the acquired load value is stored. That is, the CPU 40 acquires a sum of the load values detected by the four load sensors 36b as a current load value, and stores the numerical value data as the current load value data 404g in the data memory area 404.

Here, the scan time for the processing of the steps S7-S79 is one game frame (1/60 (seconds)), so that the current load value is detected for each game frame during the virtual game. That is, the current load value data 404g is updated for each game frame. This is true for the barycentric position data 404h described next.

In a step S9, a current barycentric position is calculated, and the calculated barycentric position is stored. That is, the CPU 40 calculates the coordinate (XG, YG) of the barycentric position of the current frame according to the Equation 2 and the Equation 3 by utilizing the load value acquired from the four load sensors 36b, and stores the coordinate data as to the coordinate (XG, YG) of the calculated barycentric position as the barycentric position data 404h in the data memory area 404.

Succeedingly, in a step S11, motion judging processing (see FIG. 26-FIG. 28) described later is executed. In a next step S13, it is determined whether or not a large-flapping motion is performed on the basis of the result of the motion judging processing. Here, the CPU 40 determines whether or not the large-flapping flag 404q is turned on. If "YES" is determined in the step S13, that is, if the large-flapping flag 404q is turned on, it is determined that a large-flapping motion is performed, and in a step S15, to the driving force AccSim to be utilized in the integration simulation, a value obtained by multiplying the driving force Acc calculated by the weight ratio WR by 0.05 (AccSim=Acc×0.05) is set, in a step S17, a large-flapping animation is selected, and the process proceeds to a step S25 shown in FIG. 23.

Alternatively, if "NO" is determined in the step S13, that is, if the large-flapping flag 404q is turned off, it is determined whether or not a small-flapping motion is performed in a step S19. That is, the CPU 40 determines whether or not the small-flapping flag 404r is turned on. If "NO" is determined in the step S19, that is, if a small-flapping motion is not performed, it is determined that the player performs no flapping motion, and the process proceeds to the step S25 as it is. On the other hand, if "YES" is determined in the step S19, that is, if a small-flapping motion is performed, in a step S21, to the driving force AccSim to be utilized in the integration simulation, a value obtained by multiplying the driving force Acc calculated by the weight ratio WR by 0.0425 (AccSim=Acc×0.0425) is set, in a step S23, a small-flapping animation is selected, and the process proceeds to the step S25.

Figure 23:
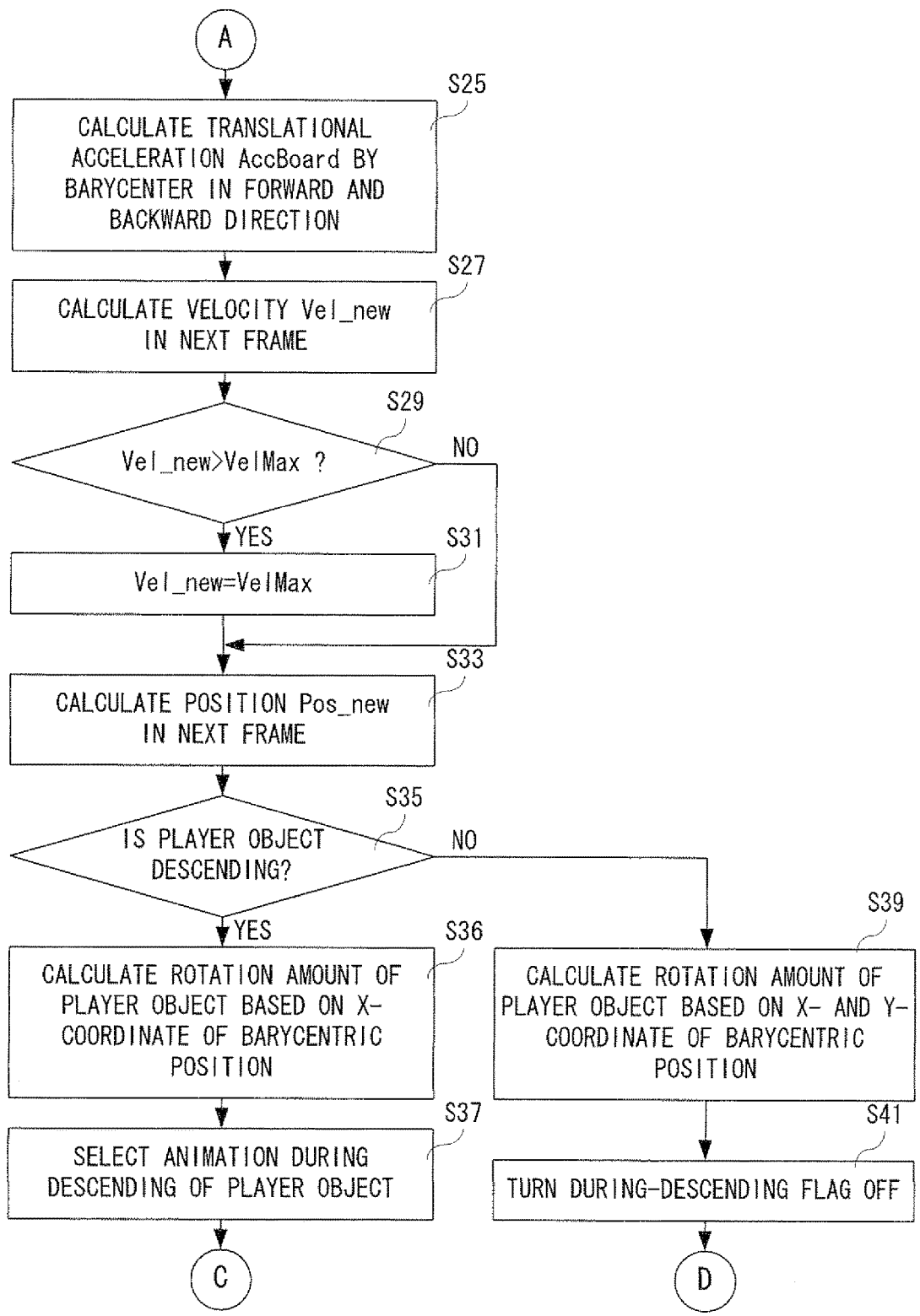
FIG. 23 is a flowchart being sequel to FIG. 22 and showing another part of the game entire processing by the CPU shown in FIG. 2.

In the step S25 shown in FIG. 23, a translational acceleration AccBoard by the barycenter in the forward and backward direction, that is, the y-coordinate of the barycentric position (YG) is calculated. In a next step S27, a velocity Vel_new (in the next frame) after movement of the player object 202 is calculated according to the Equation 3. Succeedingly, in a step S29, it is determined whether or not the velocity Vel_new is larger than a maximum velocity Vel- Max. If "NO" is determined in the step S29, that is, if the velocity Vel_new is equal to or less than the maximum velocity VelMax, the process proceeds to a step S33 as it is. On the other hand, if "YES" is determined in the step S29, that is, if the velocity Vel_new is larger than the maximum velocity VelMax, the maximum velocity VelMax is set to the velocity Vel_new in a step S31, and the process proceeds to the step S33. That is, in the step S31, the velocity Vel_new is restricted by the maximum velocity VelMax.

In the step S33, a three-dimensional position Pos_new after movement of the player object 202 is calculated according to the Equation 4. In a next step S35, it is determined whether or not the player object 202 is descending. Here, the CPU 40 determines whether or not a Y component of the current velocity Vel_old of the player object 202 is less than a certain value (−0.7 in this embodiment). If "NO" is determined in the step S35, that is, if the Y component of the current velocity Vel_old is equal to or more than the certain value, it is determined that the player object 202 is not descending, and in a step S39, a rotation amount of the player object 202 is calculated on the basis of the x-coordinate (XG) and the y-coordinate (YG) of the barycentric position and, and in a step S41, the during-descending flag 404*i* is turned off, and the process proceeds to a step 53 shown in FIG. 24.

That is, in the step S39, the CPU 40 calculates the rotation amount about the x-axis of the local coordinate on the basis of the y-coordinate of the barycentric position (YG) and the rotation amount about the y-axis of the local coordinates on the basis of the x-coordinate of the barycentric position (XG). By the rotation amount about the x-axis and the rotation amount about the y-axis, a direction (Z vector (Xz, Yz, Zz)) to which the z-axis of the local coordinate of the player object 202 is applied is first decided in the three-dimensional virtual space. Next, a direction (X vector (Xx, Yx, Zx)) which is orthogonal to the Z vector, and to which the x-axis of the local coordinate extending to the direction of the left hand of the player object 202 is applied is decided. In addition, an outer product between the Z vector and the X vector is evaluated, and in the three-dimensional virtual space, a direction (Y vector (Xy, Yy, Zy)) to which the y-axis of the local coordinate of the player object 202 is applied, that is, a unit vector AccDir is decided. Here, each of the X vector, the Y vector, and the Z vector is a unit vector of a magnitude "1".

Figure 24:
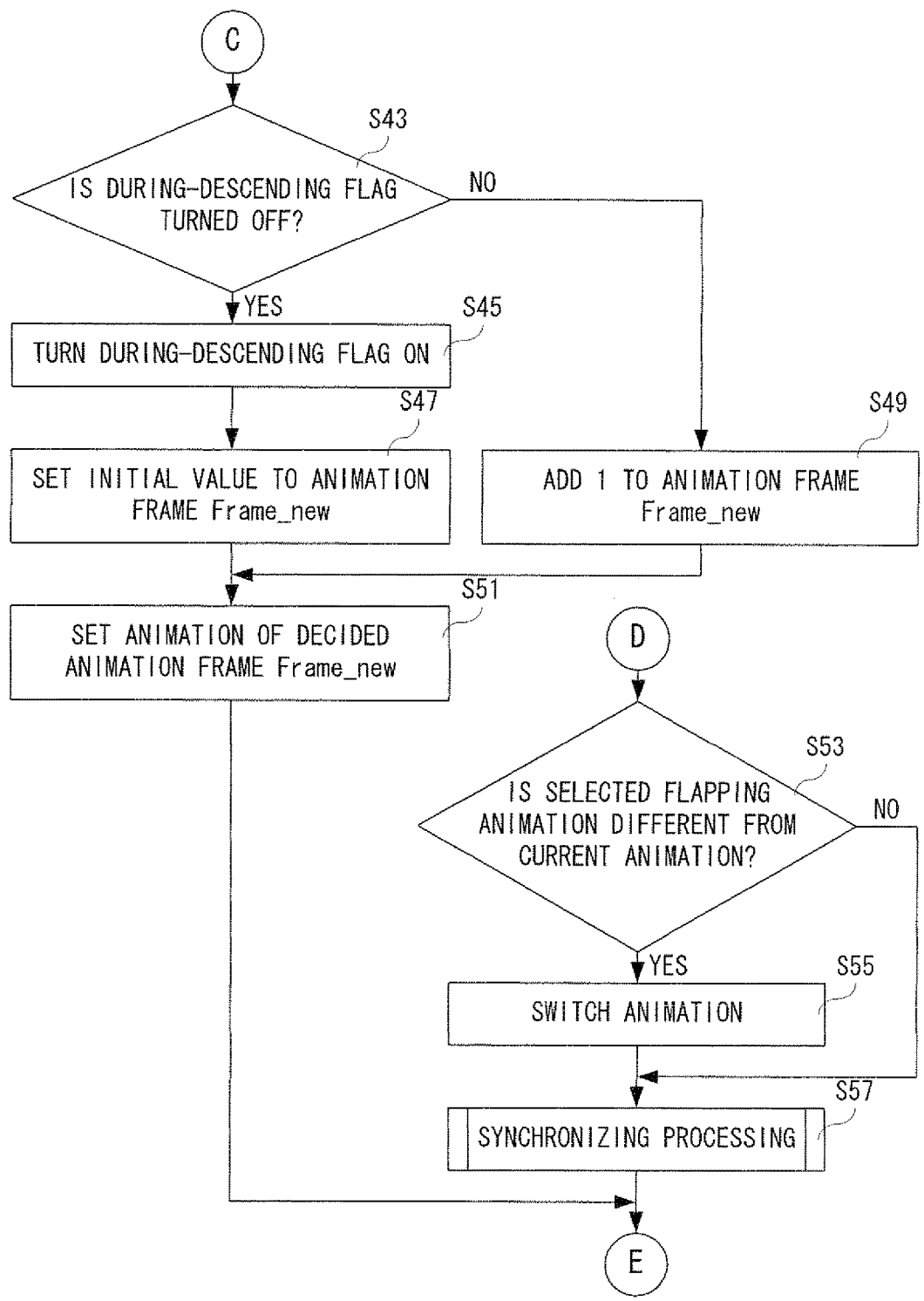
FIG. 24 is a flowchart being sequel to FIG. 23 and showing a still another part of the game entire processing by the CPU shown in FIG. 2.
Figure 25:
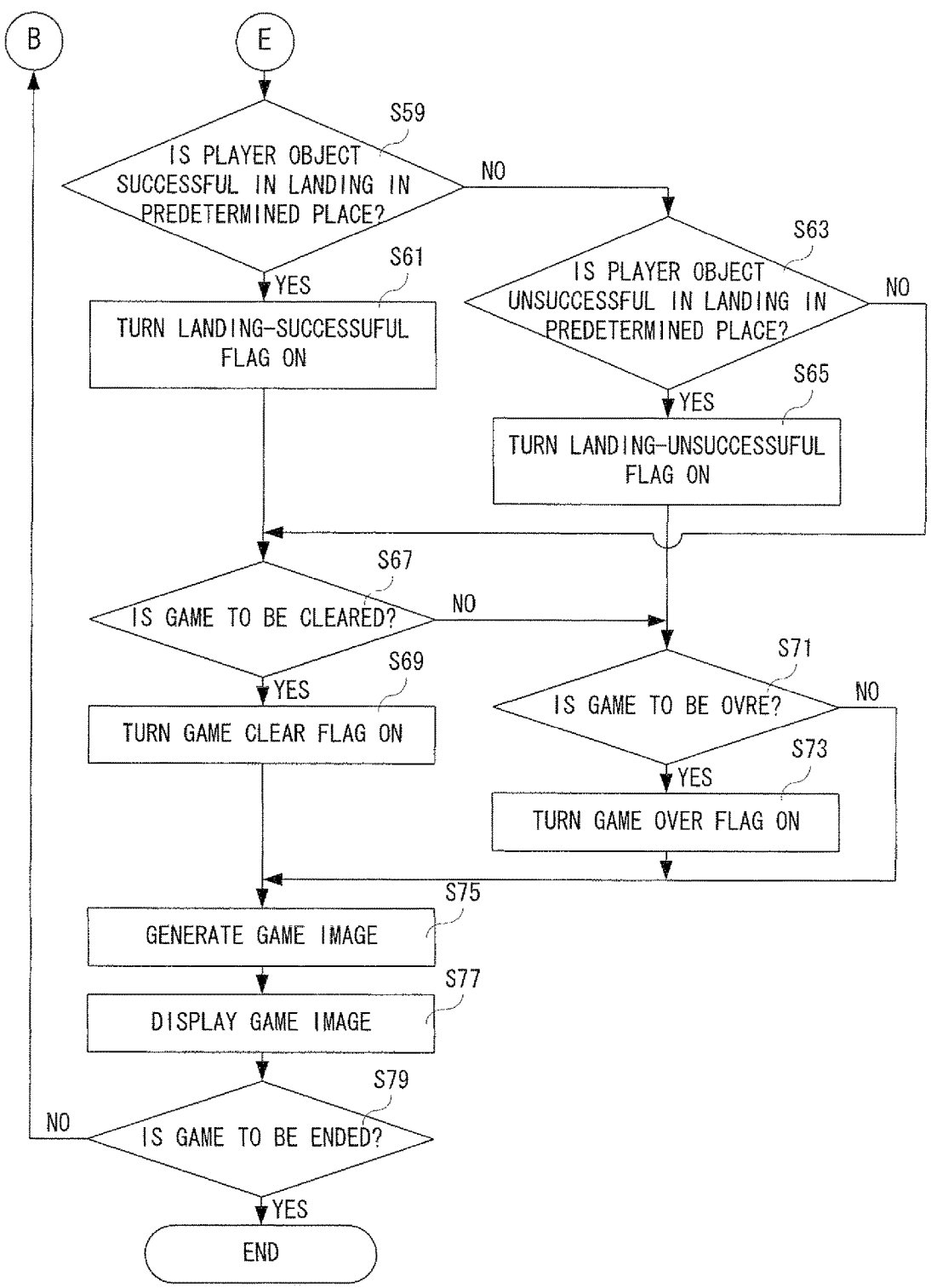
FIG. 25 is a flowchart being sequel to FIG. 24 and showing a farther part of the game entire processing by the CPU shown in FIG. 2.

On the other hand, if "YES" is determined in the step S35, that is, if the Y component of the current velocity Vel_old is less than the certain value, it is determined that the player object 202 is descending, and in a step S36, a rotation amount of the player object 202 is calculated on the basis of the x-coordinate of the barycentric position (XG), and in a step S37, an animation during descending of the player object 202 is selected, and the process proceeds to a step S43 shown in FIG. 24.

That is, in the step S36, the CPU 40 calculates only the rotation amount about the y-axis of the local coordinate of the player object 202 on the basis of the x-coordinate of the barycentric position (XG), and decides a direction (z vector) to which the z-axis of the local coordinate of the player object 202 is applied in the three-dimensional virtual space. Thereafter, as described above, a direction (x vector) to which the x-axis of the local coordinate of the player object 202 is applied in the three-dimensional virtual space is decided. In addition, a direction (y vector) to which the y-axis of the local coordinate of the player object 202 is applied in the three-dimensional virtual space is decided.

In the step S43 shown in FIG. 24, it is determined whether or not the during-descending flag 404*i* is turned off. That is, the CPU 40 determines whether or not the player object 202 starts to descend. If "YES" is determined in the step S43, that is, if the during-descending flag 404*i* is turned off, it is determined that that the player object 202 starts to descend, the during-descending flag 404*i* is turned on in a step S45, and an initial value (0 in this embodiment) of the frame number is set to the animation frame Frame_new in a step S47, an animation of the decided animation frame Frame_new is set in a step S51, and then, the process proceeds to a step S59 shown in FIG. 25.

On the other hand, if "NO" is determined in the step S43, that is, if the during-descending flag 404*i* is turned on, it is determined that the player object 202 has already been descending, in a step S49, 1 is added to the animation frame Frame_new, and the process proceeds to the step S51. Here, if the current value of the animation frame Frame_new is "44", that is, if the animation frame is the last frame, when the animation frame Frame_new is added by one in the step S49, the value is set to "0". That is, the frame number of the animation frame is returned to the initial value.

Furthermore, as shown in FIG. 23, in a case that the player object 202 is not descending, "NO" is determined in the step S37, the during-descending flag 404*i* is turned off in a step S41, and then, it is determined whether or not the flapping animation (large-flapping animation and small-flapping animation) selected in the step S17 or the S23 is different from the current flapping animation in the step S53. If "NO" is determined in the step S53, that is, if the selected flapping animation and the current flapping animation match with each other, the process proceeds to a step S57 as it is. On the other hand, if "YES" is determined in the step S53, that is, if the selected flapping animation and the current flapping animation are different from each other, the flapping animation is switched in a step S55, and the process proceeds to the step S57.

It should be noted that in the step S55, the animation is merely switched, but if the switching is abruptly made between the large-flapping animation and the small-flapping animation, the player watching the game screen 200 may have uncomfortable feeling. Thus, in this embodiment, these animations are configured to be blended. Briefly speaking, in a case that the large-flapping animation is switched to the small-flapping animation, both of the animations are reproduced. For example, at the moment of switching the animation, the reproduction ratio of the large-flapping motion is 1.0, and the reproduction ratio of the small-flapping motion is 0.0. Here, the large-flapping animation and the small-flapping animation are coincident with each other in the frame number of the animation frame. The reproduction ratio is varied for a certain period of time (30 game frames=0.5 seconds in this embodiment) gradually (linearly or step-by-step, for example), that is, the reproduction ratio of the large-flapping motion is reduced while the reproduction ratio of the small-flapping motion is increased. When a certain period of time elapses from the start of switching the animation (the 30th game frame for example), the reproduction ratio of the large-flapping motion becomes 0.0, and the reproduction ratio of the small-flapping motion becomes 1.0. Thus, the large-flapping animation is switched to the small-flapping animation. Although an explanation is omitted, this is true for a case that the small-flapping animation is switched to the large-flapping animation.

Returning to FIG. 24, in the step S57, synchronizing processing (FIG. 29-FIG. 31) described later is executed. Succeedingly, in the step S59 shown in FIG. 25, it is determined whether or not the player object 202 is successful in landing in a predetermined place. Here, the CPU 40 determines whether or not the player object 202 lands in the non player object 204 to be landed. Although detailed explanation is omitted, the non player object 204 to be landed is set in advance, or is variably set in correspondence with the progress of the virtual game. Here, the CPU 40 determines whether or not the player object 202 is on, that is, lands in the non player object 204 by performing a hit determination between the player object 202 and the non player object 204 to be landed.

If "YES" is determined in the step S59, that is, if it is determined that the player object 202 is successful in landing in the predetermined place, if the landing-successful flag 404s is turned on in a step S61, and the process proceeds to a step S67. If "NO" is determined in the step S59, that is, if the player object 202 is flying, falls in the sea, lands again in the non player object 204 where the player object 202 has already been landed in, it is determined that the player object 202 is not successful in landing the predetermined place, and in a step S63, it is determined whether or not the player object 202 is unsuccessful in landing in the predetermined place. Here, the CPU 40 determines whether or not the player object 202 lands in a non player object 204 except for the non player object 204 to be landed or falls in the sea surrounding the non player object 204.

If "NO" is determined in the step S63, that is, if the player object 202 is flying, it is determined that the player object 202 is not unsuccessful in landing in the predetermined place, and the process proceeds to the step S67. On the other hand, if "YES" is determined in the step S63, that is, if the player object 202 lands in the non player object 204 except for the non player object 204 to be landed, or the player object 202 falls in the sea surrounding the non player object 204, it is determined that the player object 202 is unsuccessful in landing in the predetermined place, in a step S65, the landing-unsuccessful flag 404t is turned on, and the process proceeds to a step S71 as it is.

In the step S67, it is determined whether or not a game is to be cleared. That is, the CPU 40 determines whether or not the player object 202 reaches the goal via all the predetermined landing places. If "YES" is determined in the step S67, that is, if the game is to be cleared, the game clear flag 404u is turned on in a step S69, and the process proceeds to a step S75.

On the other hand, if "NO" is determined in the step S67, that is, if the game is not to be cleared, it is determined whether a game is to be over in the step S71. Here, the CPU 40 determines whether or not the time limit expires before the player object 202 reaches the goal, whether or not the player object 202 fails in landing by a predetermined number of times (3 times, for example), or whether or not a time during which the player object 202 falls in the sea is above a predetermined time (10 seconds, for example). If "NO" is determined in the step S71, that is, if the game is not to be over, the process directly proceeds to the step S75. On the other hand, if "YES" is determined in the step S71, that is, if the game is to be over, the game over flag 404v is turned on in a step S73, and the process proceeds to the step S75.

In the step S75, a game image is generated. Here, the CPU 40 arranges the player object 202 in the three-dimensional virtual space according to the determinant A shown in the Equation 6, and draws (updates) the game image by reading the animation of the animation frame set in the step S51 from the descending-time animation data 404c, and reading the animation of the animation frame set in the synchronizing processing in the step S57 from the flapping animation data (404c, 404d). Furthermore, a background image including the non player object 204 is drawn (updated). In addition, if the landing-successful flag 404s, the landing-unsuccessful flag 404t, the game clear flag 404u or the game over flag 404v is turned on, an image representing successful landing, unsuccessful landing, game clear or game over is generated. For example, a text indicating successful landing, unsuccessful landing, game clear or game over overwrites the game image. At this time, although illustration is omitted, a sound effect or music in correspondence with successful landing, unsuccessful landing, game clear or game over is output.

In a next step S77, the game image is displayed. That is, the CPU 40 displays the game image generated (updated) in the step S75 as a game screen (200, etc.) on the monitor 34. Then, in a step S79, it is determined whether the game is to be ended or not. Here, the CPU 40 determines whether or not a game end is instructed according to an operation by the player. If "NO" is determined in the step S79, that is, if the game is not to be ended, the process returns to the step S7 shown in FIG. 22. However, if the game is to be over, the virtual game is started from the top. On the other hand, if "YES" is determined in the step S79, that is, if the game is to be ended, the entire processing is ended as it is.

Although illustration is omitted, the landing-successful flag 404s and the landing-unsuccessful flag 404t are turned off from the step S75 to when the process returns to the step S7 in response to "NO" being determined in the step S79.

Figure 26:
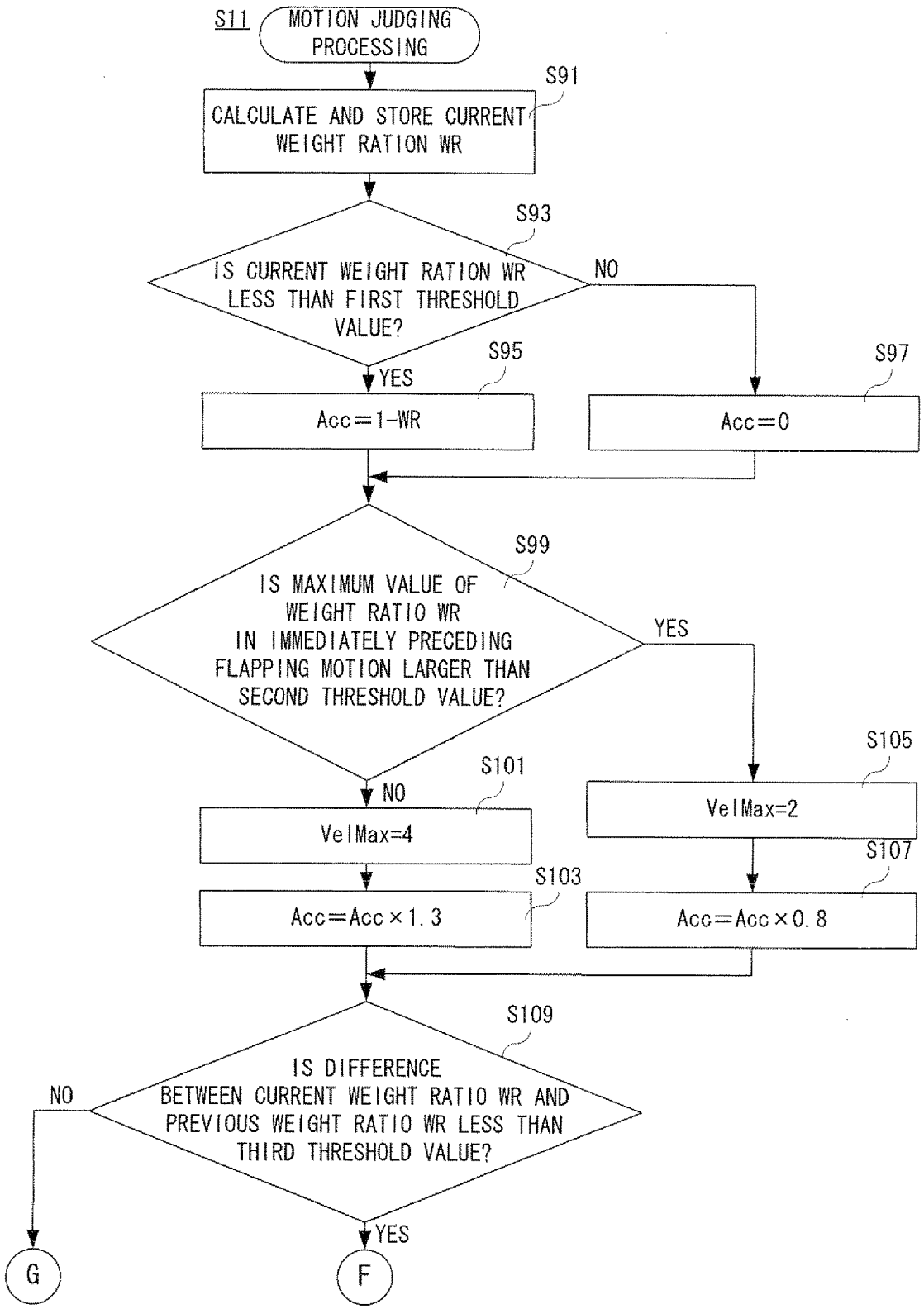
FIG. 26 is a flowchart showing a part of a motion judging processing by the CPU shown in FIG. 2.
Figure 27:
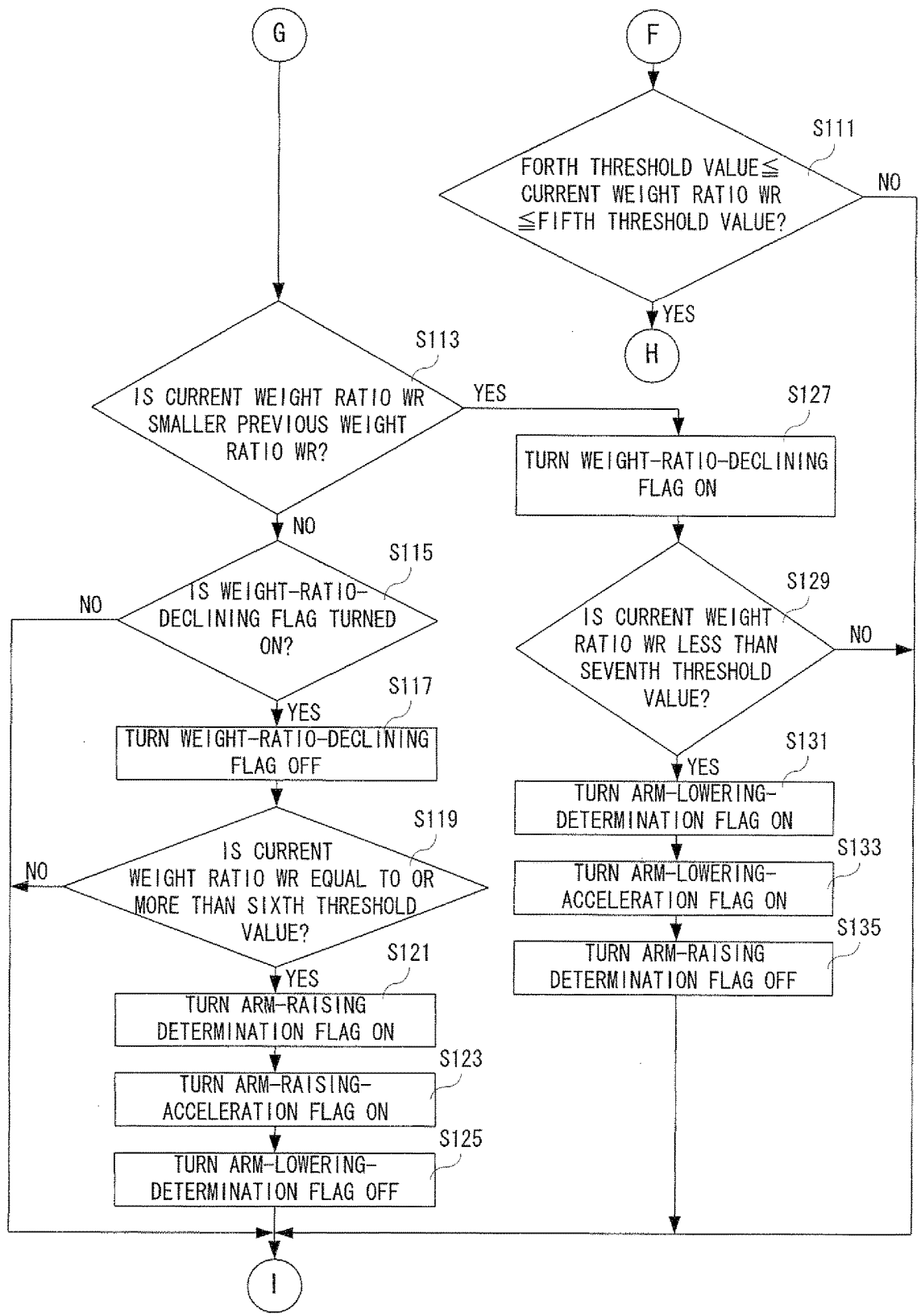
FIG. 27 is a flowchart being sequel to FIG. 26 and showing another part of the motion judging processing by the CPU shown in FIG. 2.
Figure 28:
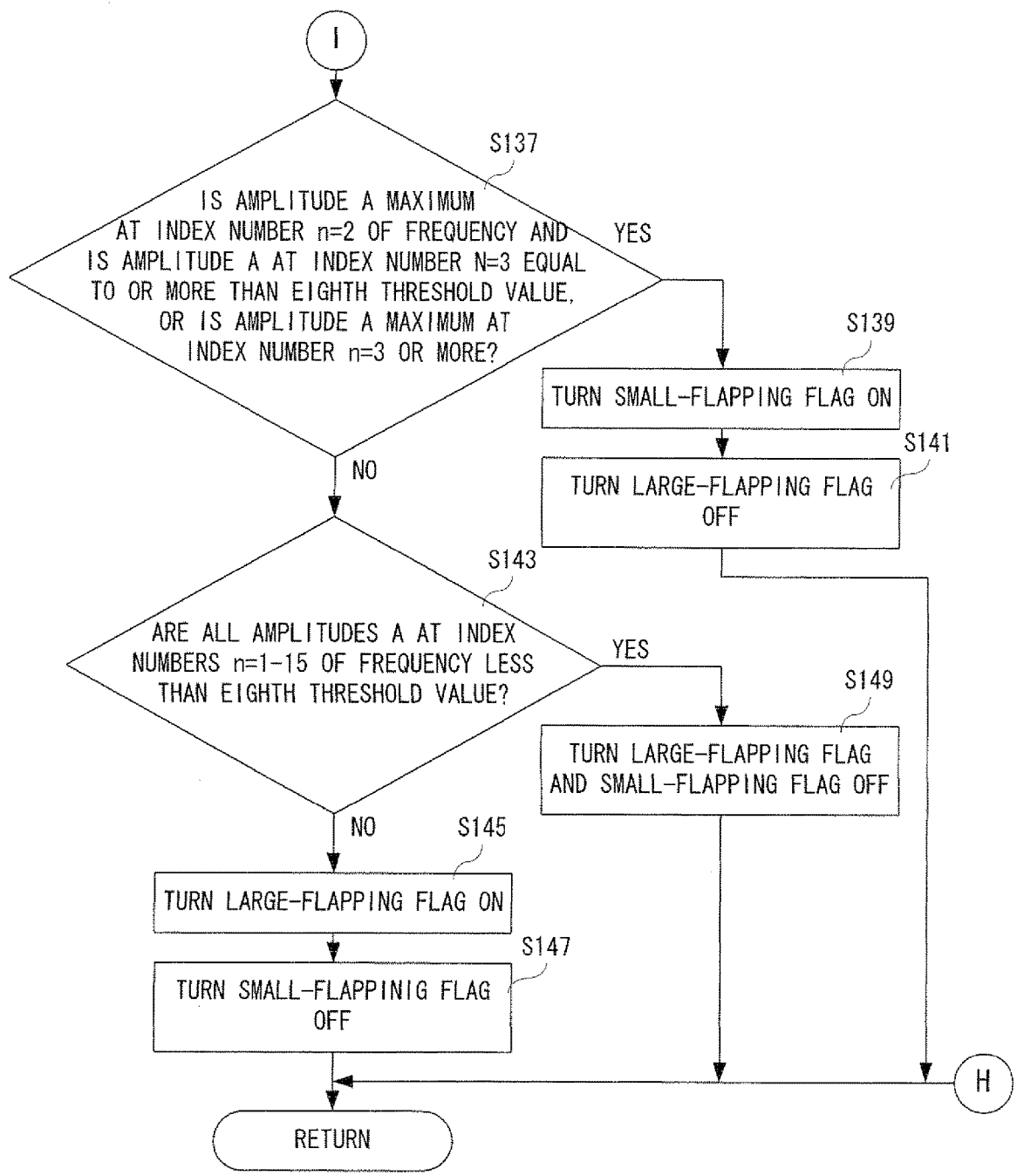
FIG. 28 is a flowchart being sequel to FIG. 27 and showing still another part of the motion judging processing by the CPU shown in FIG. 2.

FIG. 26-FIG. 28 is a flowchart showing motion judging processing in the step S11 shown in FIG. 22. As shown in FIG. 26, when starting the motion judging processing, the CPU 40 calculates and stores the current weight ratio WR in a step S91. That is, a current weight ratio WR is calculated by dividing the load value indicated by current load value data 404g by the reference value (body weight value) indicated by the reference value data 404f, and the weight ratio data is stored in the weight ratio data buffer 404a.

In a next step S93, it is determined whether or not the current weight ratio WR is less than a first threshold value (0.985 in this embodiment). That is, the CPU 40 determines whether or not a driving force Acc is to be applied to the player object 202. If "YES" is determined in the step S93, that is, if the current weight ratio WR is less than the first threshold value, 1-weight ratio WR is set to the driving force Acc in a step S95, and the process proceeds to a step S99. That is, the driving force Acc in correspondence with the weight ratio WR is calculated (set). On the other hand, if "NO" is determined in the step S93, that is, if the current weight ratio WR is equal to or more than the first threshold value, 0 is set to the driving force Acc in a step S97, and the process proceeds to the step S99.

In the step S99, it is determined whether or not the maximum value of the weight ratio WR in an immediately-preceding flapping motion (flapping section) is larger than a second threshold value (1.3 in this embodiment). That is, the CPU 40 determines whether or not an operation input by the player is performed by bending and stretching exercises. It should be noted that the immediately-preceding flapping section means a section from when the start of the last-but-one-arm-lowering motion is determined to when the start of the previous (immediately-preceding)-arm-lowering motion is determined.

If "NO" is determined in the step S99, that is, if the maximum value of the weight ratio WR in the immediately-preceding flapping motion is equal to or less than the second threshold value, it is determined that the operation input by the player is not performed by the bending and stretching exercises, the maximum velocity VelMax is set to the highest velocity (4 in this embodiment) of the player object 202 in a step S101, the driving force Acc is multiplied by 1.3 (Acc=Acc×1.3) in a step S103, and then, the process proceeds to a step S109. On the other hand, if "YES" is determined in the step S99, that is, if the maximum value of the weight ratio WR in the immediately-preceding flapping motion is larger than the second threshold value, it is determined that the operation input by the player is performed by the bending and stretching exercises, in a step S105, the maximum velocity VelMax is set to the half the highest velocity (2 in this embodiment) of the player object 202, in a step S107, the driving force Acc is multiplied by 0.8 (Acc=Acc×0.8), and the process proceeds to the step S109.

Thus, in the steps S99-S107, in a case of an operation input intended by the developer, et al. of the virtual game, the player object 202 is configured to be easily advanced, and on the contrary thereto, in a case of an operation input not intended by the developer, et al., the player object 202 is configured not to be easily advanced. Accordingly, the numerical value set to the maximum velocity VelMax and the coefficient to be multiplied by the driving force Acc are not required to be restricted to the values in this embodiment.

In the step S109, it is determined whether or not the difference between the current weight ratio WR (in the current frame) and the previous weight ratio WR (in the previous frame) is less than a third threshold value (0.001 in this embodiment). If "YES" is determined in the step S109, that is, if the difference between the current weight ratio WR and the previous weight ratio WR is less than the third threshold value, it is determined whether or not the current weight ratio WR is equal to or more than a fourth threshold value (0.99 in this embodiment) and equal to or less than a fifth threshold value (1.01 in this embodiment) in a step S111 shown in FIG. 27.

If "YES" is determined in the step S111, that is, if the current weight ratio WR is equal to or more than the fourth threshold value and equal to or less than the fifth threshold value, it is determined that weight ratio WR does not rise or decline, and the motion judging processing is ended as it is as shown in FIG. 28. On the other hand, if "NO" is determined in the step S111, that is, if the current weight ratio WR is less than the fourth threshold value, or more than the fifth threshold value, the process proceeds to a step S137 shown in FIG. 28 as it is. Although illustration is omitted, in such a case, the previous determination result as to the rise and decline of the weight ratio WR is maintained.

Returning to FIG. 26, if "NO" is determined in the step S109, that is, if the difference between the current weight ratio WR and the previous weight ratio WR is equal to or more than the third threshold value, it is determined that the current weight ratio WR is smaller than the previous weight ratio WR in a step S113 shown in FIG. 27. That is, the CPU 40 determines whether or not the weight ratio WR declines or rises. If "NO" is determined in the step S113, that is, if the current weight ratio WR is larger than the previous weight ratio WR, it is determined that the weight ratio WR rises, and it is determined whether or not the weight-ratio-declining flag 404*j* is turned on in a step S115. That is, the CPU 40 determines whether or not the weight ratio WR declines and then rises.

If "NO" is determined in the step S115, that is, if the weight-ratio-declining flag 404*j* is turned off, it is determined that the weight ratio WR is rising, and the process proceeds to the step S137 as it is. On the other hand, if "YES" is determined in the step S115, that is, if the weight-ratio-declining flag 404*j* is turned on, it is determined that the weight ratio WR declines and then rises, in a step S117, the weight-ratio-declining flag 404*j* is turned off, and in a step S119, it is determined whether or not the current weight ratio WR is equal to or more than a sixth threshold value (0.98 in this embodiment). That is, it is determined whether or not an arm-raising motion intended by a developer, et al. is performed.

If "NO" is determined in the step S119, that is, if the current weight ratio WR is less than the sixth threshold value, it is determined not to be an arm-raising motion, and the process proceeds to the step S137 as it is. On the other hand, if "YES" is determined in the step S119, that is, if the current weight ratio WR is equal to or more than the sixth threshold value, it is determined to be an arm-raising motion, in a step S121, the arm-raising-determination flag 404*k* is turned on, in a step S123, the arm-raising-acceleration flag 404*n* is turned on, in a step S125, the arm-lowering-determination flag 404*m* is turned off, and the process proceeds to the step S137.

Alternatively, if "YES" is determined in the step S113, that is, if the current weight ratio WR is smaller than the previous weight ratio WR, it is determined that the weight ratio WR declines, the weight-ratio-declining flag 404*j* is turned on in a step S127, and it is determined whether or not the current weight ratio WR is less than a seventh threshold value (0.985 in this embodiment) in a step S129. That is, the CPU 40 determines whether an arm-lowering motion or not. If "NO" is determined in the step S129, that is, if the current weight ratio WR is equal to or more than the seventh threshold value, it is determined not to be an arm-lowering motion, and the process proceeds to the step S137 as it is. On the other hand, if "YES" is determined in the step S129, that is, if the current weight ratio WR is less than the seventh threshold value, it is determined to be an arm-lowering motion, in a step S131, the arm-lowering-determination flag 404*m* is turned on, in a step S133, the arm-lowering-acceleration flag 404*p* is turned on, in a step S135, the arm-raising-determination flag 404*k* is turned off, and the process proceeds to the step S137.

As shown in FIG. 28, in the step S137, it is determined whether or not the amplitude A is maximum at the index number n=2 of the frequency and the amplitude A at the index number n=3 is equal to or more than an eighth threshold value (0.0001, here), or whether or not the amplitude A is maximum at the index number n=3 or more of the frequency. If "YES" is determined in the step S137, that is, if the amplitude A is the maximum at the index number n=2 of the frequency and the amplitude A at the index number n=3 is equal to or more than the eighth threshold value, or if the amplitude A is the maximum at the index number n=3 or more of the frequency, it is determined to be a small-flapping motion, the small-flapping flag 404*r* is turned on in a step S139, the large-flapping flag 404*q* is turned off in a step S141, and the process returns to the entire processing.

On the other hand, if "NO" is determined in the step S137, that is, if the amplitude A is not the maximum at the index number n=2 of the frequency, if the amplitude A at the index number n=3 is less than the eighth threshold value, or if the amplitude A is not the maximum at the index number n=3 or more of the frequency, all the amplitudes A at the index numbers n=1-15 of the frequency are less than the eighth threshold value in a step S143.

If "NO" is determined in the step S143, that is, if there is the amplitude A being equal to or more than the eighth threshold value out of the amplitudes A at the index number n=1-15 of the frequency, it is determined to be a large-flapping motion, the large-flapping flag 404q is turned on in a step S145, the small-flapping flag 404r is turned off in a step S147, and the process returns to the entire processing.

On the other hand, if "YES" is determined in the step S143, that is, if all the amplitudes A at the index number n=1-15 of the frequency are less than the eighth threshold value, it is determined that no flapping motion is performed, and in a step S149, the large-flapping flag 404q and the small-flapping flag 404r are turned off, and the process returns to the entire processing.

Figure 29:
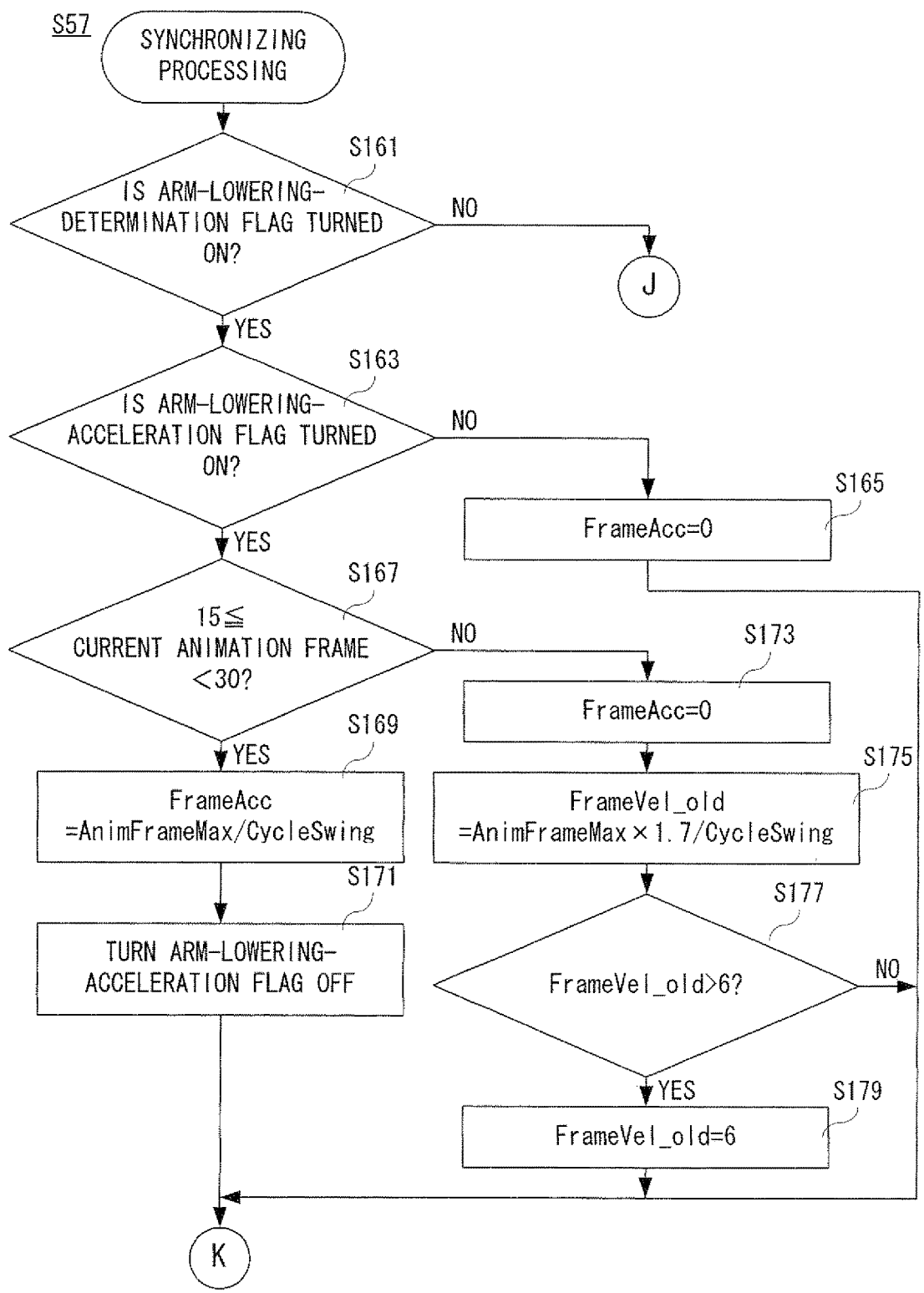
FIG. 29 is a flowchart showing a part of synchronizing processing by the CPU shown in FIG. 2.
Figure 30:
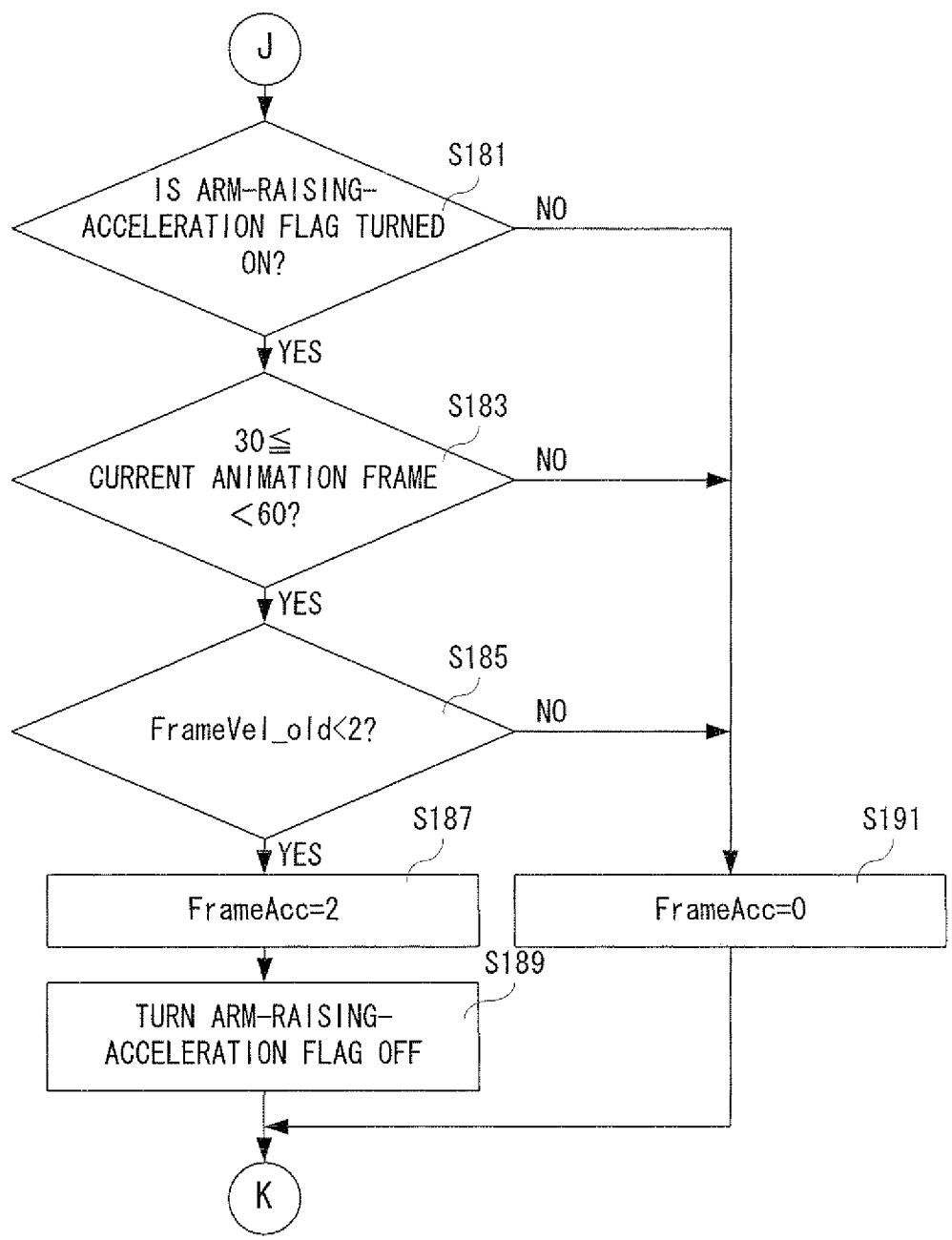
FIG. 30 is a flowchart showing another part of the synchronizing processing by the CPU shown in FIG. 2.
Figure 31:
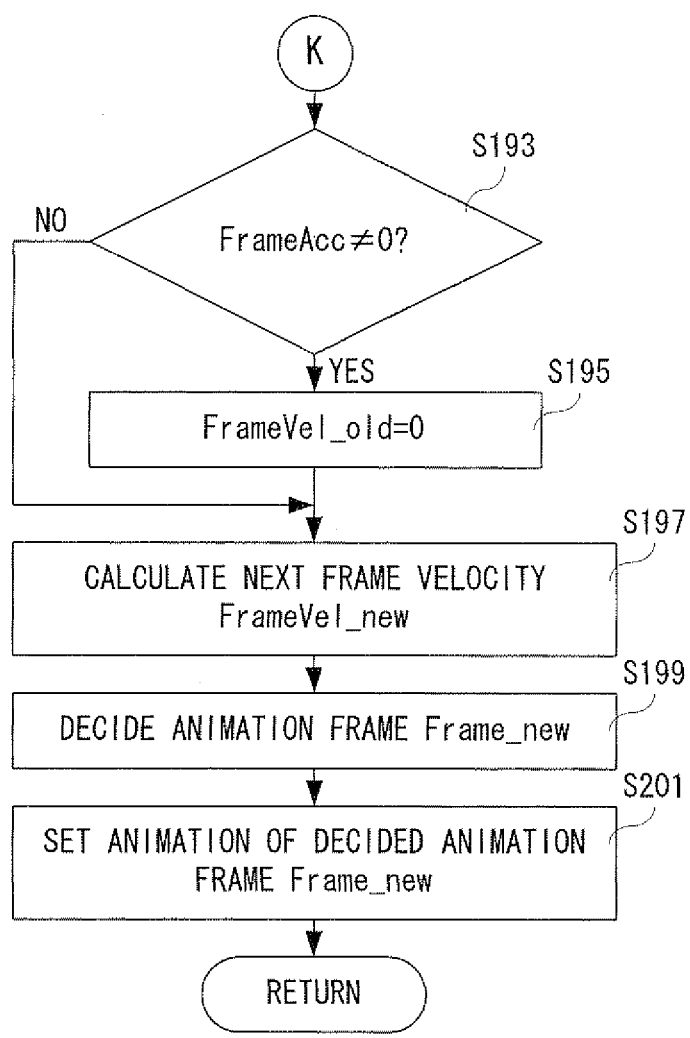
FIG. 31 is a flowchart being sequel to FIG. 29 and FIG. 30, and showing a still another part of the synchronizing processing by the CPU shown in FIG. 2.

FIG. 29-FIG. 31 is a flowchart showing synchronizing processing shown in the step S57 in FIG. 24. As shown in FIG. 29, when starting the synchronizing processing, the CPU 40 determines whether or not the arm-lowering-determination flag 404m is turned on in a step S161. Although detailed explanation is omitted, in the synchronizing processing, the player object 202 is not descending, but a flapping motion is performed by the player, and therefore, the arm-raising-determination flag 404k or the arm-lowering-determination flag 404m is sure to be turned on.

If "NO" is determined in the step S161, that is, if the arm-lowering-determination flag 404m is turned off, and the arm-raising-determination flag 404k is turned on, the process proceeds to a step S181 shown in FIG. 30. On the other hand, if "YES" is determined in the step S161, that is, the arm-lowering-determination flag 404m is turned on and the arm-raising-determination flag 404k is turned off, it is determined whether or not the arm-lowering-acceleration flag 404p is turned on in a step S163. That is, the CPU 40 determines whether or not the animation frame is accelerated in response to the start of the arm-lowering motion by the player.

If "NO" is determined in the step S163, that is, if the arm-lowering-acceleration flag 404p is turned off, it is determined that the animation frame has already been accelerated in response to the start of the arm-lowering motion in the current flapping section, 0 is set to the frame acceleration FrameAcc in a step S165, and the process proceeds to a step S193 shown in FIG. 31. On the other hand, if "YES" is determined in the step S163, that is, if the arm-lowering-acceleration flag 404p is turned on, it is determined that the animation frame has not yet been accelerated in response to the start of the arm-lowering motion in the current flapping section, and it is determined whether or not the current animation frame is equal to or more than the 15th frame and less than the 30th frame in a step S167. That is, the CPU 40 determines whether or not the animation frame is within the arm-lowering-acceleration-probable section.

If "YES" is determined in the step S167, that is, if the current animation frame is equal to or more than the 15th frame and less than the 30th frame, it is determined that the animation frame is within the arm-lowering-acceleration-probable section, and in a step S169, a value obtained by dividing the maximum number of frames AnimFrameMax of the animation frame by the arm-lowering determination cycle CycleSwing is set to the frame acceleration FrameAcc. That is, when the frame velocity FrameVel_new is calculated thereafter, the animation frame is accelerated in a next step S171, the arm-lowering-acceleration flag 404p is turned off, and the process proceeds to the step S193.

On the other hand, if "NO" is determined in the step S167, that is, if the current animation frame is not equal to or more than the 15th frame and less than the 30th frame, it is determined that the animation frame is not within the arm-lowering-acceleration-probable section, 0 is set to the frame acceleration FrameAcc in a step S173, and a value obtained by dividing the 1.7-fold maximum number of frames AnimFrameMax of the animation frame by the arm-lowering determination cycle CycleSwing is set to the current frame velocity FrameVel_old according to the Equation 12 in a step S175. That is, the CPU 40 makes the animation frame close to the arm-lowering-acceleration-probable section faster.

Succeedingly, in a step S177, it is determined whether or not the current frame velocity FrameVel_old is larger than 6. If "NO" is determined in the step S177, that is, if the current frame velocity FrameVel_old is equal to or less than 6, the process proceeds to the step S193 as it is. On the other hand, if "YES" is determined in the step S177, that is, if the current frame velocity FrameVel_old is more than 6, 6 is set to the current frame velocity FrameVel_old in a step S179, and the process proceeds to the step S181. That is, current frame velocity FrameVel_old is restricted.

As shown in FIG. 30, in the step S181, it is determined whether or not the arm-raising-acceleration flag 404n is turned on. If "NO" is determined in the step S181, that is, if the arm-raising-acceleration flag 404n is turned off, it is determined that the animation frame has already been accelerated in response to the start of the arm-raising motion in the current flapping section, in a step S191, 0 is set to the frame acceleration FrameAcc, and the process proceeds to the step S193. On the other hand, if "YES" is determined in the step S181, that is, if the arm-raising-acceleration flag 404n is turned on, it is determined that the animation frame has not yet been accelerated in response to the start of the arm-raising motion in the current flapping section, and it is determined whether or not the current animation frame is equal to or more than the 30th frame and less than the 60th frame in a step S183. That is, the CPU 40 determines whether or not the animation frame is within the arm-raising-acceleration-probable section.

If "NO" is determined in the step S183, that is, if the current animation frame is not equal to or more than the 30th frame and less than the 60th frame, it is determined that the animation frame is not within the arm-raising-acceleration-probable section, and the process proceeds to the step S191. On the other hand, if "YES" is determined in the step S183, that is, if the current animation frame is equal to or more than the 30th frame and less than the 60th frame, it is determined that the animation frame is within the arm-raising-acceleration-probable section, and in a step S185, it is determined whether or not the current frame velocity FrameVel_old is less than 2.

If "NO" is determined in the step S185, that is, if the current frame velocity FrameVel_old is equal to or more than 2, the process proceeds to the step S191. On the other hand, if "YES" is determined in the step S185, that is, if the current frame velocity FrameVel_old is less than 2, 2 is set to the frame acceleration FrameAcc in a step S187, the arm-raising-acceleration flag 404n is turned off in a step S189, and the process proceeds to the step S193.

In the step S193 shown in FIG. 31, it is determined whether or not the frame acceleration FrameAcc is not 0. If "NO" is determined in the step S193, that is, if the frame acceleration FrameAcc is 0, the process proceeds to a step S197 as it is. On the other hand, if "YES" is determined in the step S193, that is, if the frame acceleration FrameAcc is not 0, 0 is set to the current frame velocity Frame Vel_old in a step S195, and the process proceeds to the step S197.

In the step S197, according to the integration simulation, a next frame velocity FrameVel_new is calculated. Succeedingly, in a step S199, the next animation frame Frame_new is decided. That is, the CPU 40 calculates the next frame velocity FrameVel_new according to the Equation 10, and calculates the next animation frame Frame_new according to the Equation 11. Then, in a step S201, the animation at the decided animation frame Frame_new is set, and the process returns to the entire processing shown in FIG. 22-FIG. 25.

According to the embodiment, a flapping motion of the player is determined on the basis of the cycle of the variation of the weight ratio, this is reflected on the animation of the player object, and the moving amount of the player object is controlled on the basis of the magnitude of the weight ratio, and therefore, it is possible to execute wide variety of processing in comparison with a case that the game processing is merely executed in accordance with the variation of the load.

Furthermore, according to this embodiment, the updating velocity of the animation frame is changed according to an arm-lowering motion and an arm-raising motion, and therefore, it is possible to smoothly synchronize the flapping motion of the player and the animation by canceling the delay of the animation frame. Thus, the player can absorb in the virtual game, and enjoy playing the game play.

In addition, according to this embodiment, in a case that the weight ratio based on the load value of the player is equal to or more than the predetermined threshold value, when it is detected that the weight ratio locally declines (decreases) and increases, it is determined that an arm-raising motion in the large-flapping motion is started, and the moving velocity of the player object is changed in accordance with the arm-raising motion, and the updating velocity of the animation frame is changed in accordance with the arm-raising motion as well as the arm-lowering motion, so that it is possible to make the player perform a motion that the developer, et al. intended, and perform the processing in response to the detection of such a motion. That is, it is possible to execute wide variety of processing by detecting a complex motion.

Additionally, in this embodiment, the weight ratio obtained by dividing the current load value by the body weight value (reference value) is utilized, but the load value may be used as it is. In such a case, in order to eliminate advantage and disadvantage due to the difference in the weight of the player, a threshold value may be provided for each weight (for each rank of the weights).

Furthermore, in this embodiment, on the basis of the frequency spectrum obtained by performing a discrete Fourier transform on the time variation of the weight ratio, the presence or absence of a flapping motion by the player and the kind of the flapping motion are determined, but a fast Fourier transform may be executed.

In addition, in this embodiment, in a repeating motion, such as a flapping motion, an arm-raising motion of the player is determined on the basis of the time variation of the weight ratio as shown in FIG. 13, but there is no need of being restricted to this. For example, when a waveform obtained by reversing upside down the waveform shown in FIG. 13 at the reference value of the weight ratio is acquired, a predetermined motion is determined on the basis of the waveform reversed upside down. In such a case, when the value of the weight ratio is equal to or less than the certain value (1.02, for example), and the weight ratio rises and then declines, it is determined that the predetermined motion is started.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory storage medium storing an information processing program, said information processing program causes a computer to perform features comprising:
   acquiring a load value indicating a load of a user on the basis of a signal from a load detecting apparatus;
   judging a cycle of a load variation of said user on the basis of the acquired load value;
   determining a frequency of the cycle of the load variation; and
   executing predetermined information processing on the basis of the frequency of the cycle of the load variation.

2. The non-transitory storage medium storing an information processing program according to claim 1, wherein
   at least first information processing or second information processing different from said first information processing is executed on the basis of the judged cycle.

3. The non-transitory storage medium storing an information processing program according to claim 2, wherein
   said information processing program causes the computer to further perform features comprising determining whether or not the judged cycle satisfies a predetermined condition, and
   executing said first information processing when said cycle satisfies the predetermined condition, and executing said second information processing when said cycle does not satisfy the predetermined condition.

4. The non-transitory storage medium storing an information processing program according to claim 3, wherein said information processing program causes the computer to further perform features comprising:
   determining whether or not a frequency of the judged cycle is equal to or more than a first predetermined value, and
   executing said second information processing when said frequency is equal to or more than the first predetermined value.

5. The non-transitory storage medium storing an information processing program according to claim 3, wherein said information processing program causes the computer to further perform features comprising:
   judging said cycle on the basis of a frequency spectrum of the load variation of said user,
   determining whether or not the frequency of the judged cycle is a second predetermined value and a power spectrum of a frequency larger than said frequency is equal to or more than a maximum value of a spectrum noise, and
   executing said second information processing when said frequency is a second predetermined value, and a power spectrum of a frequency larger than said frequency is equal to or more than a maximum value of a spectrum noise.

6. The non-transitory storage medium storing an information processing program according to claim 1, wherein
   said information processing program causes the computer to further perform features comprising controlling a magnitude of at least a moving distance or a moving velocity of an object displayed on a display screen on the basis of the acquired load value.

7. The non-transitory storage medium storing an information processing program according to claim 6, wherein said information processing program causes the computer to further perform features comprising increasing the moving distance or the moving velocity of said object as an amplitude of the variation of the acquired load value is large.

8. The non-transitory storage medium storing an information processing program according to claim 6, wherein said information processing program causes the computer to further perform features comprising increasing the moving distance or the moving velocity of said object when the acquired load value is less than a predetermined value.

9. The non-transitory storage medium storing an information processing program according to claim 6, wherein said information processing program causes the computer to further perform features comprising increasing the moving distance or the moving velocity of said object when the cycle of the variation of the acquired load value is above a threshold value.

10. The non-transitory storage medium storing an information processing program according to claim 6, wherein, said information processing program causes the computer to further perform features comprising detecting a barycentric position of said user on a two-dimensional plane on the basis of a signal from said load detecting apparatus, and
controlling a moving direction of said object on the basis of the detected barycentric position.

11. The non-transitory storage medium storing an information processing program according to claim 10, wherein, said object moves in the virtual space, and
the moving direction of said object is decided according to different deciding method between when said object moves to a predetermined direction and when said object moves to a direction other than the predetermined direction.

12. The non-transitory storage medium storing an information processing program according to claim 11, wherein said information processing program causes the computer to further perform features comprising
deciding a first moving direction as a moving direction of said object on the basis of the detected barycentric position in a case that said object moves to said predetermined direction, and deciding a second moving direction as a moving direction of said object on the basis of the detected barycentric position in a case that said object moves to the direction other than said predetermined direction.

13. The non-transitory storage medium storing an information processing program according to claim 1, wherein said information processing program causes the computer to further perform features comprising
changing at least a display manner of the object displayed on the display screen on the basis of the judged cycle.

14. The non-transitory storage medium storing an information processing program according to claim 13, wherein,
said object is a moving image object, and
said moving image object is displayed on said display screen by a different animation on the basis of the judged cycle.

15. The non-transitory storage medium storing an information processing program according to claim 14, wherein,
an updating velocity of an animation frame is changed on the basis of the judged cycle and a frame number of the animation frame constructing of said animation.

16. The non-transitory storage medium storing an information processing program according to claim 1, wherein,
said information processing program causes a computer to further perform features comprising calculating a ratio of the acquired load value to a body weight value of said user, and
judging a cycle as to the variation of the calculated ratio.

17. An information processing apparatus comprising at least one processor, the information processing apparatus configured to:
acquire a load value indicating a load of a user on the basis of a signal from a load detecting apparatus,
judge a cycle of a load variation of said user on the basis of the acquired load value,
determine a frequency of the cycle of the load variation, and
execute predetermined information processing on the basis of the frequency of the cycle of the load variation.

18. An information processing method of an information processing apparatus, comprising:
acquiring a load value indicating a load of a user on the basis of a signal from a load detecting apparatus,
judging a cycle of a load variation of said user on the basis of the acquired load value,
determining a frequency of the cycle of the load variation, and
executing predetermined information processing on the basis of the frequency of the cycle of the load variation.

19. An information processing system, comprising:
a load value acquiring apparatus configured to acquire load values; and
an information processing apparatus operatively associated with the load value acquiring apparatus and configured to receive load values acquired from the load value acquiring apparatus, the information processing apparatus further configured to:
acquire a load value indicating a load of a user on the basis of a signal from the load value acquiring apparatus,
judge a cycle of a load variation of said user on the basis of the acquired load value,
determine a frequency of the cycle of the load variation, and
execute predetermined information processing on the basis of the frequency of the cycle of the load variation.

20. The non-transitory storage medium storing an information processing program according to claim 1, wherein the predetermined information processing includes controlling a virtual character based on the determined frequency of the cycle of the load variation.

21. The non-transitory storage medium storing an information processing program according to claim 1, wherein said information processing program causes the computer to further perform features comprising calculating an amplitude with respect to the determined frequency of the cycle of the load variation.

22. The information processing apparatus of claim 17, wherein an amplitude is calculated with respect to the determined frequency of the cycle of the load variation.

23. The information processing method of claim 18, further comprising calculating an amplitude with respect to the determined frequency of the cycle of the load variation.

24. The information processing system of claim 19, wherein an amplitude is calculated with respect to the determined frequency of the cycle of the load variation.

25. The non-transitory storage medium storing an information processing program according to claim 21, wherein said information processing program causes the computer to further perform features comprising conditioning a moving distance and/or a moving velocity of a virtual object based on the calculated amplitude and the determined frequency of the cycle of the load variation.

26. The non-transitory storage medium storing an information processing program according to claim 21, wherein said information processing program causes the computer to further perform features comprising determining a type of movement of a user based on the calculated amplitude and the determined frequency of the cycle of the load variation.

27. The non-transitory storage medium storing an information processing program according to claim 21, wherein said information processing program causes the computer to further perform features comprising determining a type of arm movement of a user based on the calculated amplitude and the determined frequency of the cycle of the load variation.

* * * * *